US009195401B2

(12) United States Patent
Li et al.

(10) Patent No.: US 9,195,401 B2
(45) Date of Patent: Nov. 24, 2015

(54) METHOD AND APPARATUS FOR VIRTUAL MACHINE LIVE STORAGE MIGRATION IN HETEROGENEOUS STORAGE ENVIRONMENT

(71) Applicant: UNIVERSITY OF FLORIDA RESEARCH FOUNDATION, INC., Gainesville, FL (US)

(72) Inventors: Tao Li, Gainesville, FL (US); Ruijin Zhou, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 53 days.

(21) Appl. No.: 14/183,250

(22) Filed: Feb. 18, 2014

(65) Prior Publication Data

US 2015/0234617 A1    Aug. 20, 2015

(51) Int. Cl.
    *G06F 13/00*    (2006.01)
    *G06F 3/06*    (2006.01)

(52) U.S. Cl.
    CPC ............ *G06F 3/0647* (2013.01); *G06F 3/0619* (2013.01); *G06F 3/0665* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 7,529,903 B2 | 5/2009 | Boss et al. | |
| 8,307,187 B2 | 11/2012 | Chawla et al. | |
| 8,321,630 B1 | 11/2012 | Vaid et al. | |
| 2002/0144070 A1* | 10/2002 | Watanabe et al. | ............ 711/165 |
| 2008/0040537 A1* | 2/2008 | Kim | ............... 711/112 |
| 2009/0260007 A1* | 10/2009 | Beaty et al. | ........................ 718/1 |
| 2010/0198973 A1 | 8/2010 | Jung et al. | |
| 2010/0229180 A1 | 9/2010 | Masuda | |
| 2011/0072430 A1 | 3/2011 | Mani | |
| 2011/0078681 A1* | 3/2011 | Li et al. | ........................... 718/1 |
| 2011/0138106 A1 | 6/2011 | Prabhakaran et al. | |
| 2011/0197022 A1* | 8/2011 | Green et al. | .................. 711/112 |
| 2012/0179874 A1* | 7/2012 | Chang et al. | .................. 711/128 |

(Continued)

OTHER PUBLICATIONS

"Amazon EC2", AWS | Amazon Elastic Compute Cloud (EC2)—Scalable Cloud Housing, from Amazon Web Services, Inc., accessed from http://aws.amazon.com/ec2/ on Jul. 15, 2015.

(Continued)

*Primary Examiner* — Sean D Rossiter
(74) *Attorney, Agent, or Firm* — Saliwanchik, Lloyd & Eisenschenk

(57) ABSTRACT

Embodiments pertain to live storage migration for virtual machines. Specific embodiments can implement the migration of VM disk images without service interruption to the running workload. Specific embodiments relate to storage migration between different disk arrays. Embodiments of the subject invention relate to a method and apparatus that can enhance the efficiency of virtual machine (VM) live storage migration in heterogeneous storage environments from a multi-dimensional perspective, e.g., user experience, device wearing, and/or manageability. Specific embodiments utilize one or more of the following: adaptive storage migration strategies, or techniques, such as 1) Low Redundancy (LR), which generates a reduced, and preferably the least, amount of redundant writes; 2) Source-based Low Redundancy (SLR), which can help keep a desirable balance between IO performance and write redundancy; and 3) Asynchronous IO Mirroring (AIO), which seeks high, and preferably the highest, IO performance. Specific embodiments adaptively mix one or more of these adaptive storage migration techniques during massive VM live storage migration.

51 Claims, 29 Drawing Sheets

(56) References Cited

U.S. PATENT DOCUMENTS

| | | | |
|---|---|---|---|
| 2012/0265935 A1* | 10/2012 | Luo | 711/114 |
| 2012/0266177 A1 | 10/2012 | Kakeda et al. | |
| 2012/0284710 A1 | 11/2012 | Vinberg | |
| 2012/0290630 A1 | 11/2012 | Aizman et al. | |
| 2012/0311235 A1 | 12/2012 | Masuo et al. | |
| 2012/0311394 A1 | 12/2012 | Masuo et al. | |
| 2014/0101657 A1* | 4/2014 | Bacher et al. | 718/1 |
| 2014/0109086 A1* | 4/2014 | Mizrahi et al. | 718/1 |
| 2014/0115162 A1* | 4/2014 | Kalyanaraman et al. | 709/226 |
| 2014/0244949 A1* | 8/2014 | Abali et al. | 711/162 |

OTHER PUBLICATIONS

"EMC" website, accessed from http://www.emc.com/index.htm. Last updated 2015.

"Iometer Project" website, accessed from http://www.iometer.org/, *Intel Corporation*, registered Nov. 2001.

"IOzone Filesystem Benchmark," website, accessed from http://www.iozone.org/, last updated Oct. 28, 2006.

"Microsoft Azure", *What is Microsoft Azure?*, Microsoft, accessed from https://azure.microsoft.com/en-us/ on Jul. 15, 2015.

"Storage XenMotion: Live Storage Migration with Citrix XenServer," *Citrix Systems*, 2012, accessed from https://www.citrix.com/content/dam/citrix/en_us/documents/products-solutions/storage-xenmotion-live-storage-migration-with-citrix-xenserver.pdf?accessmode=direct.

"The Xen Project" website, accessed from http://www.xenproject.org/. *A Linux Foundation Collaborative Project*, 2013.

"Virtual Machine Storage Migration Overview," *Windows Server*, Feb. 29, 2012, accessed from https://technet.microsoft.com/en-us/library/Hh831656.aspx.

"Winchester Systems" website, accessed from https://www.winsys.com/. Last updated 2014.

Black, Christian et al., "Accelerating Data Center Workloads with Solid-State Drives," *Intel*, IT@Intel White Paper: IT Best Practices, Jul. 2012, p. 1-12.

Bradford, Robert et al., "Live Wide-Area Migration of Virtual Machines Including Local Persistent State," *VEE'07*, Jun. 13-15, 2007, San Diego, California, USA.

Chen, Feng et al., "Hystor: Making the Best Use of Solid State Drives in High Performance Storage Systems," *ICS'11*, May 31-Jun. 4, 2011, Tucson, Arizona, USA.

Chernicoff, David. "Intel takes their SSD reliability to the datacenter," *ZDNet*, accessed from http://www.zdnet.com/article/intel-takes-their-ssd-reliability-to-the-datacenter/, published on Apr 12, 2012.

Hirofuchi, Takahiro et al., "A Live Storage Migration Mechanism over WAN for Relocatable Virtual Machine Services on Clouds," *9th IEEE/ACM International Symposium on Cluster Computing and the Grid*, May 18-21, 2009, p. 460-465.

Hruska, Joel. "Intel Launches DC S3700 SSD for Data Centers, Emphasizes Endurance and High Performance," accessed from http://hothardware.com/news/intel-launches-new-datacenter-ssds-emphasizes-data-protection-high-performance, published on Nov. 5, 2012.

Jo, Heeseung et al., "SSD-HDD-Hybrid Virtual Disk in Consolidated Environments," *Eur-Par 2009—Parallel Processing Workshops, Lecture Notes in Computer Science*, 2010, 6043:375-384.

Jones, Penny. "Turning your data center into a microgrid," *DatacenterDynamics*, Aug. 31, 2012, accessed from http://wvvw.datacenterdynannics.com/critical-environment/turning-your-data-center-into-a-microgrid/68868.fullarticle.

Josephson, William K. et al., "DFS: A File System for Virtualized Flash Storage," *ACM Transactions on Storage (TOS)*, Sep. 2010, 6(3):Article No. 14, p. 1-15.

Kim, Youngjae et al., "HybridStore: A Cost Efficient, High Performance Storage System Combining SSDs and HDDs," *2011 IEEE 19th International Symposium on Modeling, Analysis & Simulation of Computer and Telecommunication Systems (MASCOTS)*, Jul. 25-27, 2011, p. 227-236.

Laliberte, Bob. "Delivering Greater Effectiveness and Efficiency for SANs in Virtualized Data Centers," *Enterprise Strategy Group (ESG)*, Mar. 2010, White Paper, p. 1-13.

Luo, Yingwei et al., "Live and Incremental Whole-System Migration Using Block-Bitmap," *IEEE International Conference on Cluster Computing*, Sep. 29-Oct. 1, 2008, p. 99-106.

Mashtizadeh, Ali et al., "The Design and Evolution of Live Storage Migration in VMware ESX," *In Usenix Annual Technical Conference*, 2011.

Metz, Cade. "Flash Drives Replace Disks at Amazon, Facebook, Dropbox," accessed from http://www.wired.com/2012/06/flash-data-centers/, published Jul. 13, 2012.

Miller, Rich. "Morphlabs, Dell DCS Team on SSD-Powered Cloud," *Data Center Knowledge*, accessed from http://www.datacenterknowledge.com/archives/2012/03/28/morphlabs-dell-dcs-team-on-ssd-powered-cloud/, published on Mar. 28, 2012.

Milosević, Ivor et al., "Usage of Virtualization Technologies in Long-Term Preservation of Integrity and Accessibility of Digital Data," *INFuture2011: Information Sciences and e-Society*, Oct. 28, 2011, University of Zagreb.

Park, Seonyeong et al., "A comprehensive study of energy efficiency and performance of flash-based SSD," *Journal of Systems Architecture*, Apr. 2011, 57(4):354-365.

Raffo, Dave. "SolidFire develops all-SSD system for cloud storage providers," accessed from htt.://searchitchannel.techtarget.com/news/2240037093/SolidFire-develo•s-all-SSD-system-for-cloud-storage-providers, published on Jun. 21, 2011.

"Red Hat Customer Portal," *Red Hat, Inc.*, Feb. 5, 2013, accessed from https://access.redhat.com/knowledge/docs/en-US/Red_Hat_Enterprise_Linux/6/html/Virtualization_Getting_Started_Guide/sec-migration.html.

Singh, Aameek et al., "Server-Storage Virtualization: Integration and Load Balancing in Data Centers," *SC Conference*, 2008, p. 1-12.

Soundararajan, Gokul et al., "Extending SSD Lifetimes with Disk-Based Write Caches," *FAST 2010: 8th USENIX Conference on File and Storage Technologies*, Feb. 2010.

Sverdlik, Yevgeniy. "Microsoft: turning sewage into bytes in Wyoming," *DatacenterDynamics*, Nov. 20, 2012, accessed from http://www.datacenterdynamics.com/critical-environment/microsoft-turning-sewage-into-bytes-in-wyoming/71326.fullarticle.

Tridgell, Andrew et al., "DBENCH" website, accessed from https://dbench.samba.org/, accessed on Jul. 15, 2015.

"VMware vSphere TM: Build a Flexible, Efficient Datacenter with VMware vSphere," *VMware, Inc.*, Feb. 5, 2013, accessed from http://www.vmare.com/products/datacenter-virtualization/vsphere/storage-vmotion.html#technical.

Wu, Guanying et al, "AFTL: Improving SSD Lifetime via Exploiting Content Locality," *EuroSys'12*, Apr. 10-13, 2012, Bern, Switzerland.

Zheng, Jie et al., "Workload-Aware Live Storage Migration for Clouds," *VEE'11*, Mar. 9-11, 2011, Newport Beach, California, USA.

* cited by examiner $\gamma = 10\%$

METHOD AND APPARATUS FOR VIRTUAL MACHINE LIVE STORAGE MIGRATION IN HETEROGENEOUS STORAGE ENVIRONMENT

This invention was made with government support under CCF-0937869 awarded by National Science Foundation. The government has certain rights in the invention.

BACKGROUND OF THE INVENTION

Virtualization technology has been widely adopted as the base infrastructure for cloud computing. Major cloud providers, such as Amazon (EC2) [1] and Microsoft (Azure) [2], are selling their computing resources in the form of virtual machines (VMs). Load balancing has become essential for effectively managing large volumes of VMs in cloud computing environment. The cornerstone for moving virtual machines on the fly is the VM live migration, which only transfers CPU and memory states of VMs from one host to another. To allow the movement of persistent storage with VMs, several live storage migration techniques have been proposed, including Dirty Block Tracking (DBT) and IO Mirroring [10][11][12].

The two mainstream techniques for live storage migration are dirty block tracking (DBT) and input/output (IO) Mirroring. The DBT technique, which is widely adopted by many VM vendors (e.g. Xen and VMware ESX), is a well-known mechanism that uses bitmap to track write requests while the VM image is being copied. Once the entire image is copied to the destination, a merge process is initiated to patch all the dirty blocks (i.e., data blocks that are recorded in bitmap) from the original image to the new image. In order to prevent further write requests, the VM is paused until all the dirty blocks are patched to the new disk image. To mitigate downtime introduced by the merge process, incremental DBT (also DBT), which keeps the VM running while iteratively patching dirty blocks to the new image, has been proposed and used in several projects [11][12][13][14]. If the number of dirty blocks is stable for several iterations, the VM is suspended and the remaining dirty blocks are copied to the destination. Nevertheless, incremental DBT also has disadvantage: in case that the number of dirty blocks are not converged due to intensive write requests, the migration time and even the downtime can be significantly long.

To address the issue of long migration time and downtime, VMware proposed IO Mirroring technique [10] to eliminate the iteratively merge process. With IO Mirroring, all the write requests to the data blocks that have been copied will be duplicated and issued to both source and destination disks. The two write requests are synchronized and then the write completion acknowledgement is asserted (synchronous write). Write requests to the data blocks that have not yet been copied will only be issued to the source disk while the writes to the data blocks that are currently being copied will be buffered and later issued to both source and destination when the being copied phase completes. By doing so, the data blocks will always be synchronized during the migration process. Note that once the process of copying VM disk image completes, merging is not needed, which leads to shorter migration time and lower downtime. However, IO Mirroring also raises some concerns: 1) workload IO performance is limited by the slower disk due to the synchronized write requests; 2) since the disk bandwidth is consumed by the duplicated IO requests, the progress of copying the VM image will be slowed down.

Virtual machine (VM) live storage migration techniques significantly increase the mobility and manageability of virtual machines during, for example, disaster recovery, storage maintenance, and storage upgrades, in the context of cloud and big data computing. Meanwhile, solid state drives (SSDs), such as flash-based SSDs have become increasingly popular in data centers, due to, for example, their high performance, silent operations and shock resistance [20, 21]. Historically, mechanical hard disk drives (HDDs) are used as the primary storage media due to their large capacity and high stability in the long run. Recently, solid-state drives (SSDs), which have high IO performance [20], are emerging as promising storage media. In specific experiments, the IOPS (10 per second) for VM running on SSDs is 3.3× higher than that on HDDs. However, SSDs also have limitations, such as low capacity, high price, and limited lifetime. The more writes and erases performed, the shorter the remaining SSD lifetime will be [7, 22]. In the commercial market, cloud storage providers, such as Morphlabs, Storm on Demand, CloudSigma and CleverKite, are selling the SSD powered cloud [4]. On the other hand, device manufacturers, such as Intel and Samsung, are researching on reliable SSD for data centers [6, 27]. Thus, from the perspective of both seller and manufacturer, SSDs have been accredited as an indispensable component for cloud and data center storage. A data center will be equipped with several disk arrays. Some of the disk arrays are SSDs while the others are HDDs. Those disk arrays are connected to servers via Fibre Channel [8, 9, 26]. With the decrease in price, SSDs have become more affordable to be used in data centers. Currently, many leading Internet service provision companies, such as Facebook, Amazon and Dropbox, are starting to integrate SSDs into their cloud storage systems [3][4][5]. The storage media for data centers becomes more diverse as both SSDs and HDDs are being used to support cloud storage. Consequently, storage management, especially VM live storage migration, becomes more complex and challenging. Accordingly, it is likely that VM live storage migration will inevitably encounter heterogeneous storage environments. Although SSDs deliver higher IO performance, their limited lifetime is an inevitable issue. In fact, while existing VM live storage migration schemes do not fully exploit the high performance characteristics of SSDs, such schemes aggravate the wear out problem. Even worse, during massive storage migrations, SSDs will be worn out significantly due to large volume of write operations.

BRIEF SUMMARY OF THE INVENTION

Embodiments of the subject invention relate to a method and apparatus that can enhance the efficiency of VM live storage migration in heterogeneous storage environments from a multi-dimensional perspective, e.g., user experience, device wearing, and/or manageability. Embodiments can enhance the efficiency/cost of VM live storage migration (Migration Cost (MC)) in heterogeneous storage environments from a multi-dimensional perspective, which incorporates user experience (IO penalty), cluster management (migration time), and device usage (degree of wear). The weights on IO penalty and SSD lifetime can also be considered to reflect different design preferences. Specific embodiments utilize one or more of the following three VM live storage migration strategies, or techniques, which can reduce migration cost: 1) Low Redundancy (LR), which generates a reduced, and preferably the least (near zero), amount of redundant writes; 2) Source-based Low Redundancy (SLR), which can help keep a desirable balance between IO performance and write redundancy by leveraging faster source disk while still maintaining low redundancy merit; and 3) Asynchronous IO Mirroring (AIO), which seeks high, and preferably the highest, IO performance. Evaluation of a specific embodiment of a system in accordance with the subject invention shows that the use of the subject techniques outperform existing live storage migration by a significant margin. Comparison of cost of massive VM live storage migration can be based on a flexible metric (migration cost) that captures various design preferences.

Empirical evaluations of systems in accordance with embodiments of the subject invention show that such systems yield stable and short disk downtimes (around 200 ms). Although the cost varies with different weights and storage media, on average, the migration costs for LR, SLR, and AIO are 51% lower, 22% lower, and 21% lower, respectively, than those for traditional methods (e.g., DBT and IO Mirroring). Furthermore, by adaptively mixing LR, SLR, and AIO during massive storage migration, the cost can be further reduced by 48% compared to using LR, SLR, or AIO alone.

DETAILED DISCLOSURE OF THE INVENTION

Figure 1A:
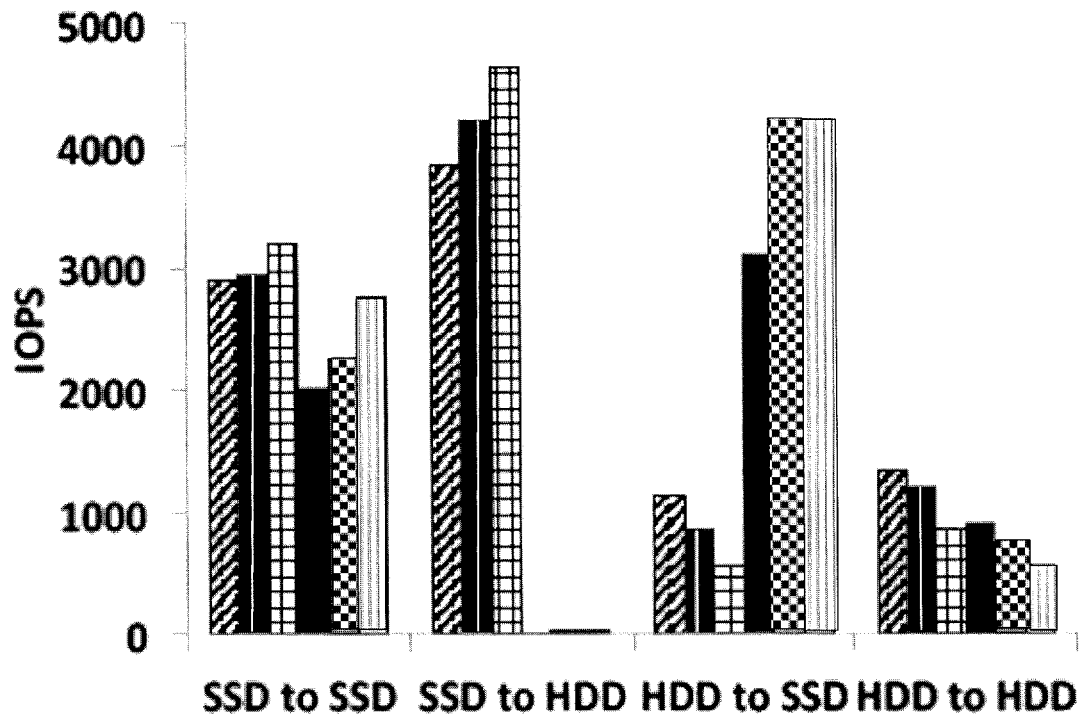
FIG. 1a shows IOPS for copying VM image while workloads are running inside.

Embodiments pertain to live storage migration for virtual machines. Specific embodiments can implement the migration of VM disk images without service interruption to the running workload. Specific embodiments relate to storage migration between different disk arrays. Embodiments of the subject invention relate to a method and apparatus that can enhance the efficiency of virtual machine (VM) live storage migration in heterogeneous storage environments from a multi-dimensional perspective, e.g., user experience, device wearing, and/or manageability. Specific embodiments utilize one or more of the following: adaptive storage migration strategies, or techniques, such as 1) Low Redundancy (LR), which generates a reduced, and preferably the least, amount of redundant writes; 2) Source-based Low Redundancy (SLR), which can help keep a desirable balance between IO performance and write redundancy; and 3) Asynchronous IO Mirroring (AIO), which seeks high, and preferably the highest, IO performance. Specific embodiments adaptively mix one or more of these adaptive storage migration techniques during massive VM live storage migration, such that the cost of massive VM live storage migration can be even lower than when using any one of these adaptive storage migration techniques alone.

Embodiments of the subject invention can provide enhanced performance, enhanced user experience, and/or enhanced reliability for data management system with respect to solid state drive (SSO) equipped virtualized storage systems in cloud-based data centers. Techniques used in accordance with embodiments of the invention allow the migration process to dynamically choose one of multiple operation modes and source/destination media to achieve desired results taking into consideration the trade-offs between multiple efficiency metrics. It also provides a mechanism to manage massive data migrations.

VM live storage migration is more sophisticated and challenging on heterogeneous storage environments. For instance, if a user requests more disk space, his/her VM image may need to be migrated from small capacity disk (SSD) to large capacity disk (HDD). On the other hand, if the user requests to upgrade IO performance, his/her VM image may need to be migrated from slow disk (HDD) to fast disk (SSD). Accordingly, in specific embodiments of live storage migration schemes, VM live storage migration performed on various types of storage media takes into consideration the characteristics of the different storage devices involved, such as the high bandwidth and limited lifetime for SSD, and the low access speed and large capacity for HDDs. Taking the characteristics of the storage devices involved in the migration, in accordance with specific embodiments of the subject invention, can provide one or more advantages, such as: 1) more fully exploiting the high performance of SSDs, 2) having shorter migration times by reducing the number of redundant write requests, so as to reduce the fraction of IO bandwidth of the redundant write requests, 3) reducing how quickly SSDs are wore down and extending the remaining SSD lifetime. Further, a smaller volume of redundant IO operations generated during massive storage migrations will not saturate the disk bandwidth as much, so as to also extend the SSD's lifetime.

Figure 1B:
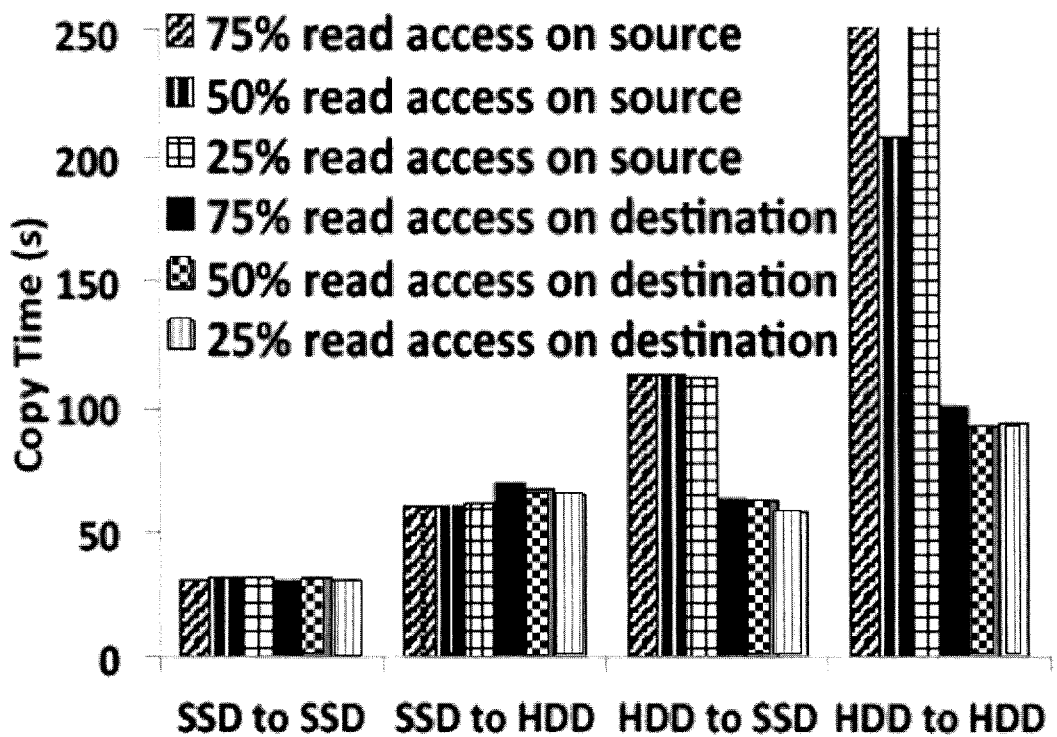
FIG. 1b shows the time to copy VM images while workloads are running inside.

Embodiments of the subject invention can optimize the performance of VM live storage migration based on a characterization of at least two processes. In general, VM live storage migration involves two processes, namely: (1) copy process that moves the VM image; and (2) a VM IO request handling process that ensures consistency between the two disk images. During storage migration, the copy process and the VM IO process compete for IO bandwidth, which can have a large impact on the performance. Table 1 shows the performance for copying a 5 GB image of an idle VM and Table 2 shows the measured IOPS (input/output operations per second) for the same VM while running, but not being migrated. As expected, the SSD effectively speeds up the copy process and the VM on SSDs achieves much higher IOPS than that on HDDs. Nevertheless, the resource competition between image copy and VM IO requests still exists even when SSDs are involved. Note that the VM IO requests can be issued to source or destination during the migration. The performance characteristics for copying VM image with running workloads are shown in FIG. 1a and FIG. 1b. SSDs have faster access speed and better capability for handling intensive IO requests. For the case where both a SSD and a HDD are involved, the IOPS is higher and the copy time is shorter if the VM IO requests are directed to the SSD. In the case where both source and destination are SSDs, the copy time and IOPS are similar irrespectively of where the VM IO requests are issued. For the case where both source and destination are HDDs, higher IOPS can be achieved at the cost of longer migration time.

TABLE 1

| The time to copy a 5 GB idle VM image | | | |
| --- | --- | --- | --- |
| SSD to SSD | SSD to HDD | HDD to SSD | HDD to HDD |
| 30 s | 59 s | 55 s | 81 s |

TABLE 2

| The IOPS of running VM | | | |
| --- | --- | --- | --- |
| | 75% Read | 50% Read | 25% Read |
| VM on SSD | 5500 | 5900 | 6495 |
| VM on HDD | 2230 | 1744 | 1445 |

For the case where a VM is migrated from a HDD to a SSD and all the IO requests from VM are issued to the source disk (HDD), as in DBT, the performance for both copy process and IO requests is significantly lower, as shown in FIGS. 1a and 1b. The reason is that the reads from the copy process and the IO requests from VM saturate the bandwidth of the HDD. For the case where a VM is migrated from a SSD to a HDD, issuing all the VM IO requests to the source disk (SSD) yields high IOPS and short copy time because the SSD is more capable of handling large volume of IO accesses. However, simply filtering all the IO requests to the SSD exacerbates the degree of wearing for the SSD, which shortens the remaining SSD lifetime. Thus, blindly using SSD is not a preferred option.

To summarize, when VM storage migration occurs in a storage environment that involves SSDs, redirecting the workload IO requests to SSDs benefit the migration time and IOPS, but the SSDs will wear out more quickly. When a VM is migrated between HDDs, there is a trade off between migration time and IOPS.

Characterization of Existing Live Storage Migration Schemes (DBT and IO Mirroring)

In a specific embodiment, a Xen is used as a virtual machine monitor and the two existing storage migration techniques are implemented in Xen blktap2 modules, more details of which are provided herein.

There are three well-known metrics to measure the performance of live storage migration: 1) downtime, 2) migration time, and 3) IO penalty. Downtime measures the time it takes to pause the VM and switchover between source and destination disks. Migration time represents the overall time it takes to accomplish the storage migration operation, which should preferably be minimized to guarantee smooth and quick storage maintenance. IO penalty shows the performance degradation the user experiences during the VM live storage migration.

As can be seen in Table 3, DBT tends to have longer downtime than IO Mirroring because DBT needs to patch the last copy of dirty blocks during the downtime period, while this is not necessary for IO Mirroring. Further, when varying the underlying storage media, the downtime of DBT is less stable than that of IO Mirroring. Even further, when the destination is slower than the source (e.g., from SSD to HDD), DBT takes a long time, or even fails to complete, since the last iteration of the merge process writes dirty data blocks to the slower disk.

TABLE 3

| The Downtime of Migrating 30 GB VM Image while Running IO meter with 50% Reads/50% Writes | | | | |
| --- | --- | --- | --- | --- |
| | SSD to SSD | SSD to HDD | HDD to SSD | HDD to HDD |
| DBT | 232 ms | 4000 ms | 266 ms | 900 ms |
| IO Mirroring | 198 ms | 249 ms | 298 ms | 199 ms |

Figure 2:
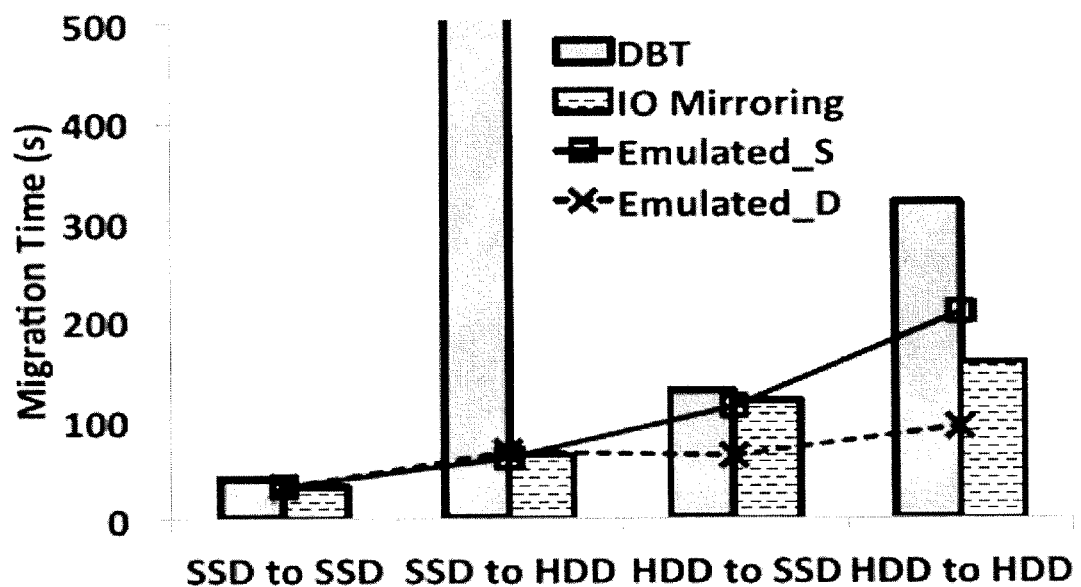
FIG. 2 shows the migration time for a 5 GB VM image under heterogenous storage environment (Iometer is running inside the VM with 50% read, and 50% write).

Migration time for a 5 GB VM image under heterogeneous storage environment (IOmeter is running inside the VM with 50% read, 50% write) for existing schemes is shown in FIG. 2. Two emulated scenarios are also used for comparison purposes. Copying disk image while VM IO requests are only issued to the source is denoted as Emulated_S and copying disk image while VM IO requests are only issued to the destination is referred as Emulated_D. In terms of migration time, the biggest difference between IO Mirroring and DBT is the iterative merge process. As can be seen in FIG. 2, DBT exhibits longer migration time than IO Mirroring because it needs to iteratively merge dirty blocks to destination after copying the image. The slower the destination storage media are, the longer the merge process will be. Both migration schemes manifest longer migration time compared to the better of the two emulated scenarios.

Figure 3:
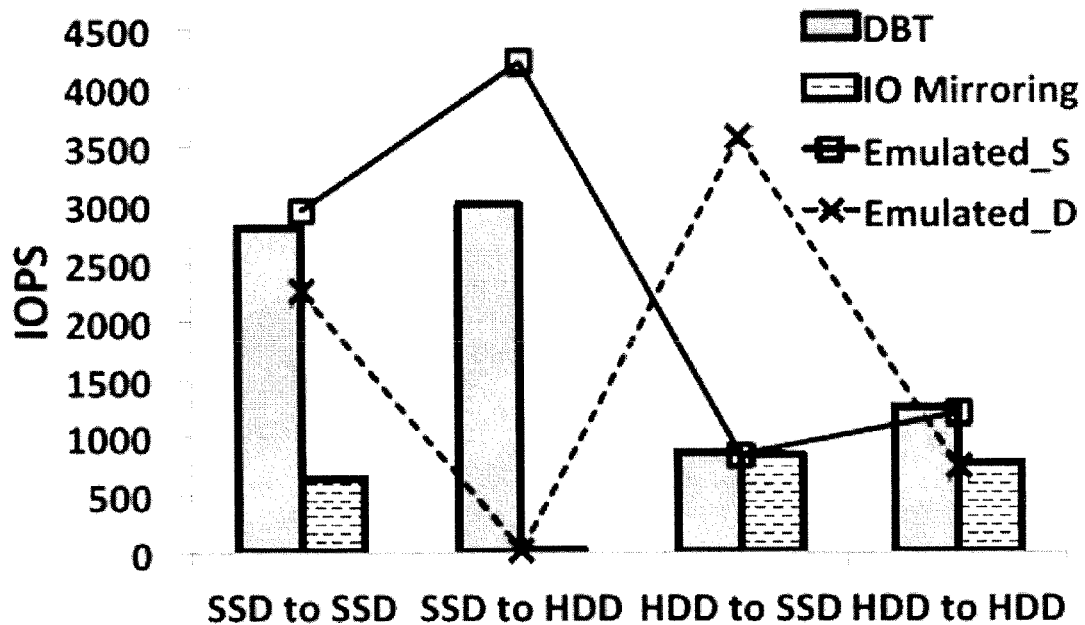
FIG. 3 shows the IOPS for migrating the VM images under heterogenous storage environment (IOmeter is used to measure IOPS).

When using IO Mirroring, the IOPS inside the VM is highly dependent on the slowest disk due to synchronous write. On the other hand, the IOPS inside the VM when using DBT only depends on the source disk. Referring to FIG. 3, showing the IOPS for migrating VM images under heterogeneous storage environment (IOmeter is used to measure IOPS), shows that when the source disk is a SSD, DBT is superior to IO Mirroring with respect to IO performance. If the source is a HDD, both DBT and IO Mirroring yield similar IOPS. However, neither DBT nor IO mirroring achieves the IOPS performance of the higher of Emulated_D and Emulated_S, where Emulated_D is indicated by the dash-cross and Emulated_S is indicated by the solid-square lines. In this way, conventional schemes do not fully exploit the high performance of SSDs.

Since introducing a large volume of write and erase cycles will unavoidably diminish the lifetime of SSDs [7], another measurement, the amount of data that is written to SSD, can be taken into account in an embodiment of the subject characterization. If only the copying of a VM disk image is considered (e.g., the experiments shown in FIGS. 1a and 1b), then the total amount of data written to SSD is determined by the workload IO traffic plus the VM image size. The live storage migration schemes introduce overhead and redundant data writes, further wearing off SSDs and shortening the SSD's lifetime. The heavier the workload's IO traffic is, the higher the extra volume of data write (the amount that exceeds the dashed line) will be. For DBT, the redundant data writes come from the merge process; for IO Mirroring, the redundant data writes come from the duplicated writes to data blocks that have been copied. DBT tends to have more redundant data writes than IO Mirroring.

Figure 4:
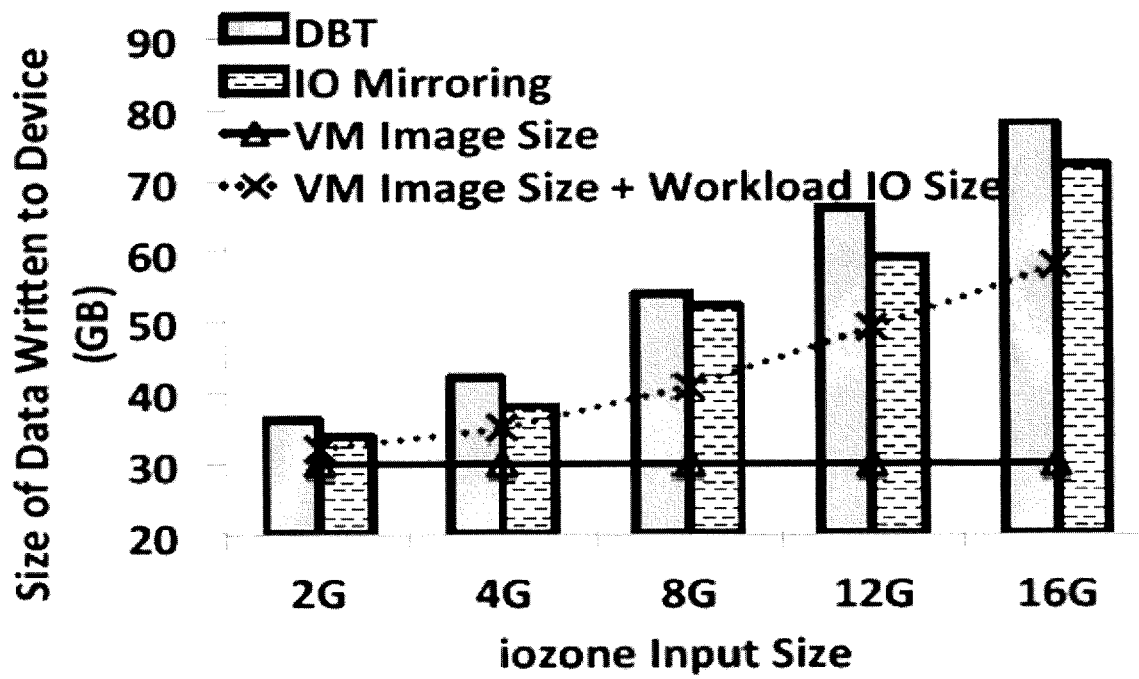
FIG. 4 shows the total size of data that written to device when migrating 30 GB VM from SSD to SSD (IOzone is set to perform write and rewrite operation.

FIG. 4 shows the amount of data written to a disk when migrating VM images from SSDs to SSDs. As can be seen in FIG. 4, which shows the total size of data that written to device when migrating 30 GB VM from SSD to SSD (IOzone is set to perform write and rewrite operation), both mechanisms generate extra amount of data writes compared to simply copying the disk image of the running VM (dashed line).

Embodiments of the subject live storage migration technique in heterogeneous storage environments seek to have negligible downtime, short migration time, low IO penalty, and less redundant writes to the SSD. Conventional methods do not take the underlying device characteristics into consideration. Specific embodiments of the subject invention apply to live storage migration for situations where the underlying storage becomes heterogeneous in heterogeneous environments.

Metric for Live Storage Migration in Heterogeneous Environments

Embodiments can utilize a metric that one or more, and preferably all three of the following are taken into account: 1) VM user experience (IO penalty and downtime), 2) storage maintenance (migration time), and 3) SSD lifetime (extra amount of data writes).

For the VM user experience, the existing metric, IO penalty, can indicate the performance degradation the user will experience. Note that the value of the traditional IO penalty may be negative when the destination disk is faster than the source disk. In order to avoid the possibility of a negative penalty when the destination disk is faster than the source disk, the I/O penalty can be defined as:

$$\lambda_{IO} = \frac{\text{Best IO Performance} - \text{IO Performance during migration}}{\text{Best IO Performance}} \quad (1)$$

In equation (1), Best IO Performance means the best IO performance achieved from available storage media. As an example, if a VM is migrated from HDD to SSD, the Best IO Performance is the performance that can be achieved from SSD. Ideally, when workloads always run on a faster disk, $\lambda_{IO}$ will be close to 0. From the user perspective, the less the IO penalty is, the better the storage migration scheme is. With a "live" storage migration, the disk downtime should be close to 0. Otherwise, workloads inside the VM may crash due to intolerably long interrupts. In specific embodiments, downtime can be used as a separate metric to quantify whether a storage migration design is "live" or not.

From the perspective of the data center administrator, migration time means how long the data center administrator should wait until the next management can be performed. Longer migration time means higher possibility to fail the scheduled maintenance plan. Ideally, migration time should be close to the time it takes to simply copy the entire VM disk image without interference. The migration time factor $\lambda_{migration\ time}$ can be defined as:

$$\lambda_{migration\ time} = \frac{\text{migration time}}{\text{image copy time}} \quad (2)$$

Since storage migration inevitably introduces IO competition and runtime overhead, migration time is always longer than image copy time. In other words, $\lambda_{migration\ time}$ is always greater than 1. The smaller the $\lambda_{migration\ time}$ is, the better the storage migration scheme is for the data center administrator, or manager.

From the device point of view, the amount of data writes can indicate the degree of wear caused by live storage migration. In addition, the larger the amount of data writes is, the more quickly the SSD will be worn out, which leads to shorter remaining lifetime for the SSD. Thus, a wear-out factor $\lambda_{wear\ out}$ can be defined, to indicate the SSD lifetime penalty per time unit during storage migration. As HDD does not have the wear out issue, $\lambda_{wear\ out}$ should equal to 0 when all the write requests are issued to HDD.

$$\lambda_{wear\ out} = \frac{\text{data written to SSD per time unit}}{\text{Workload Data Writes per time unit}} \quad (3)$$

In equation (3), the denominator is the amount of data writes per time unit generated by the workloads while the nominator is the amount of data (generated by workload) written to SSD per time unit. For normal executing, $\lambda_{wear\ out}$ equals to 1 if the VM is running on a SSD, 0 if the VM is running on a HDD. Any redundant writes, such as merge process in DBT and write request duplication in IO Mirroring, will $\lambda_{wear\ out}$. The smaller $\lambda_{wear\ out}$ is, the less severely the SSD wears off during live storage migration.

Note that migration time indicates not only how long the user will suffer from the I/O penalty, but also how long the device will be worn. In other words, the longer the migration time is, the higher overall penalty ($\lambda_{IO} * \lambda_{migration\ time}$) the user will observe and the higher overall degree of wearing ($\lambda_{wear\ out} * \lambda_{migration\ time}$) the SSD experiences. Accordingly, in a specific embodiment, we define the migration cost (MC) for VM live storage migration can be defined as:

$$MC = \gamma * \lambda_{wear\,out} * \lambda_{migration\,time} + (1-\gamma) * \lambda_{IO} * \lambda_{migration\,time} \quad (4)$$

$$= \lambda_{migration\,time} * (\gamma * \lambda_{wear\,out} + (1-\gamma) * \lambda_{IO})$$

where $\gamma$ defines the weight on the lifetime of SSD, while $1-\gamma$ is the weight on the IO performance ($0<\gamma<1$). When $\gamma>50\%$, it means wear out issue has a higher priority, and when $\gamma<50\%$, it means IO performance is more important.

Figure 5:
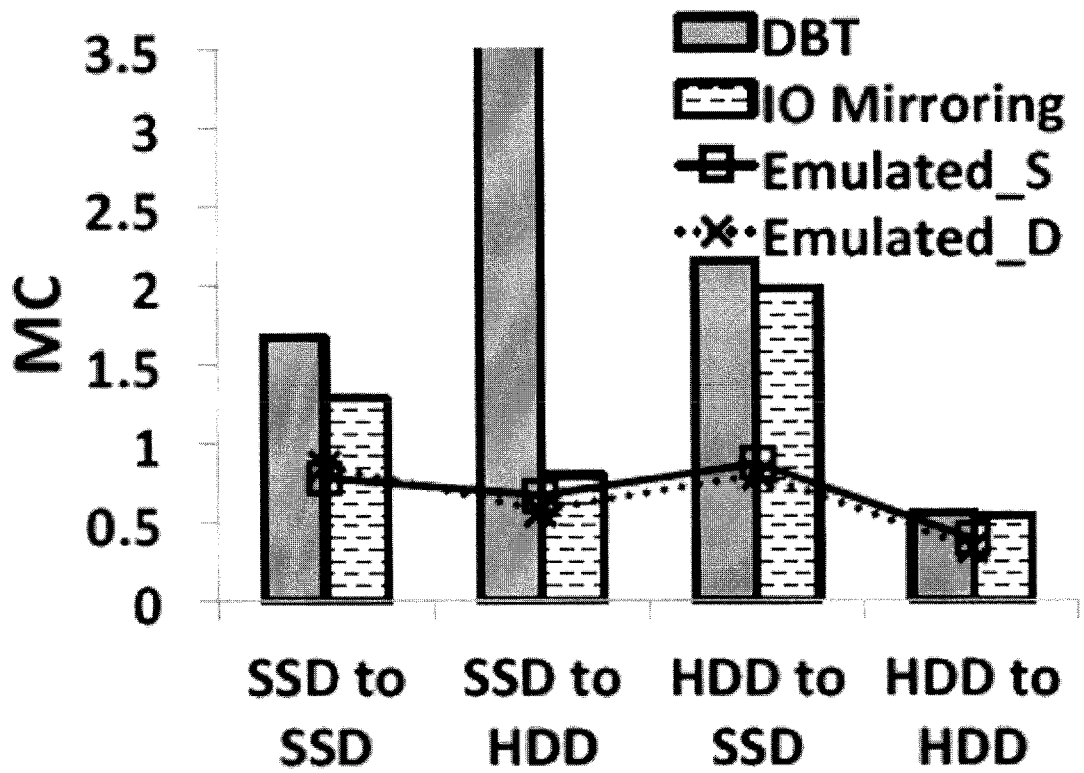
FIG. 5 shows MC for current storage migration schemes for when $\gamma=0.5$.
Figure 6A:
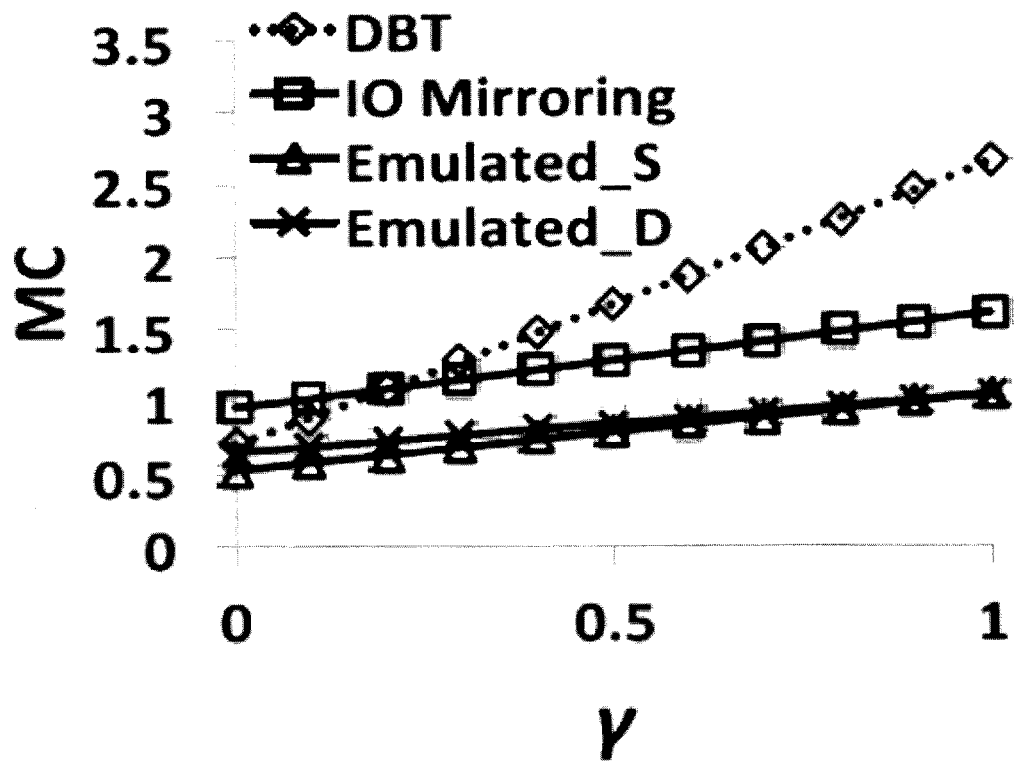
FIG. 6a shows MC when migrating a VM from SSD to SSD
Figure 6B:
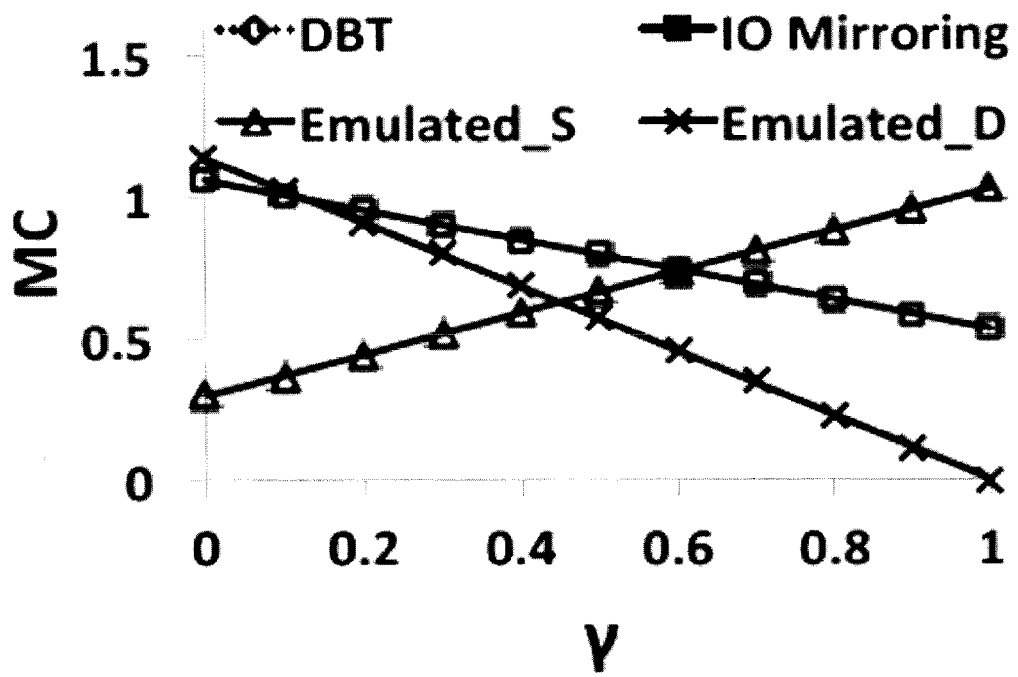
FIG. 6b shows MC when migrating a VM from SSD to HDD (the value of DBT is too high to be shown.
Figure 6C:
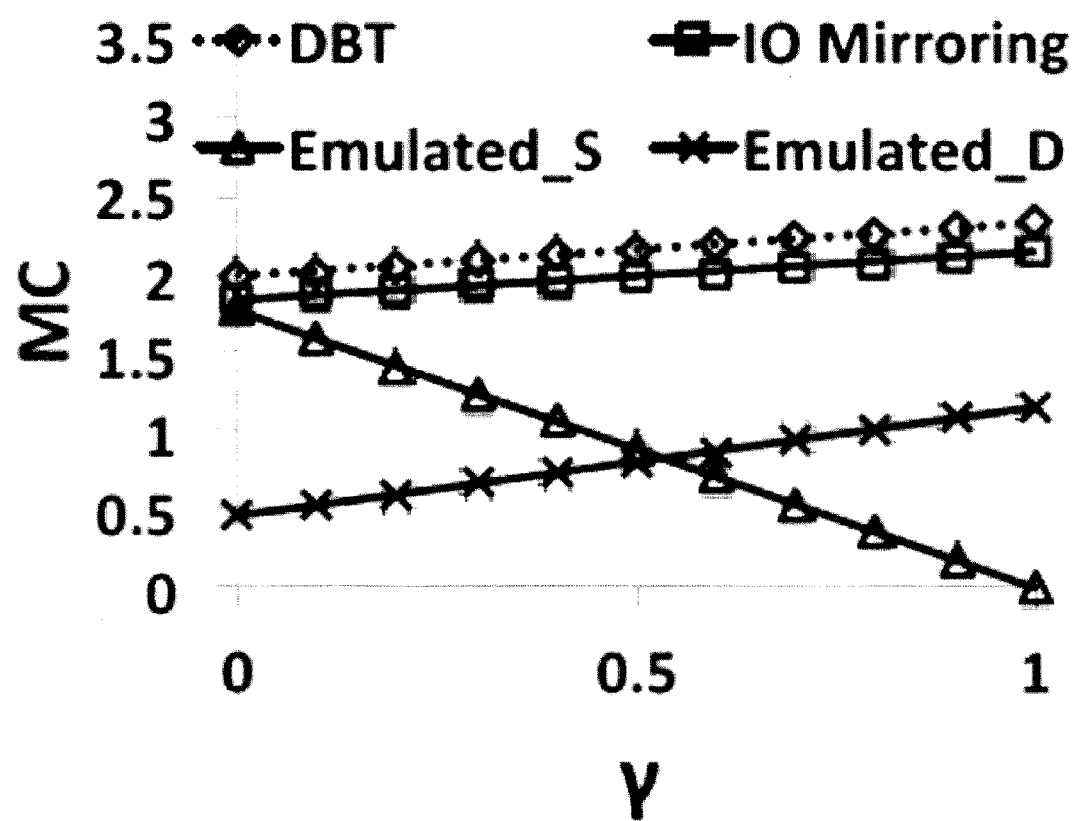
FIG. 6c shows MC when migrating a VM from HDD to SSD.

In the situation of a neutral preference regarding wear-out issue versus IO performance, $\gamma=0.5$. FIG. 5 shows the migration cost for existing storage migration schemes when $\gamma=0.5$. As can be seen, no matter what type of underlying storage media are used, both DBT and IO Mirroring have extra migration cost compared to the two emulated scenarios (Emulated_S and Emulated_D). Further zooming in on each case, FIGS. 6a, 6b, and 6c show how migration cost varies when the weight $\gamma$ changes. Referring to FIG. 6a, which shows MC when migrating a VM from SSD to SSD, in the case where both source and destination are SSDs, the larger the weight $\gamma$ on $\lambda$wear out is, the higher the migration cost is. In this situation, no matter where the VM IO requests are issued, the total writes to the SSD cannot be reduced. When the source is SSD and the destination is HDD, as shown in FIG. 6b, which shows MC when migrating a VM from SSD to HDD (the value of DBT is too high to be shown), the migration cost for DBT is way higher than that for IO Mirroring due to the long migration time (ranging from 11 to 21). Furthermore, since the source disk is SSD, running a VM on source (Emulated_S) gains higher IO performance (lower $\lambda$10) than on the destination (Emulated_D), which leads to a lower migration cost if the user cares more about the IO performance ($\gamma \to 0$). In contrast, if the user prefers to extend the SSD lifetime ($\gamma \to 1$), Emulated_D offers a lower migration cost, since $\lambda$wear out is 0, when all the IO requests are issued to the destination (HDD). In the case where a VM is migrated from HDD to SSD, as shown in FIG. 6c which shows MC when migrating a VM from HDD to SSD, although Emulated_D yields a higher IO performance, Emulated_S provides a lower migration cost if longer SSD lifetime is preferred. Despite the value of $\gamma$, current storage migration schemes always yield higher migration cost than simply copying the running VM (Emulated_S or Emulated_D). Thus, in accordance with an embodiment of the subject invention, the migration cost can be reduced by adaptively balancing any one, any two, or all three of the following factors: $\lambda_{wear\,out}$, $\lambda_{migration\,time}$ and $\lambda_{IO}$, and by preferably adaptively balancing all three factors.

VM Live Storage Migration Schemes Under Heterogeneous Environments Low Redundancy Live Storage Migration Mechanism (LR)

Figure 7:
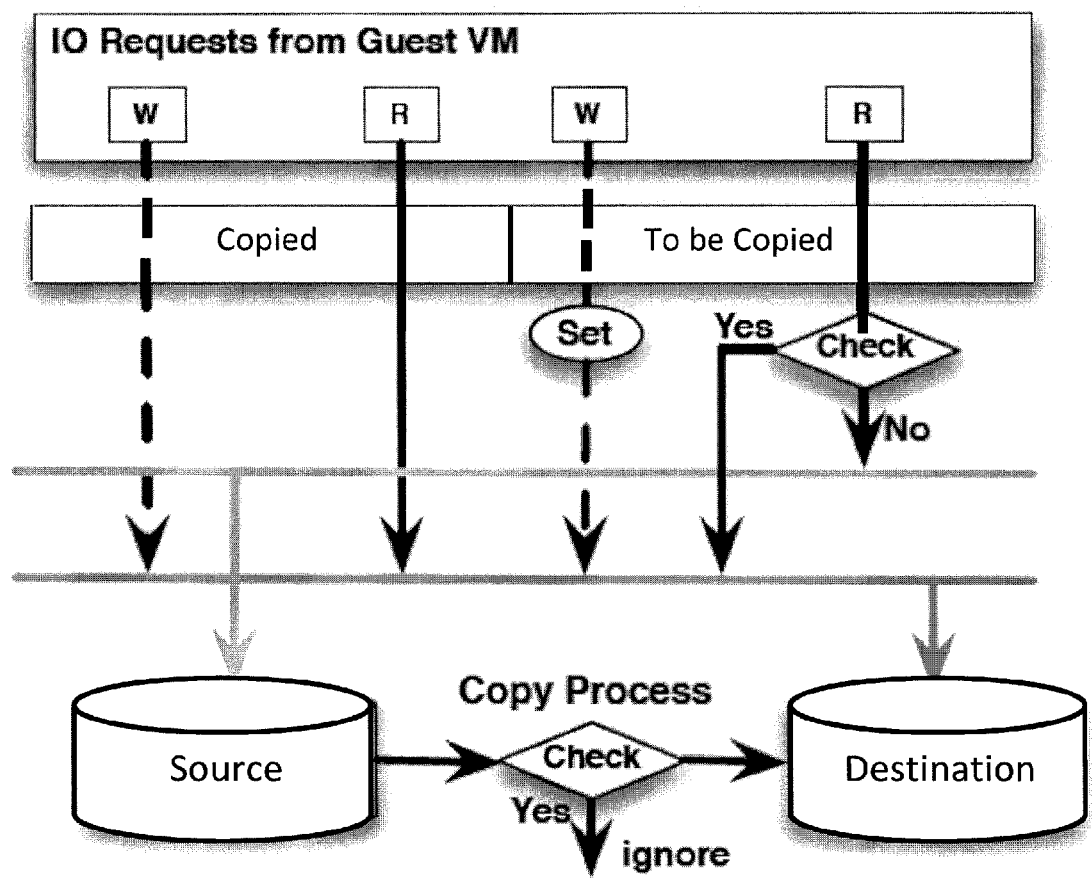
FIG. 7 shows low redundancy storage migration (LR).

Since a VM eventually runs on the destination disk, in a specific embodiment, all the write requests can be issued to the destination during a majority of, substantially all of, and/or the entire storage migration process. Specific embodiments issue write requests to the destination at least 99%, at least 98%, at least 97%, at least 96%, at least 95%, at least 90%, at least 80%, at least 70%, at least 60%, more than 50%, at least 50%, and/or in a range between any two of the identified percentages. FIG. 7 shows a flowchart for an embodiment relates to low redundancy storage migration (LR), where all the write requests from the Guest VM are issued to the destination during the entire storage migration process. By doing so, the updated data appears on the destination disk during the copy process and the read requests from the Guest VM can be aware of which storage has the latest value. To implement an embodiment, issuing all the write requests to the destination during the entire storage migration process, the bitmap from DBT can be leveraged and the disk image can be partitioned into two regions: a copied region, where the copied region's data has already been copied to the destination; and a to-be-copied region, where the to-be-copied region's data is going to be copied. All the writes are issued to the destination directly, while the writes to the to-be-copied region also need to be recorded in the bitmap ("set" in the FIG. 7). The reads to the copied region, or area, fetch data from the destination, while reads to the to-be-copied region, or area, check the bitmap first. If the data block is recorded in the bitmap, reads are issued to the destination. However, if the data block is not recorded in the bitmap, data blocks are read from the source. On the other hand, the copy process can skip the data blocks that are recorded in the bitmap. Requests to the data blocks, which are now being copied by the copy process, are deferred and put into a queue, and handled the same way as the requests to the copied area after the data blocks are released by the copy process.

Advantages of an embodiment where all the write requests are issued to the destination during the entire storage migration process in this manner include: 1) there is zero redundant writes because the merge process in DBT is eliminated and duplicated writes in IO Mirroring are eliminated; 2) the copy process does not need to copy the entire disk image because the data blocks that have been written to the destination by VM write requests can be skipped; 3) the resource competition on the disk is mitigated due to smaller volume of writes, which leads to higher IO performance and a faster copy process. The benefits of this design become more evident when the destination disk (SSD) is faster than the source (HDD): when the storage migration begins, all the write requests are issued to a faster disk (destination), which results in higher IO performance. In addition, the competition between copy process and VM IO requests is handled by a SSD rather than a HDD, which further improves the IO performance and migration time.

Note that implementing the LR scheme introduces additional overhead (e.g., intercepting all IO requests, skipping data blocks in copy process, data recovery upon failure). The implementation described above with respect to an embodiment where all the write requests are issued to the destination during the entire storage migration process in this manner, the total cost of filtering IO requests and setting/checking the bitmap is less than 2 us. In terms of the data recovery, this implementation uses a new process to compress and log the updates to the system hard drives (disk for OS). Upon a failure, the source disk image is recovered using the logged data. Since the logging process is parallel to the migration process and system hard drive is normally separated from data hard drives, the performance impact on such a storage migration implementation is negligible.

Embodiments Utilizing the Faster Disk for IO

The LR scheme essentially runs the VM on the destination at the beginning of storage migration. If the destination has a slower hard drive (HDD) than the source (SSD), all the disk IO burden is laid on the slow hard drives. Therefore, embodiments of the subject invention can further improve the migration cost by exploiting the IO performance of the faster disk.

Source-Based, Low Redundancy Storage Migration Mechanism (SLR)

Figure 8:
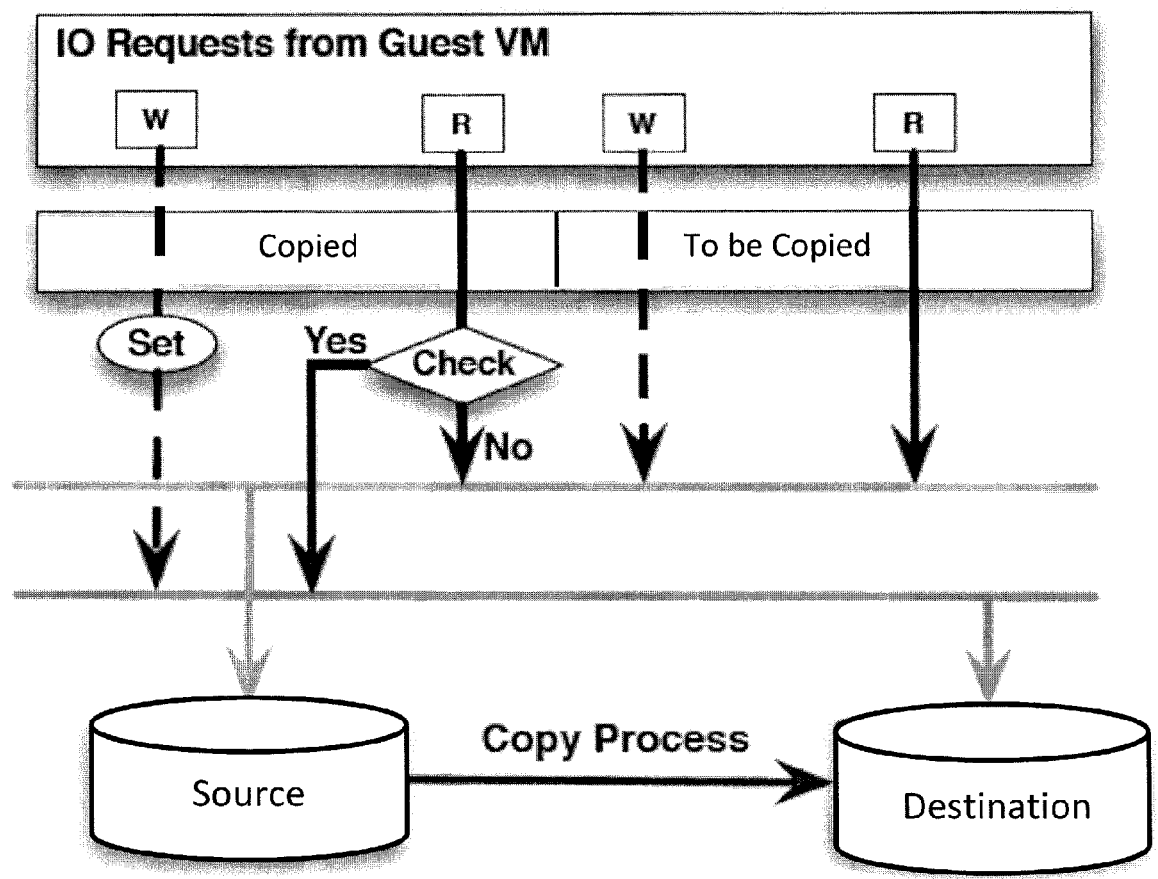
FIG. 8 shows source-based, low redundancy storage migration (SLR).

In the situation where the destination disk is slower than the source, issuing the VM IO requests to the source can achieve better IO performance. Thus, based on LR design, an embodiment of the subject invention relates to a source-based, low redundancy storage migration mechanism (SLR), as shown in FIG. 8. In contrast to the LR design, VM IO requests, and preferably as many VM IO requests as possible, are issued to the source disk. Similar to the LR design, all the IO requests are intercepted and the VM disk image is divided into two regions: a copied region and a to-be-copied region. The IO requests that are issued to the to-be-copied region are issued to the source storage (faster disk). For those write requests that are issued to the copied region, or area, this embodiment issues them to the destination and records them in the bitmap, since doing so keeps the destination image up-to-date without invoking the merge process. All the reads falling in the copied area first check the bitmap to find out whether the requested data has already been updated by writes or not. If the requested data has already been updated by writes, the latest data is on the destination and the read is issued to the destination. Otherwise, the data will be fetched from the faster source disk (SSD). By doing so, most of the IO requests are now issued to the faster source disk.

Compared with traditional storage migration schemes, this embodiment (SLR) reduces redundant writes. Similar to the LR embodiment, there is no merge process or duplicated write requests. Note that with this embodiment, most IO requests are issued to the source disk, which will yield better IO performance than the LR embodiment. In addition, the copy process does not need to be interrupted every time to check the bitmap, which results in better migration time.

The implementation overhead of the SLR embodiment is less than that of the LR embodiment due to the simpler copy process. Also, the recovery process is both simpler and easier since only the write requests issued to the destination need to be logged, which is significantly less than the LR embodiment. However, the SLR embodiment has a limitation, namely, not all the IO requests are issued to the (fast) source disk. Write requests and fraction of read requests to the copied region are issued to the (slow) destination. Thus, in the scenario that the workload keeps updating the data blocks in the copied area, the IO performance of the SLR embodiment becomes similar to running the VM on the slow disk.

Asynchronous IO Mirroring Storage Migration Mechanism (AIO)

Figure 9:
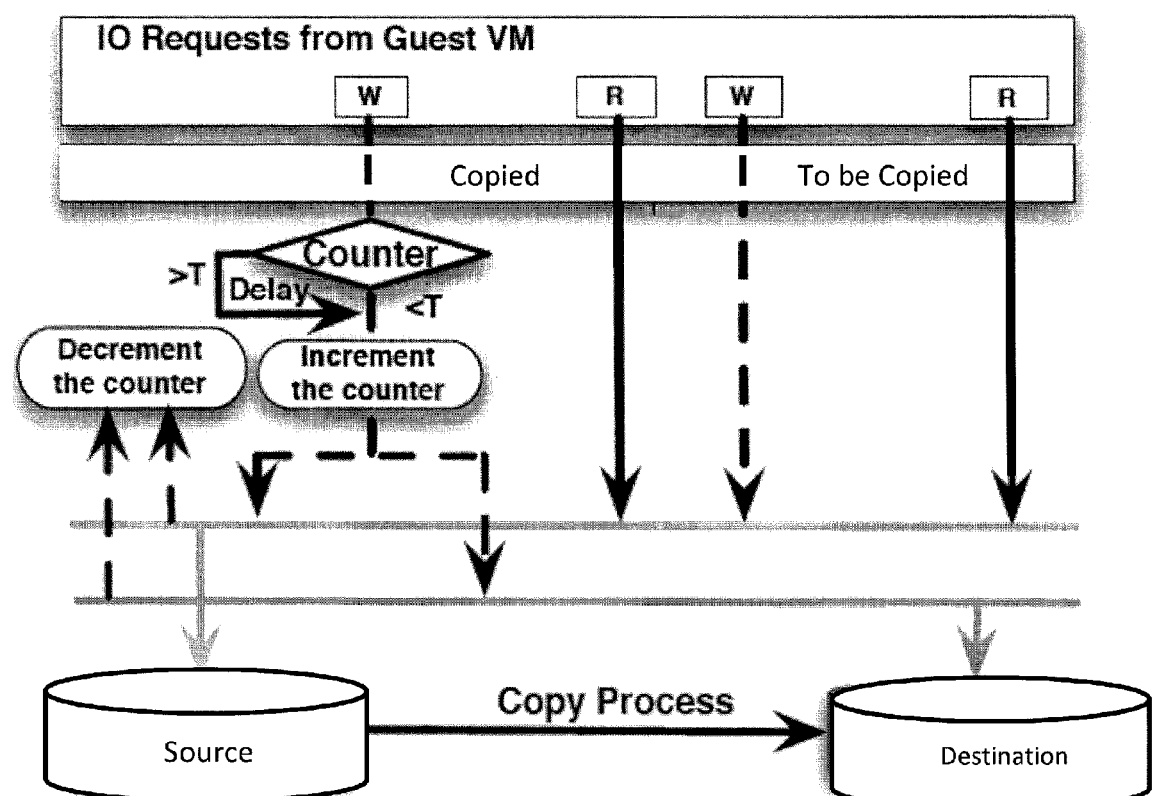
FIG. 9 shows asynchronous IO mirroring storage migration (AIO).

Specific embodiments can utilize asynchronous IO Mirroring storage migration (AIO) (shown in FIG. 9) as a specific embodiment of IO mirroring, to further leverage the faster disk (SSD) and achieve higher IO performance.

In a specific IO mirroring mechanism, which can be utilized with specific embodiments, and can be referred to as standard IO mirroring, the write requests are duplicated in the copied region and issued to both the source and the destination. Due to the synchronization requirement, the slower storage determines IO performance. With another specific embodiment utilizing asynchronous IO mirroring (AIO), an IO request is marked as completed and returned to the VM as soon as one of the duplicated IO operations is accomplished. A counter is used to track the number of unfinished IO operations. The counter is incremented upon writes and decremented when the request to the source and the request to the destination are both completed. The requests to the faster disk will first check the counter to see how many requests are still pending. If the counter is larger than a threshold (T), the write request is delayed by sleeping for, for example, a certain period. The pending write requests can be completed during that period so that the counter becomes smaller than the threshold (T). In real execution, delay does not occur frequently because the pending write requests can be completed during the CPU computation, memory access, and disk reads. In the worst case (workload continuously perform writes), delay keeps occurring, which makes the overall performance as low as running on the slower disk.

Advantages of the AIO embodiment include: 1) all the IO requests will be issued and handled by the faster disk (SSD) under regular IO access patterns, which yields high IO performance; and 2) data recovery is not needed since the source disk always has up-to-date data upon failure.

Compared to the LR and SLR embodiments, the AIO embodiment duplicates IO requests and generates the same amount of redundant writes to the storage devices as embodiment utilizing standard IO Mirroring does. The disk resource competition between the copy process and IO requests becomes more intensive, which may lead to longer migration time.

An Analysis of Migration Cost of Specific Embodiments of the Invention and Further Extension to Massive Storage Migration It is usually desired to have the migration cost (MC) be as low as possible. Which scheme should be used highly depends on the weight $\gamma$ in equation (4). An embodiment incorporating an LR design, with the lowest redundant writes on the device will benefit the lifetime of SSDs, which will result in lower migration cost (MC) for a user who cares more about the lifetime ($\gamma \to 1$). An embodiment incorporating an SLR design takes advantage of the higher IO performance of the source disk while still maintaining the low IO penalty on the device. Users who care about both the IO performance and lifetime of SSDs can incorporate SLR when migrating from SSDs to HDDs. An embodiment incorporating AIO, which maximally exploits high IO performance from the faster disk, can be preferable when high IO performance has top priority ($\gamma \to 0$).

During the entire life cycle of a data center, the weight $\gamma$ can vary dramatically. When the user demands high IO performance for the VM, $\gamma$ can be close to 0 to guarantee low IO penalty. On the other hand, when the SSD is worn out after a period, the lifetime can be the most important factor, which can cause $\gamma \to 1$. Once $\gamma$ is set, a certain migration method (LR, SLR, or AIO) can be chosen, for example based on the MC in equation (4).

Upon storage upgrade or disaster recovery, massive storage migration can be triggered to move all VMs on the storage. The total migration cost for massive storage migration on heterogeneous storage can be further reduced by adaptively mixing LR, SLR, and AIO according to different weights ($\gamma$). As an example, if the SSD's lifetime has top priority ($\gamma \to 1$), VMs that are migrated to or from the SSD can be migrated via LR, which has the least amount of writes to the SSD. Further, by mixing LR, SLR, and AIO in different ways, the overall IO penalty and migration time can be optimized.

Embodiment and Experimental Setup

Embodiments incorporating DBT, LR, SLR, and AIO were implemented in blktap2 backend driver of Xen 4.1.2 [15], which intercepts every disk IO request coming from the VM. In order to track IO requests, a bitmap filter layer in blktap2 driver module (/xen/tools/blktap2/drivers) was implemented. The data sector is dirty if the corresponding bit is set to one. The image copy function in blktap2 control module (/xen/tools/blktap2/control) was also implemented, which can be executed in a separate process alongside with the blktap2 driver module. Data structures, such as bitmap and copy address offset, were shared between both processes. The command line interface was integrated into tap-ctl Linux command so that the storage migration can be triggered using generic Linux commands. The codes for the existing schemes and the LR, SLR, and AIO schemes was integrated into blktap module, which was enabled once the migration command was issued. When all the data was copied to the destination, the disk driver was paused and the file descriptor (fd) was modified so that all the upcoming IO requests were directed to the new disk image. The execution statistics were logged for each scheme under the/var/log directory. Additional design specific functions were also implemented: 1) IO duplication was implemented by memcpy-ing the entire IO requests including address offset, size and data content; 2) Long writes were implemented by injecting constant delay into write requests (the delay was set to be 1 ms and the threshold is set to be 100 in the experiments); and 3) IO requests to the destination disk were handled by a new IO ring structure so that the requests to the source and the destination did not compete for software resources (e.g., queue).

The downtime, migration time, IO performance, and the migration cost were evaluated by using disk or file system benchmarks: Iometer [16], Dbench [17], IOzone[18] and Linux kernel 2.6.32 compilation. The workloads were run in a VM with 1 vCPU and 2 GB RAM. The input parameters of our benchmarks (e.g., outstanding IO (OIO) for Iometer, process number (proc) for Dbench, input size for IOzone) were varied to simulate different I/O size and access patterns. Further, kernel compilation, which is known as a comprehensive benchmark on CPU, memory, and IO, was also used in the evaluation. The virtual machines ran on self-customized servers with hardware specifications shown in Table 4. Two SSD disk arrays and Two HDD disk arrays were used as data drives, while the local storage used HDD to host Xen+OS and log files. Data Drives were connected to the server via 6 Gb/s Data Link interface. Similar platform configurations were used in [10] from VMware. The experimental VM has a 10 GB system disk running Debian Squeeze 6.0 and a separate data disk (size ranging from 2 GB to 30 GB). To avoid the interference of OS behavior, the migration schemes and benchmarks were performed on the data disk.

TABLE 4

Hardware Specs for Our Experiment Platform

| CPU | 3.4 GHz Intel core i7 |
|---|---|
| Motherboard | ASUS Maximus V Extreme |
| Physical Memroy | 8 GB |
| Hard Drives | Seagate 7200 rpm hard drives |
| | Avearge Data Rate:125 MB/s |
| Solid State Drives | Intel 520 Series MLC Internal SSD |
| | 4 KB Random Reads 50,000 IOPS |
| | 4 KB Random Writes 60,000 IOPS |
| Disk Interconnect | 6 Gb/s Data Link |

Evaluation Results and Analysis
Downtime

Table 5 shows the downtime when the VM was migrated with kernel compilation benchmark running inside. As can be seen, the downtime for DBT is worse when the destination is an HDD (rather than an SSD) because the final copy of dirty data block had to be written to the HDD. Further, when workloads had intensive IO requests and large IO working set, the merge process of DBT could not even converge when the destination is a HDD. IO Mirroring, LR, SLR, and AIO designs yield stable downtime. The reason is that IO Mirroring, LR, SLR, and AIO designs did not have a merge process and the destination had the up-to-date data when the entire image was copied.

TABLE 5

The downtime of live storage migration

| | DBT | IO Mirroring | LR-Design | SLR-Design | AIO-Design |
|---|---|---|---|---|---|
| SSD to SSD | 232 ms | 198 ms | 197 ms | 120 ms | 124 ms |
| HDD to SSD | 266 ms | 249 ms | 197 ms | 140 ms | 200 ms |
| SSD to HDD | 4000 ms | 298 ms | 200 ms | 150 ms | 201 ms |
| HDD to HDD | 900 ms | 199 ms | 246 ms | 179 ms | 260 ms |

Impact on SSD Lifetime

In an embodiment, the write requests during the storage migration can be modified as: $\alpha\%$ of write requests are in the copied area while (1-$\alpha\%$) of write requests are in the to-be-copied area, and 3% is the percentage of writes that are performed on different block addresses (a.k.a the write working set size of workloads). Table 6 summarizes the percentage of write requests that are issued to the SSD under different scenarios:

TABLE 6

Percentage of writes requests that are issued to SSD

| | DBT | IO Mirroring | LR-Design | SLR-Design | AIO Design |
|---|---|---|---|---|---|
| SSD to SSD | 1 + β% | 1 + α% | α% | 1 | 1 + α% |
| HDD to SSD | β% | α% | α% | α% | α% |
| SSD to HDD | 1 | 1 | 0 | 1 - α% | 1 |
| HDD to HDD | 0 | 0 | 0 | 0 | 0 |

In this way, (1–α %) of the writes are skipped by the copy process for LR design. To be consistent for comparison purposes, and to keep the amount of data writes in the copy process the same across all five schemes, those (1–α %) writes are counted into the copy process for LR, which means only α% of writes are issued to the destination. As shown in Table 6, LR has the lowest amount of data writes to the SSD. SLR has smaller amount of data writes than DBT and IO Mirroring, while AIO has the same amount of data writes as IO Mirroring. Thus, implementing an embodiment incorporating LR can mitigate the wear-out issue for SSDs.

Figure 10A:
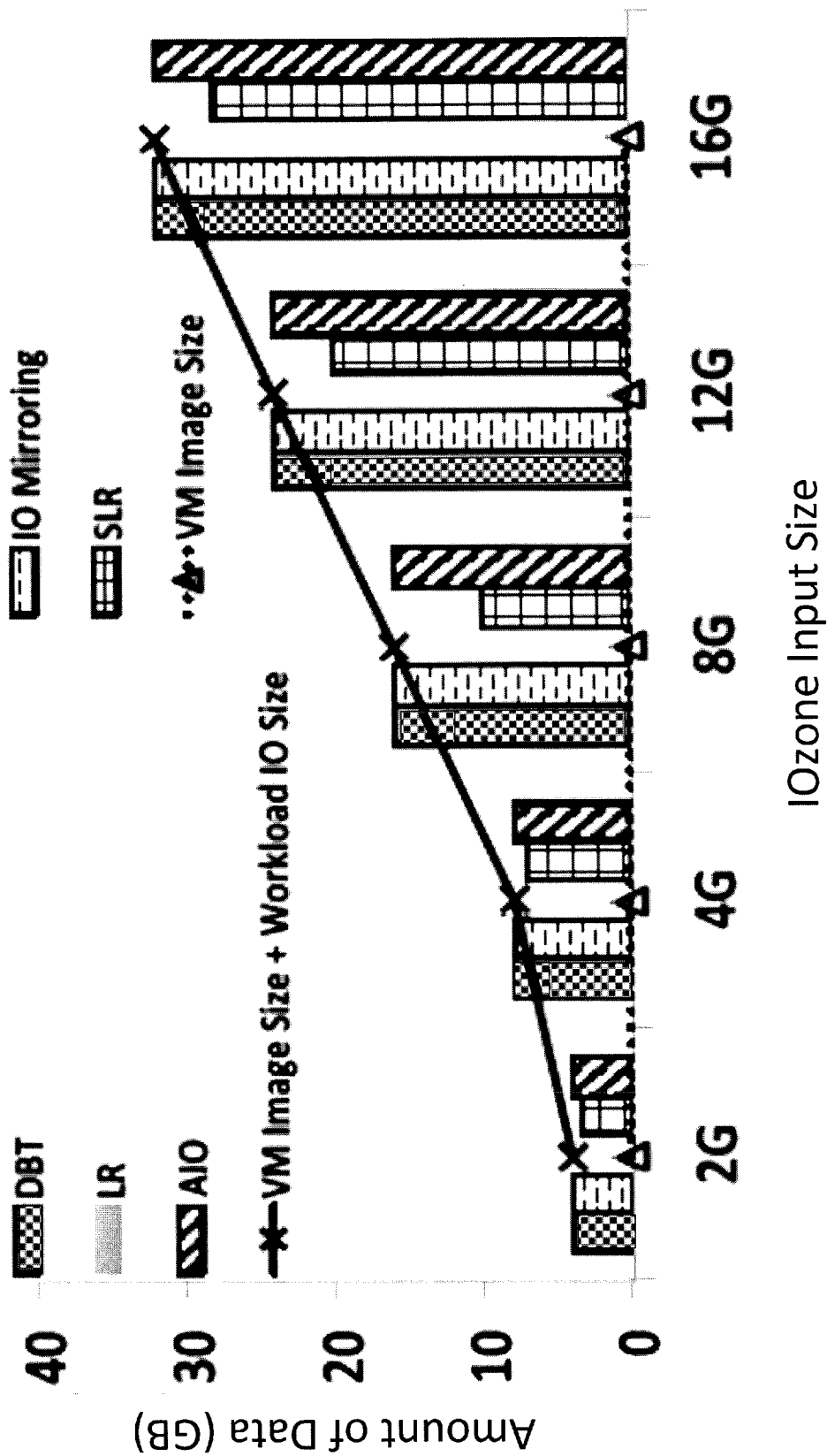
FIG. 10a shows the total amount of data that is written to SSD when migrating 30 GB VM image from SSD to HDD.
Figure 10B:
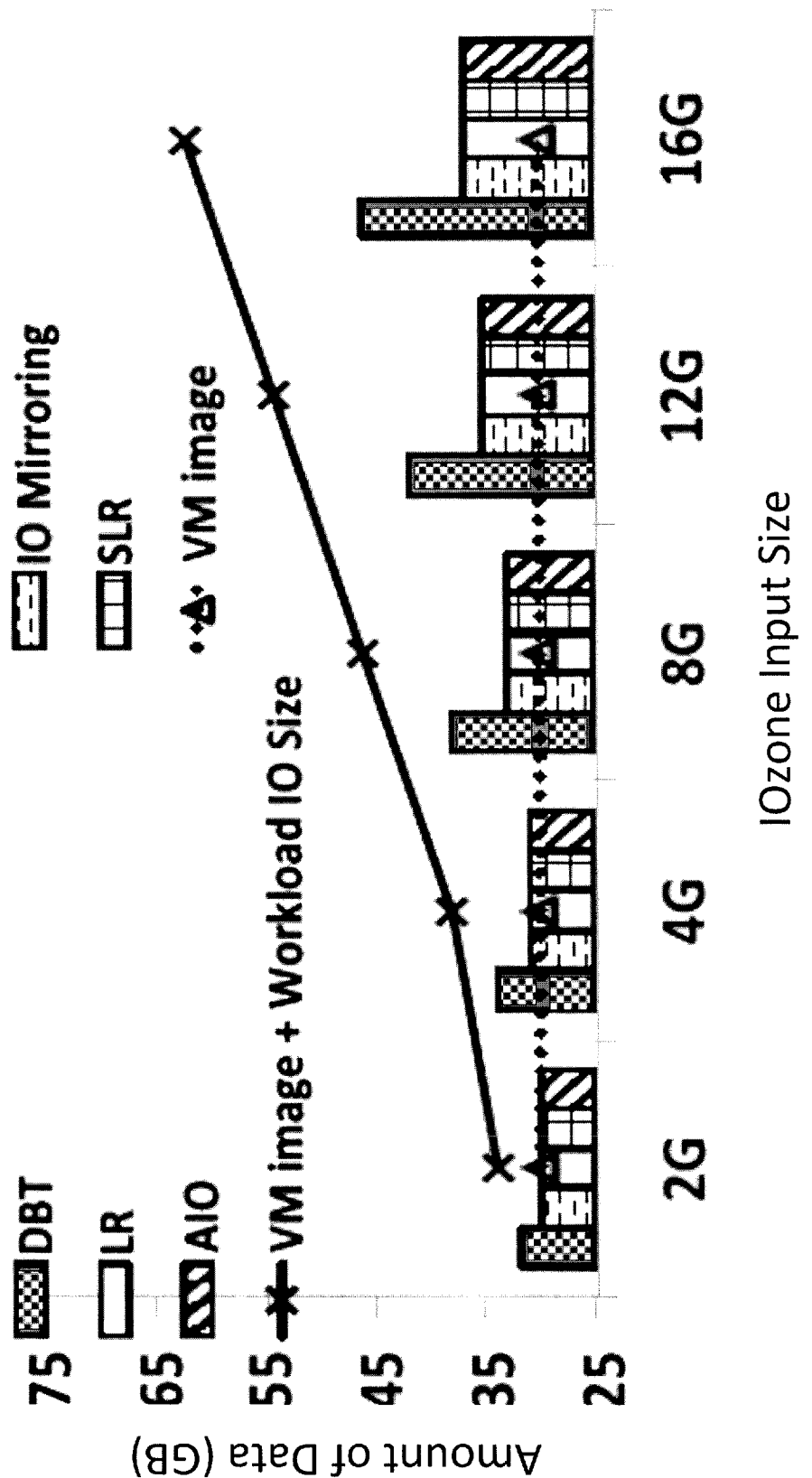
FIG. 10b shows the total amount of data that is written to SSD when migrating 30 GB VM images from HDD to SSD.
Figure 10C:
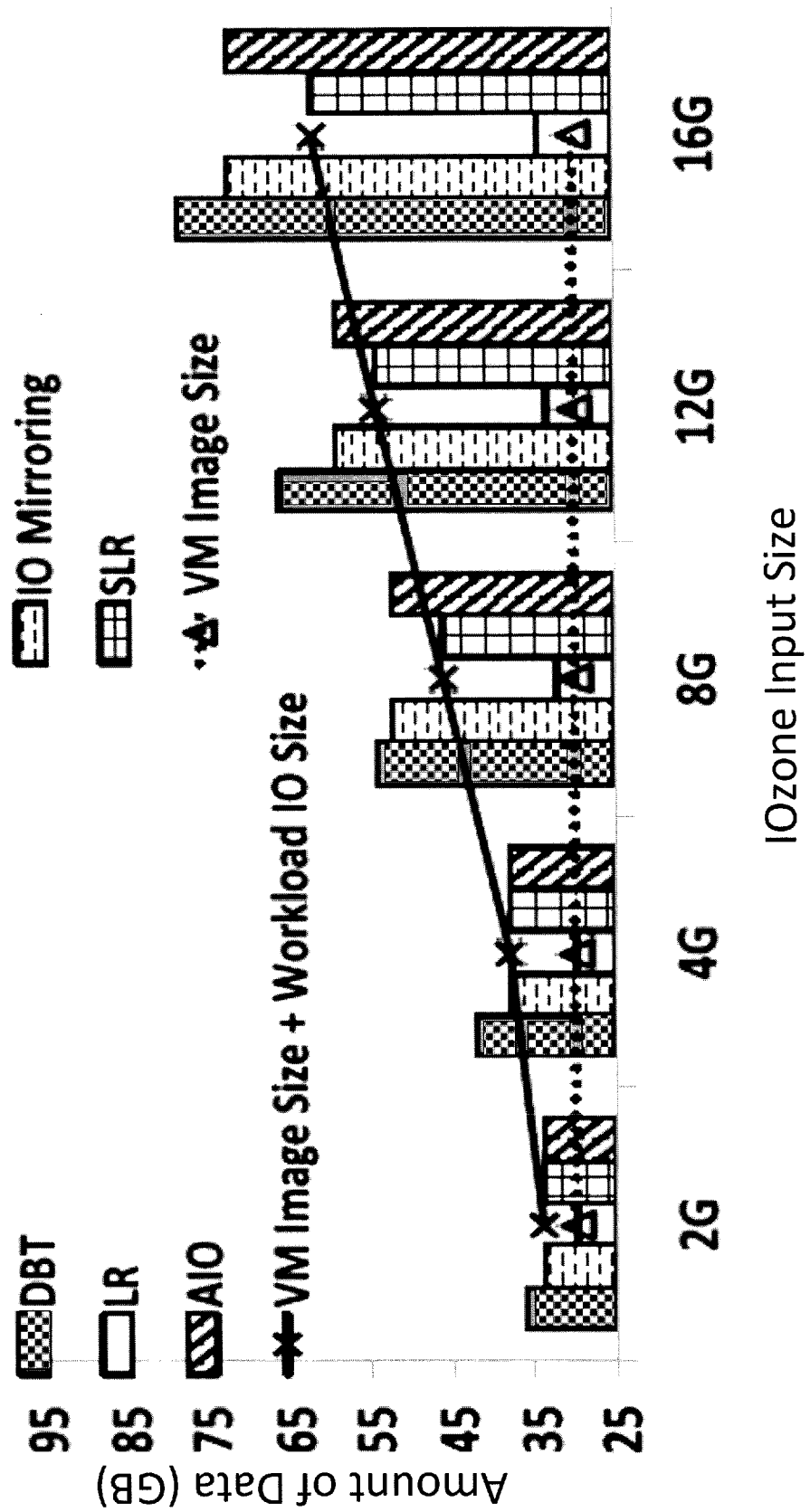
FIG. 10c shows the total amount of data that us written to SSD when migrating 30 GB VM images from SSD to SSD.

To verify this, IOzone can be run with different input parameters for migrating 30 GB VM image on an SSD involved storage environment. In the case of migrating a VM disk image from an SSD to an HDD, as shown in FIG. 10a, which shows the total amount of data that is written to SSD when migrating 30 GB VM image, LR has zero writes to the SSD because all writes are issued to the destination. When migrating from an HDD to an SSD, as shown in FIG. 10b, which shows the total amount of data that is written to SSD when migrating 30 GB VM image, DBT will have more data writes to the SSD than the LR, SLR, IO mirroring, and AIO, because β% is larger than α% for this benchmark. When both source and destination are SSDs, as shown in FIG. 10c, which shows the total amount of data that is written to SSD when migrating 30 GB VM image, LR produces the smallest amount of data writes, while DBT yields the largest amount of data writes.

In general, DBT has the worst performance, while LR has the best, in term of redundant data writes to SSDs. Since redundant data writes affect the remaining lifetime of SSDs, LR best preserves SSD lifetime during VM live storage migration, as compared with SLR, IO mirroring, AIO, and DBT

IO Penalty, Migration Time, and Migration Cost

In this section, we compare DBT, IO Mirroring, LR, SLR, and AIO in terms of migration time ($\lambda_{migration\ time}$), IO penalty ($\lambda_{10}$), and Migration Cost (MC). The benchmarks with different input parameters are shown in Table 7.

TABLE 7

Benchmark list

| Name | Benchmarks | Notes |
|---|---|---|
| IOM_4 | IO meter with OIO = 4 | IO meter is configured as 75% |
| IOM_16 | IO meter with OIO = 16 | reads and 25% writes running in VM with 20 GB disk image |
| Db_2 | Obench with proc = 2 | O bench is configured to push |
| Db_16 | Obench with proc = 16 | the limits of throughput (−R 99999) running in VM with 20 GB |
| IOZ_R | IO zone read file test | IO zone is used to test the IO |
| IOZ_W | IO zone write file test | Performance during the migration |
| KC_10 | Kernel Compilation in 10 GB image | Kernel Compilation is used to test out schemes in |
| KC_20 | Kernel Compilation in 20 Gb image | comprehensive, real workloads |

Migrating VMs from HDDs to SSDs

Figure 11A:
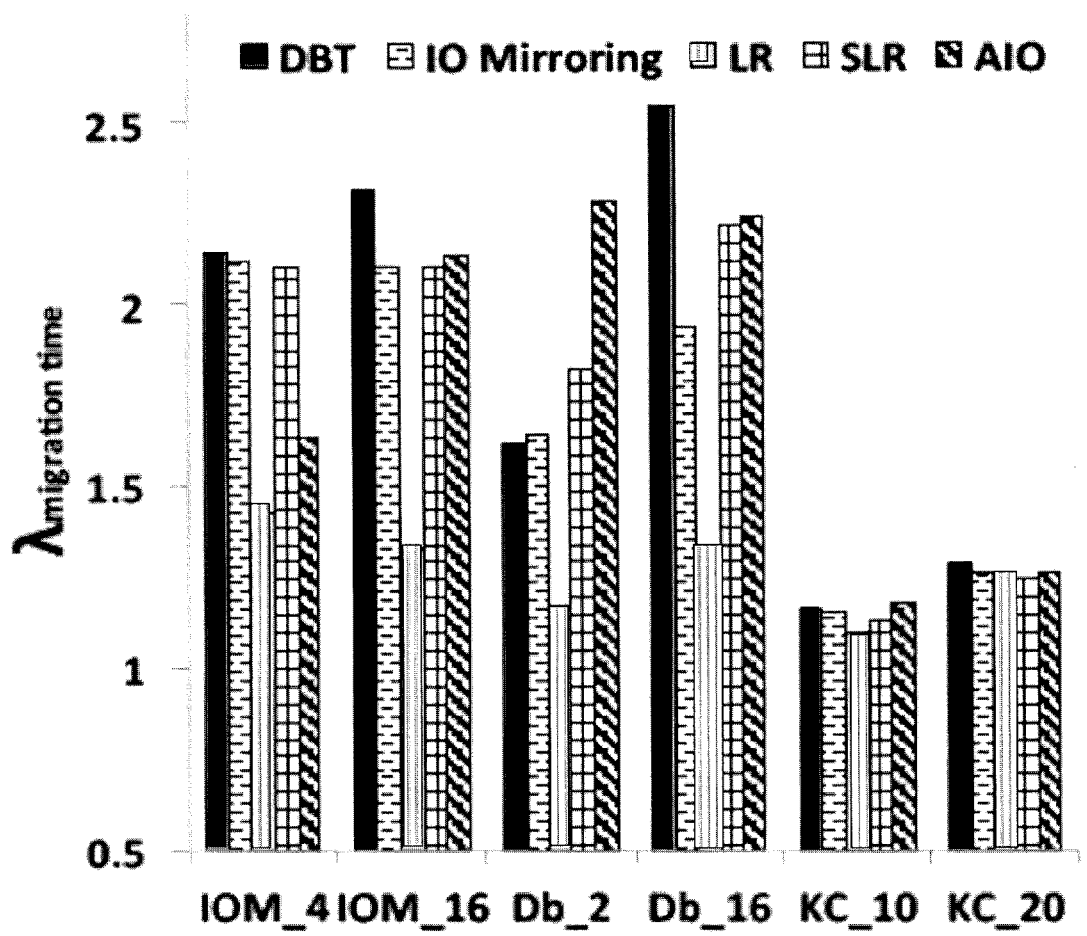
FIG. 11a shows $\lambda_{migration\ time}$ for the case that a VM is migrated from HDD to SSD.
Figure 11B:
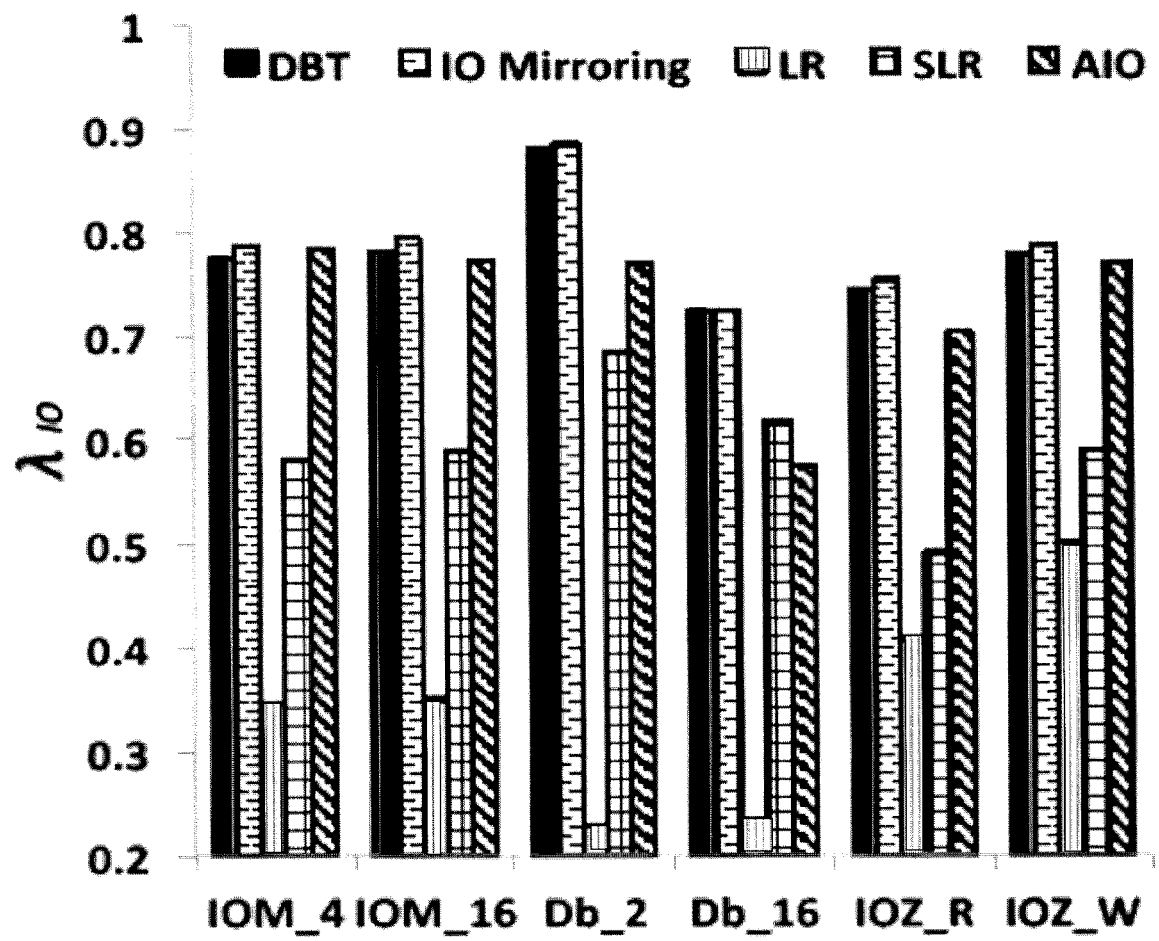
FIG. 11b shows $\lambda_{10}$ for the case that a VM is migrated from HDD to SSD.
Figure 11C:
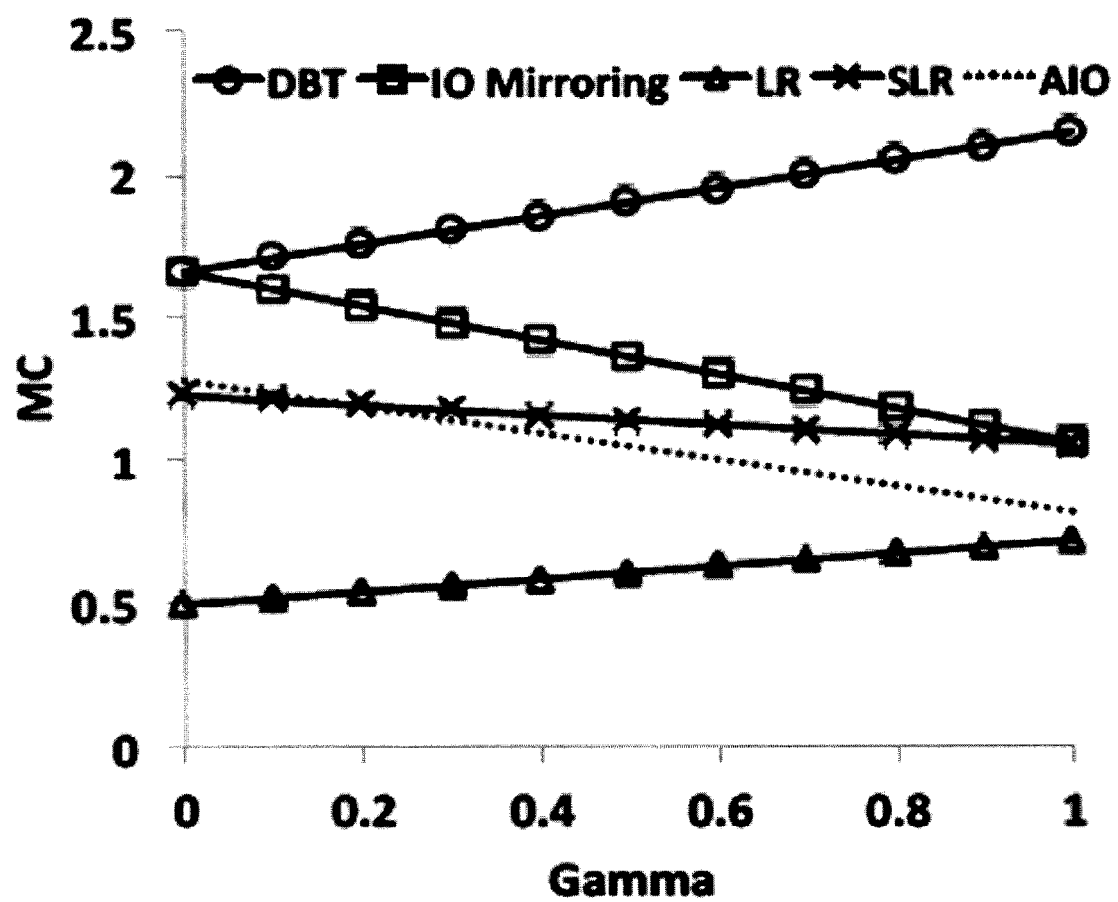
FIG. 11c shows MC for IOmeter OIO=4 vs. gamma for the case that a VM is migrated from HDD to SSD.
Figure 11D:
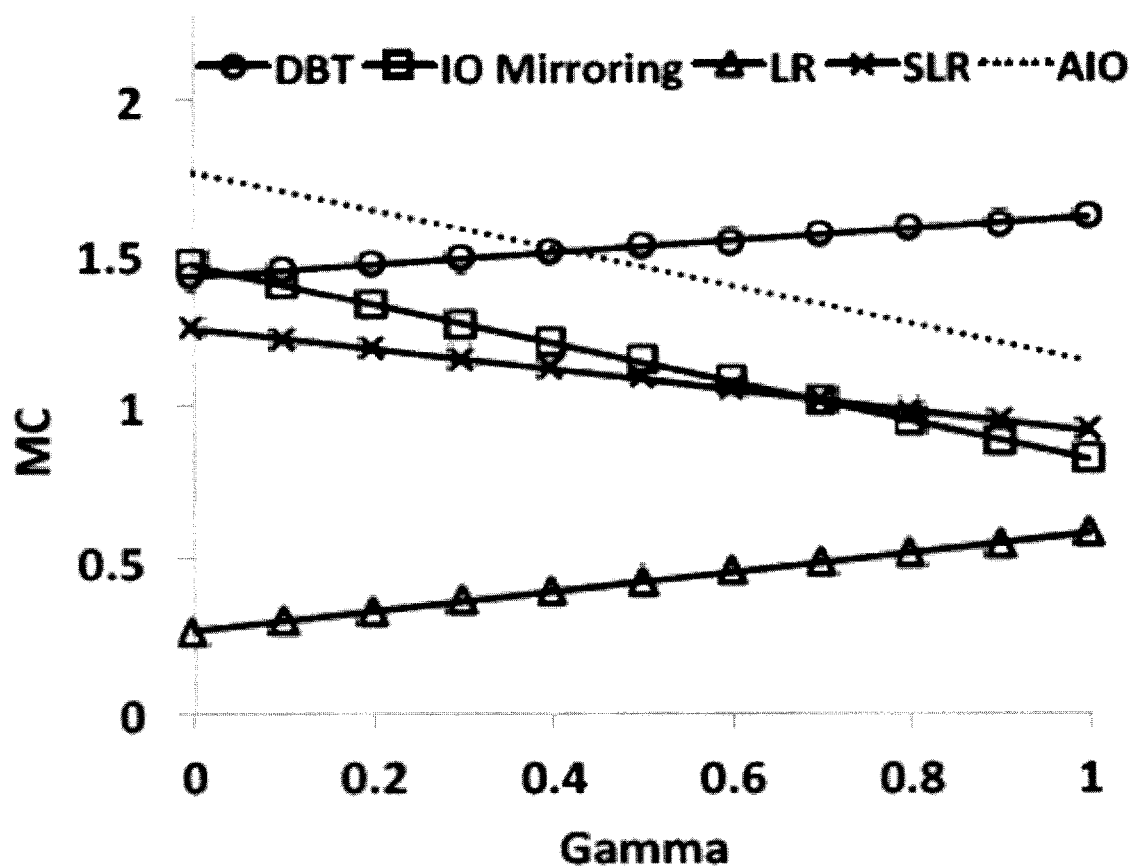
FIG. 11d shows MC for Dbench proc=16 v. gamma for the case that a VM is migrated from HDD to SSD.

As shown in FIGS. 11a and 11b, which show results for the case that VM is migrated from HDD to SSD, LR exhibits advantages for both migration time (56% shorter than traditional design) and IO performance (at least 35% less IO penalty compared with DBT and IO mirroring). Issuing IO requests to the destination not only benefits the IO performance, but also decreases the migration time, by skipping updated data blocks and mitigating IO contention. Although SLR and AIO are not designed specifically for this case, they both have better migration time and IO performance than DBT and IO mirroring. By further considering the amount of redundant data writes ($\lambda$wear out), the migration cost for two benchmarks are shown in FIGS. 11c and 11d, which show results for the case that VM is migrated from HDD to SSD. As shown, LR has the lowest migration cost independent of what the weight $\gamma$ is. Although LR does not exhibit advantages in terms of SSD data writes in this situation, LR leverages the fast access speed from SSDs to the greatest extent possible, which not only mitigates the IO penalty, but also decreases the migration time. Referring to FIGS. 11c and 11d, as the weight gets close to 1, the migration cost for DBT and LR are increased, because $\lambda$wear out is larger than $\lambda$10 for DBT and LR. In contrast, the migration cost for IO Mirroring, SLR, and AIO are reduced when $\gamma \rightarrow 1$. This is because IO mirroring, SLR, and AIO have smaller $\lambda$10 than $\lambda$wear out. In this situation, when using LR the benefits of having high IO performance and shorter migration time overwhelm the effect of $\lambda$wear out. Thus, LR yields the least migration cost in all these situations, when a VM is migrated from an HDD to an SSD.

Migrating VMs from SSDs to HDDs

Figure 12A:
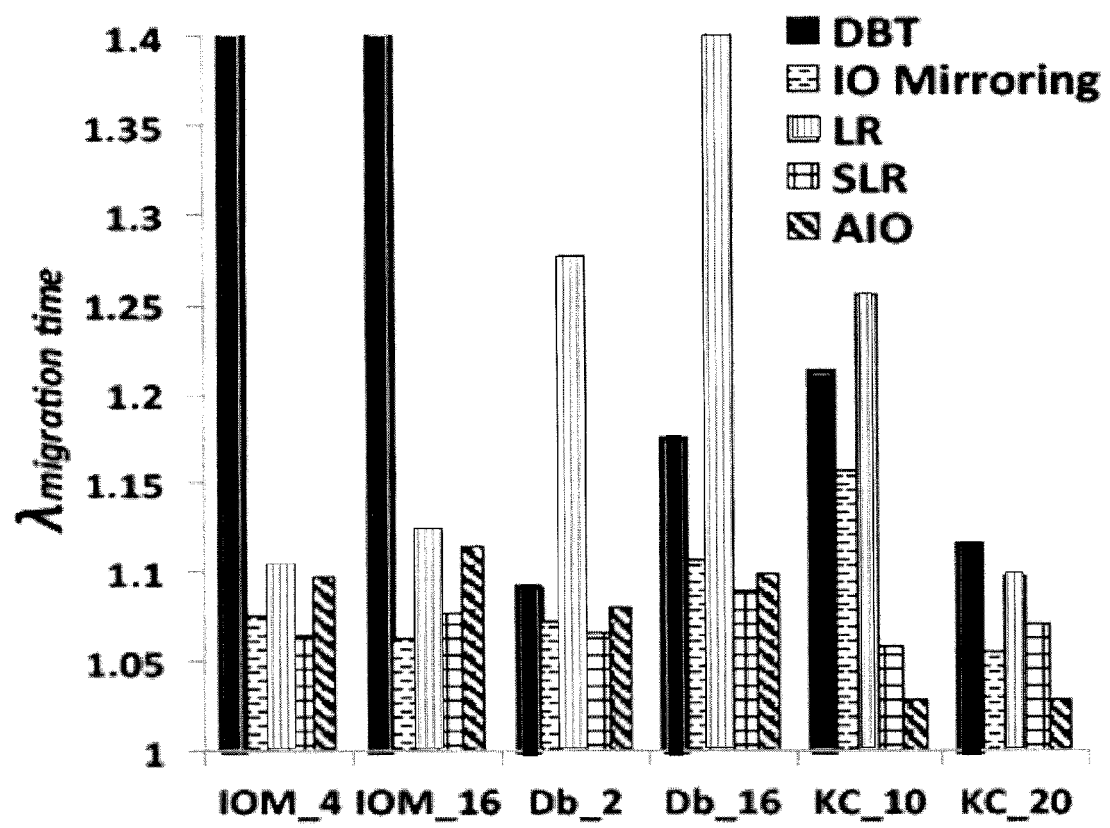
FIG. 12a shows $\lambda_{migration\ time}$ for the case that a VM is migrated from SSD to HDD.
Figure 12B:
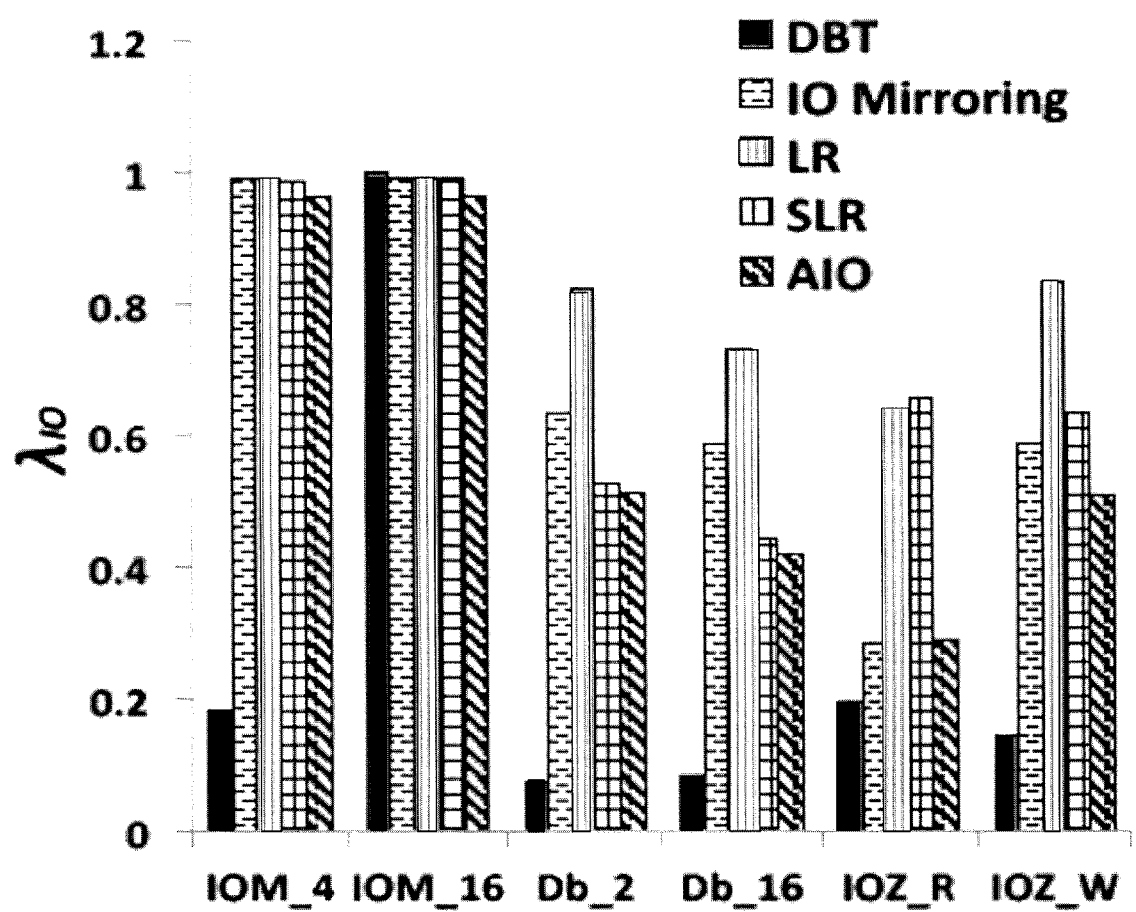
FIG. 12b shows $\lambda_{10}$ for the case that a VM is migrated from SSD to HDD.

Referring to FIGS. 12a and 12b, which show results for the case that VM is migrated from SSD to HDD, when migrating VMs from SSDs to HDDs, SLR has the shortest migration time on average, while AIO has the least IO penalty. Since SLR uses the source (SSD) to handle IO requests and generates less redundant writes, the copy process can consume more disk bandwidth, which results in shorter migration time. On the other hand, AIO takes advantage of the faster disk all the time, which leads to lower IO penalty. Note that DBT is excluded from the comparison due to DBT incurring frequent failures, as the merge process takes an extremely long time.

As discussed above, LR has zero writes to the SSD in this situation, which means LR has an edge in preserving SSD's lifetime.

Figure 12C:
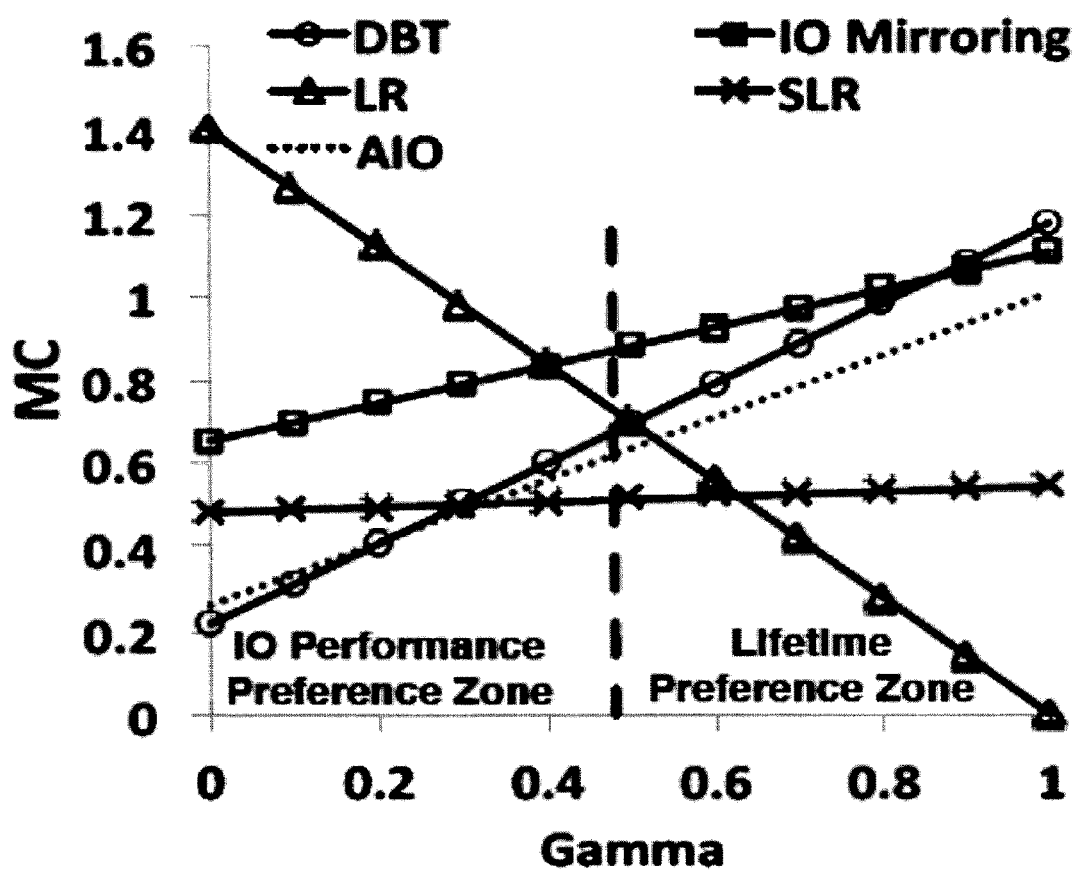
FIG. 12c shows MC for IOmeter OIO=4 vs. gamma for the case that a VM is migrated from SSD to HDD.
Figure 12D:
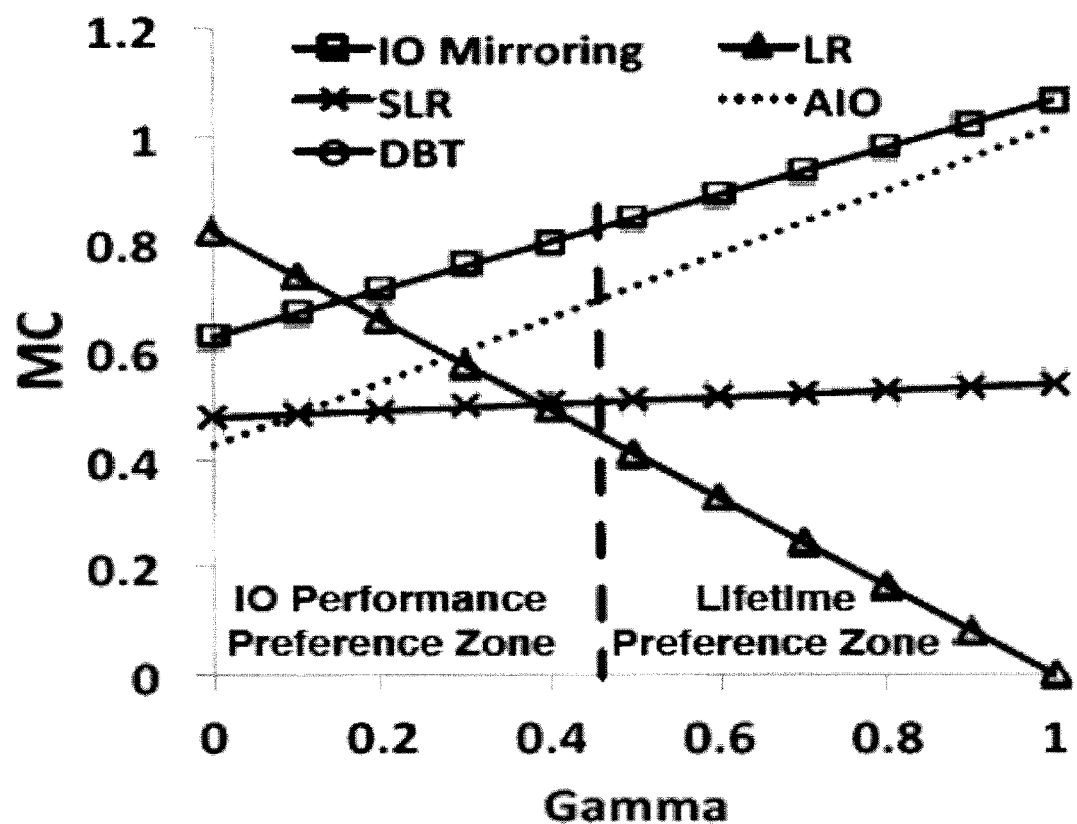
FIG. 12d shows MC for Dbench proc=16 v. gamma for the case that a VM is migrated from SSD to HDD.

FIGS. 12c and 12d show migration cost as weight increases from 0 to 1 for the case that VM is migrated from SSD to HDD. The area where $\gamma$ is larger than 50% is defined as a Lifetime Preference Zone, which includes situations where the SSD wear-out issue is considered a top priority; the area where $\gamma$ is less than 50% is defined as IO Performance Preference Zone, which includes situations where a high IO performance is preferred. Referring to FIGS. 12c and 12d, LR has a relatively low migration cost in the Lifetime Preference Zone due to zero writes to SSDs. In addition, the more $\gamma$ approaches 1, the less the migration cost is for LR. In the IO Performance Preference Zone, AIO is more desirable as $\gamma$ is reduced. As SLR maintains the balance between migration time, IO penalty, and the amount of SSD data writes, SLR has the lowest migration cost when $\gamma$ is around 0.5.

Regarding the trend curve for migration cost, the slope for LR is negative, which means that the migration cost for LR keeps decreasing as the weight increases toward 1. However, the migration cost will increase for the other four designs as $\gamma$ increases. Thus, when migrating from SSDs to HDDs, the weight determines which design has the lowest migration cost. Accordingly, if IO performance is a high, or the highest, priority, AIO is preferred; if SSD wear-out is the main concern, LR is preferred; if the IO performance and SSD lifetime are equally important, SLR yields the lowest migration cost.

Migrating VMs from SSDs to SSDs

Figure 13A:
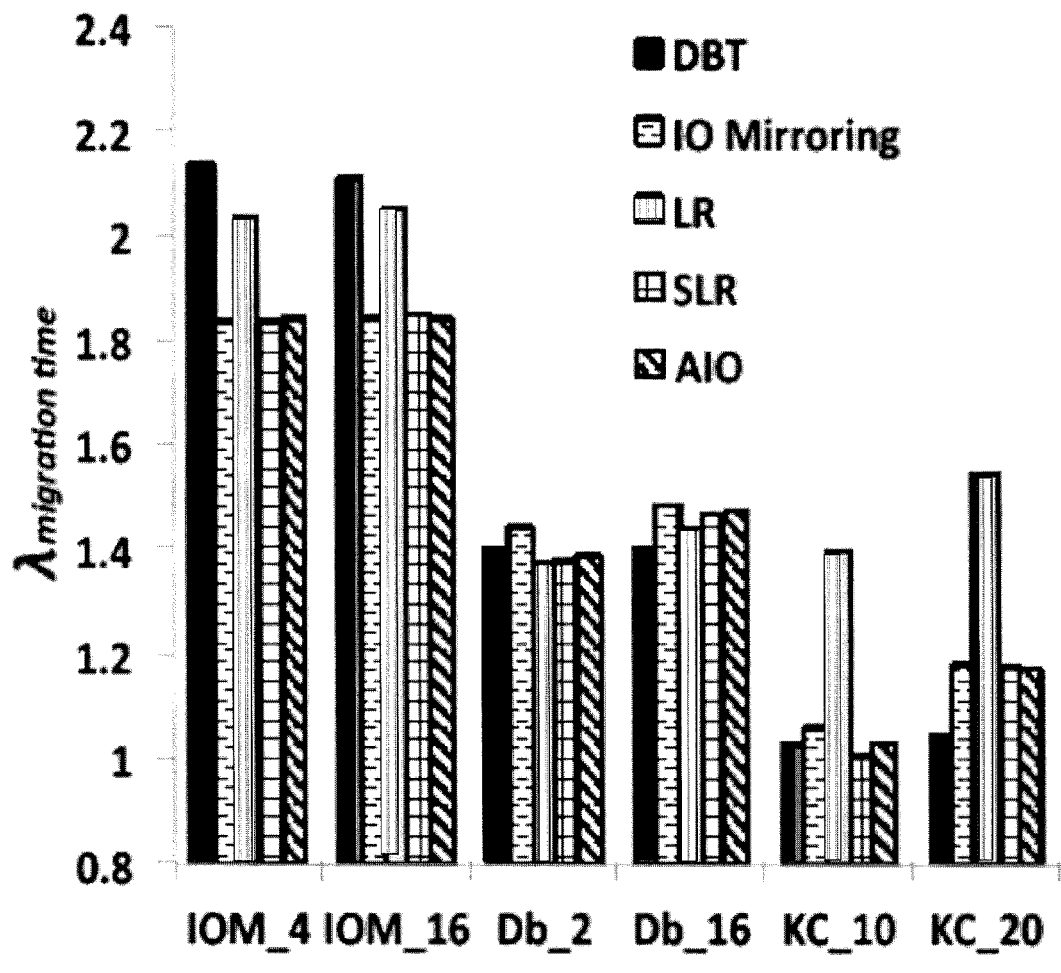
FIG. 13a shows $\lambda_{migration\ time}$ for the case that a VM is migrated from SSD to SSD.
Figure 13B:
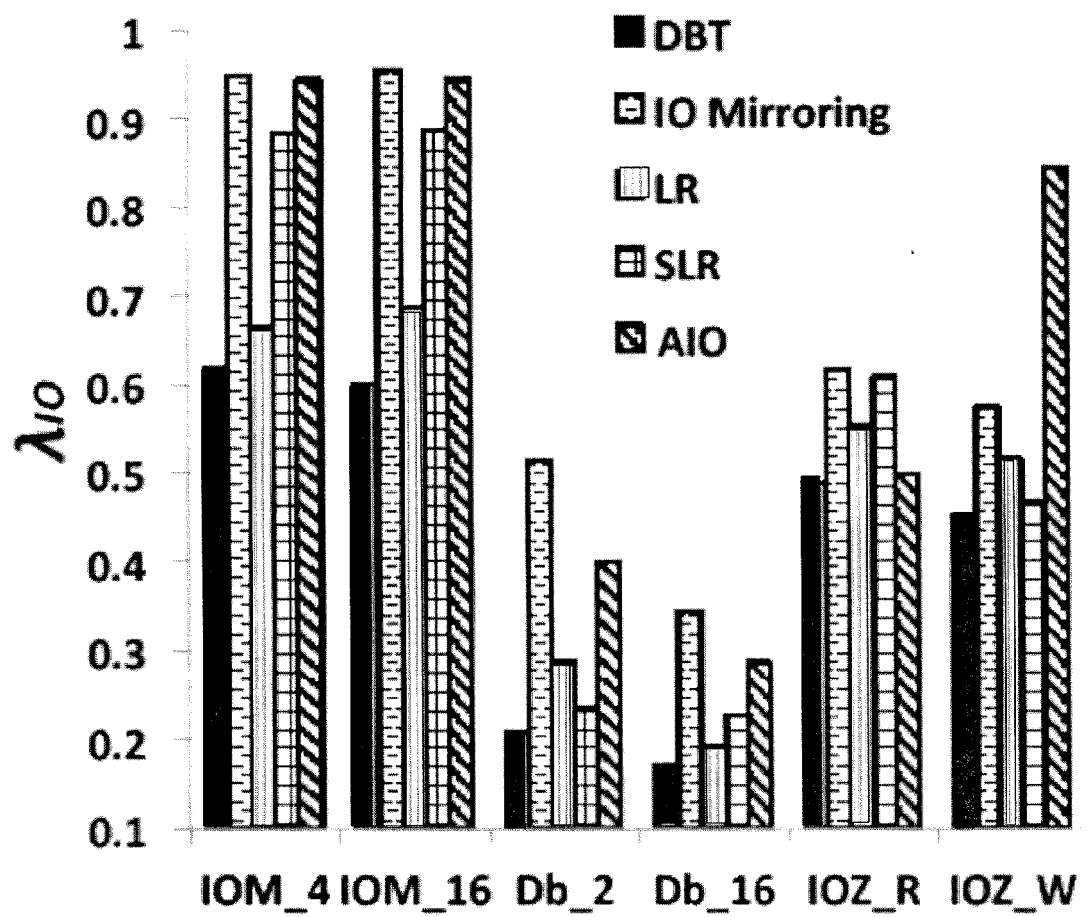
FIG. 13b shows $\lambda_{10}$ for the case that a VM is migrated from SSD to SSD.
Figure 13C:
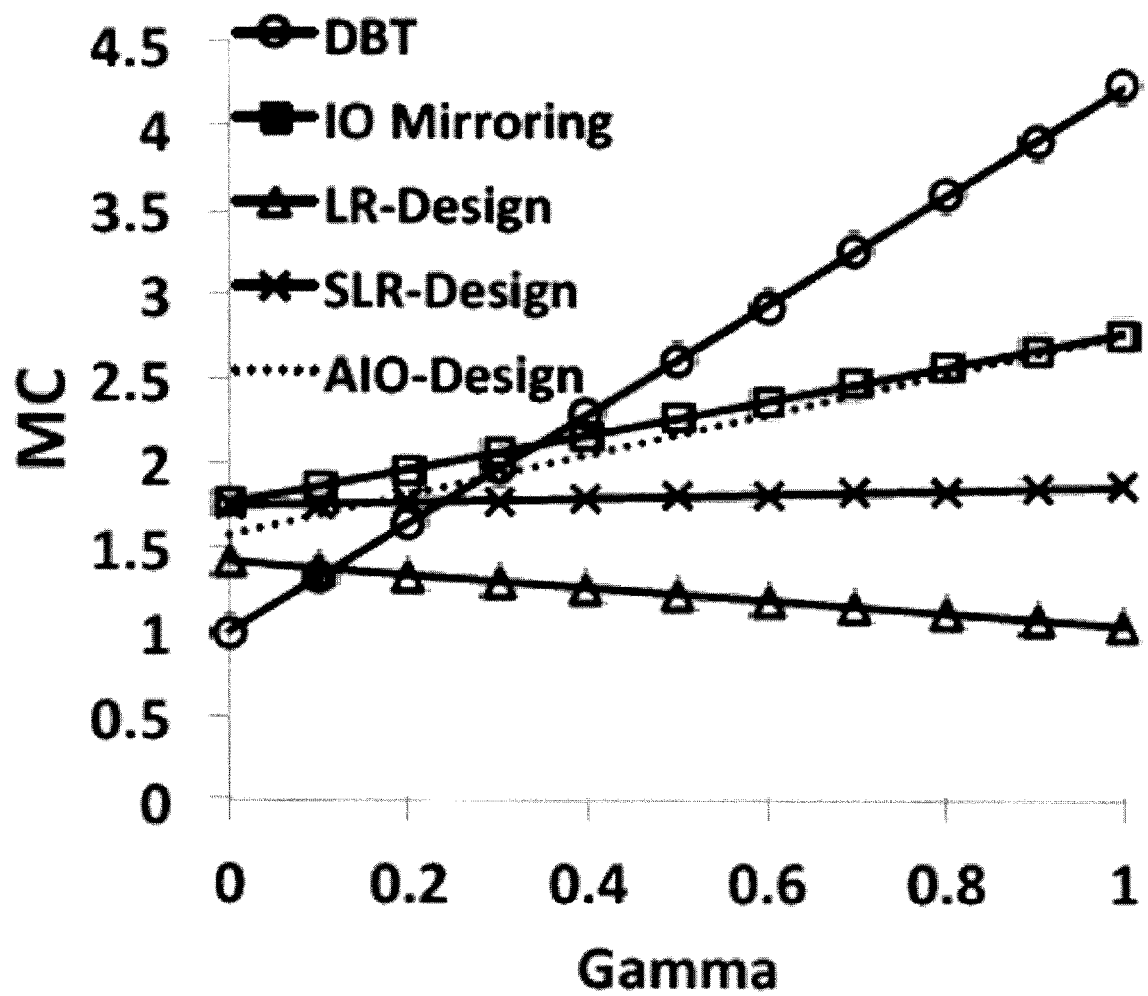
FIG. 13c shows MC for IOmeter OIO=4 vs. gamma for the case that a VM is migrated from SSD to SSD.
Figure 13D:
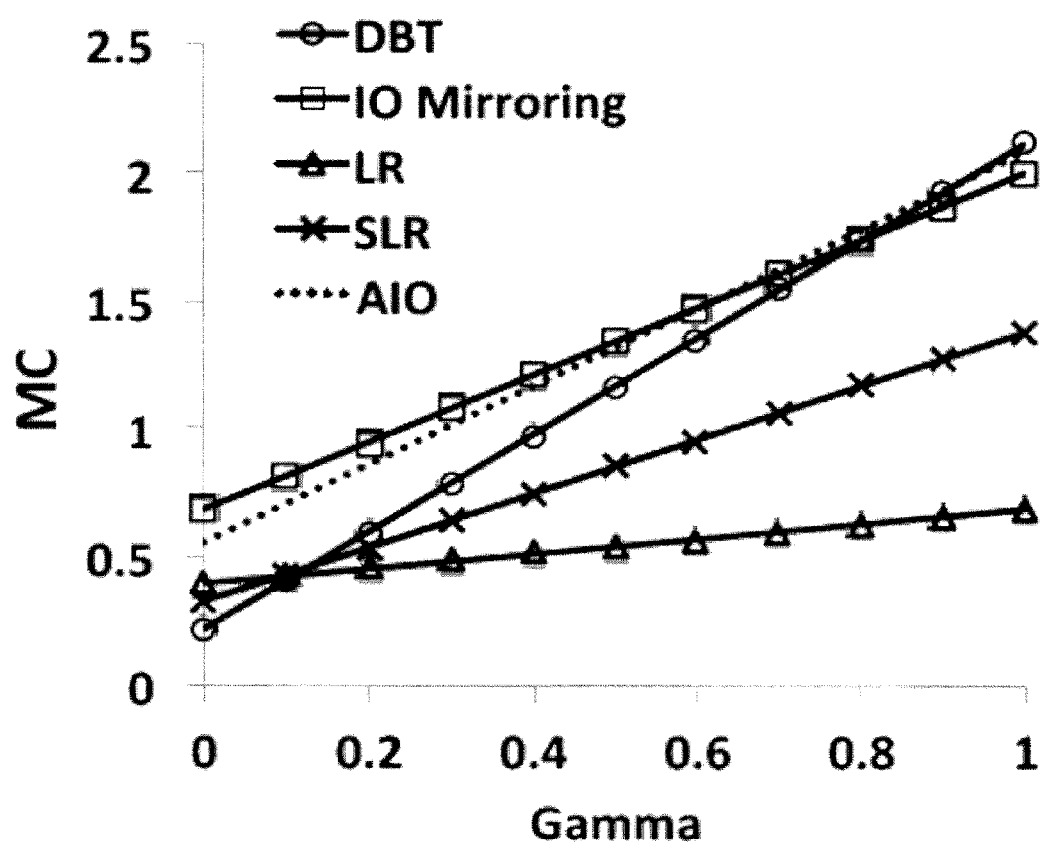
FIG. 13d shows MC for Dbench proc=16 v. gamma for the case that a VM is migrated from SSD to SSD.

When a VM is migrated from SSDs to SSDs, issuing requests to source or destination does not affect the migration time and/or IO performance significantly. Regarding migration time, as shown in FIG. 13a, which shows results for the case that VM is migrated from SSD to SSD, on average, SLR and AIO have a slightly shorter migration time, and LR has a slightly longer migration time, because of the overhead to check bitmap in the copy process. In terms of IO penalty, DBT has the least IO penalty, and LR has the second lowest IO penalty, as shown in FIG. 13b, which show results for the case that VM is migrated from SSD to SSD. However, DBT generates the largest amount of data writes to the SSD, while LR has the least amount of data writes to the SSD, as discussed above. Regarding migration cost, referring to FIGS. 13c and 13d, which show the results for the case that VM is migrated from SSD to SSD LR yields the least cost, except when the weight ($\gamma$) is 0. In addition, the migration cost for DBT increases faster than others as the weight increases, because DBT has the largest slope. SLR, although yielding slightly more migration cost when $\gamma$=0, has a relatively lower migration cost than DBT when $\gamma$ lies between 0.1 and 1. Accordingly, SLR is a good, and likely the best, choice when IO performance is a top priority. For the cases where $0.2 < \gamma < 1$, LR is a good, and likely the best, choice, as LR has the lowest migration cost.

Migrating VMs from HDDs to HDDs

Figure 14A:
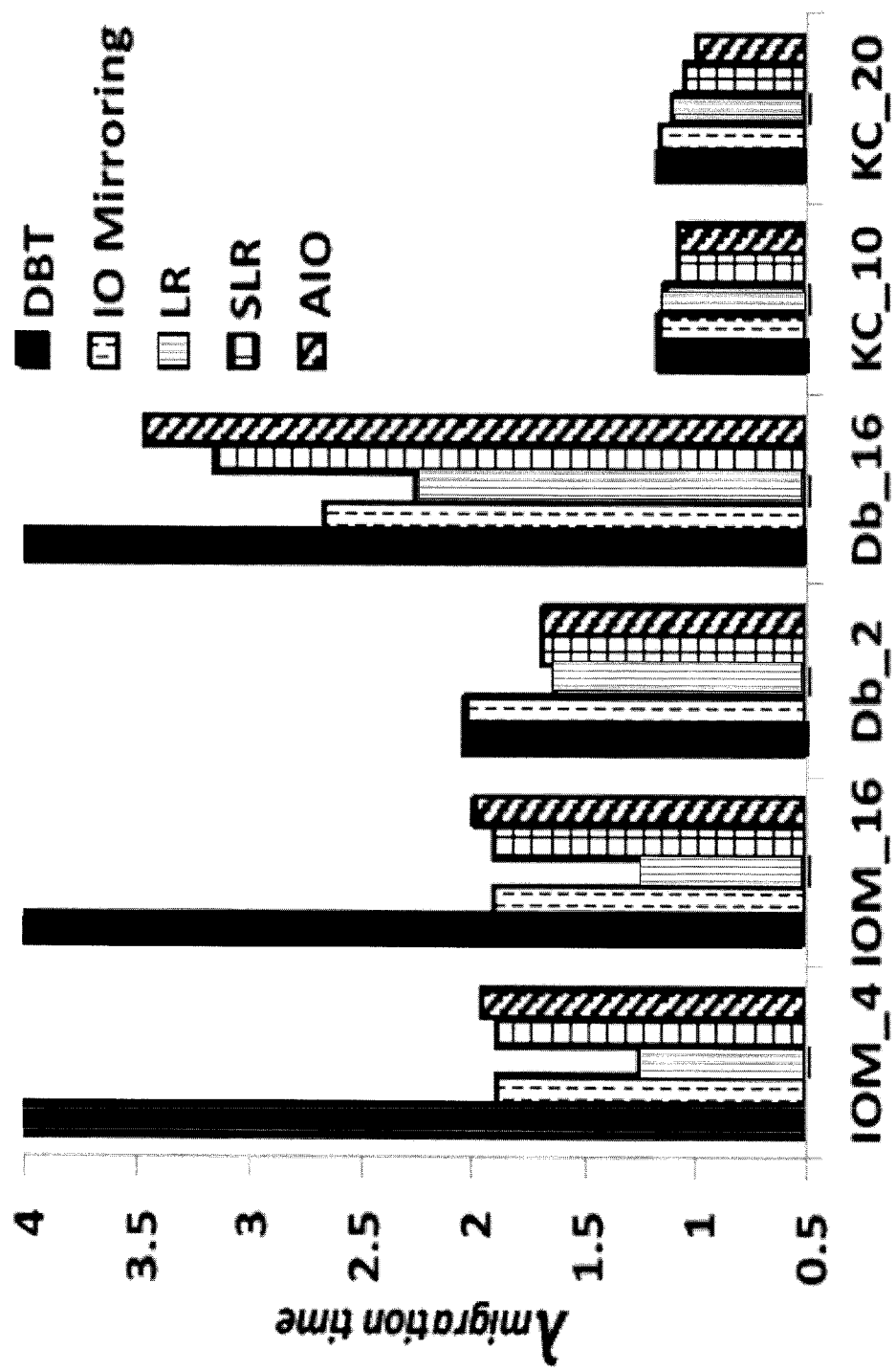
FIG. 14a shows $\lambda_{migration\ time}$ for the case that a VM is migrated from HDD to HDD.
Figure 14B:
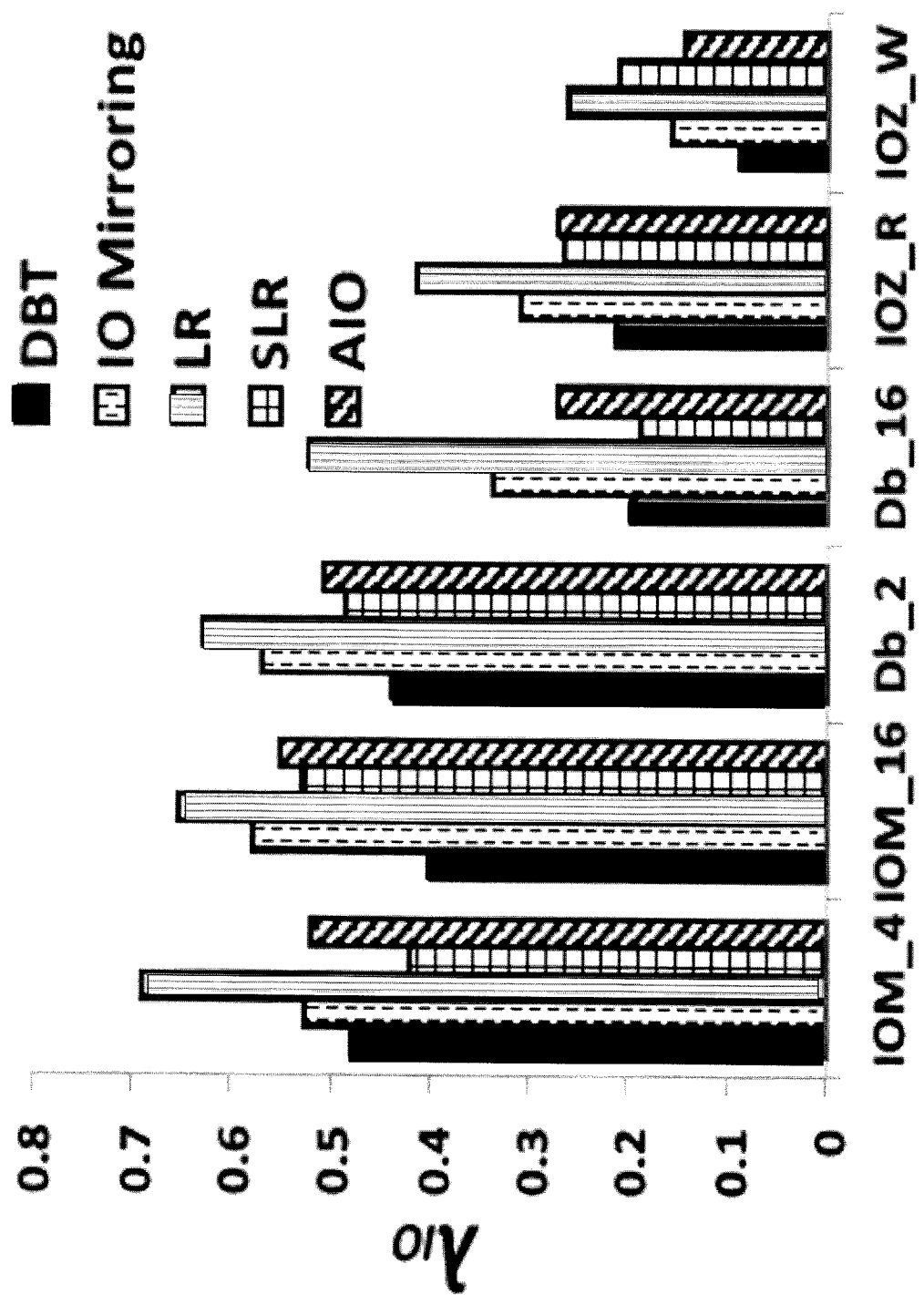
FIG. 14b shows $\lambda_{10}$ for the case that a VM is migrated from HDD to HDD.
Figure 14C:
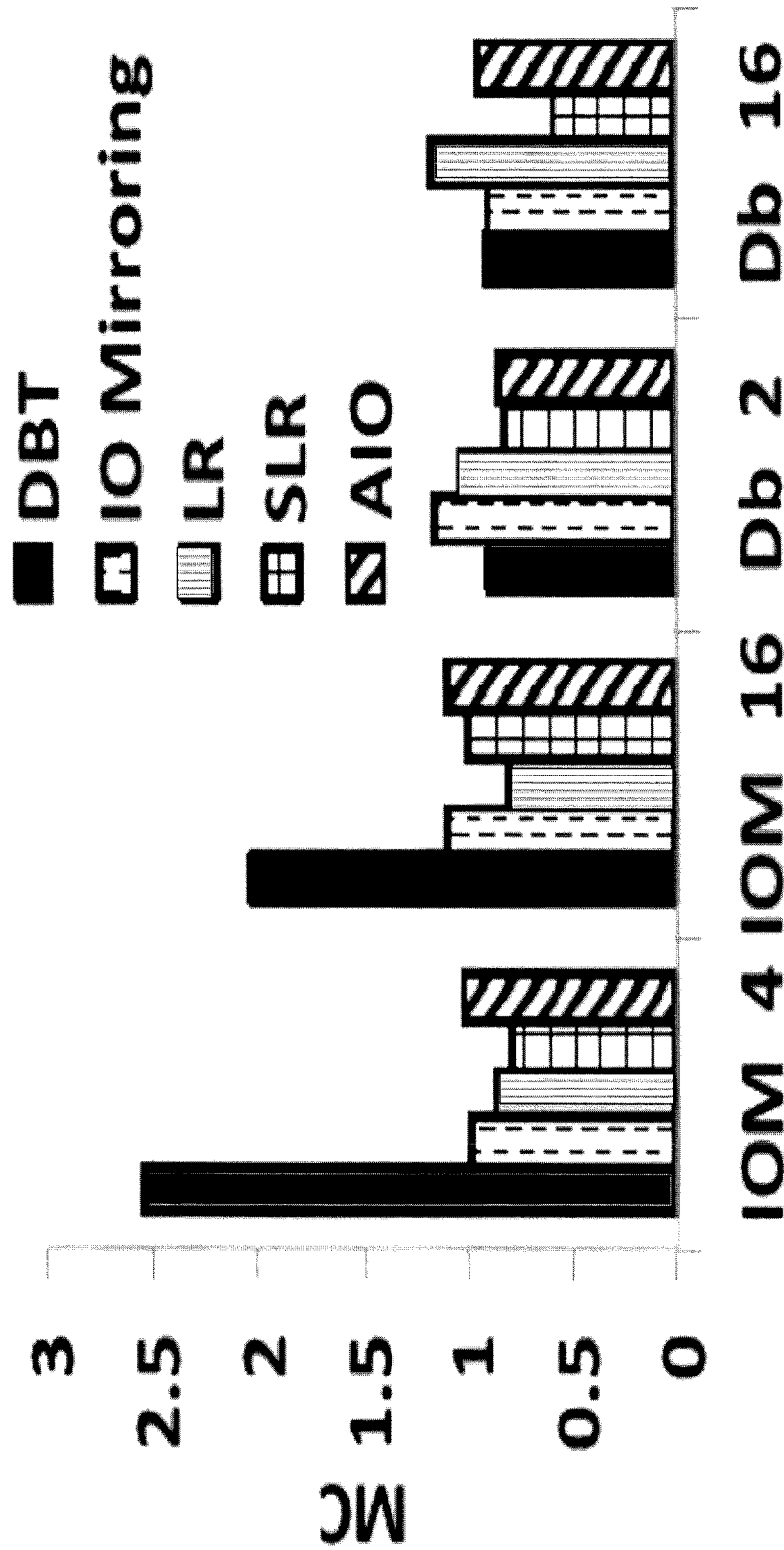
FIG. 14c shows MC for the case that a VM is migrated from HDD to HDD.

In situations where no SSD is involved, the wear-out factor $\lambda$wear out does not affect migration cost. Referring to FIG. 14a, which shows results for the case that VM is migrated from HDD to HDD, LR takes the shortest time to migrate a VM, while DBT takes the longest time, where DBT further occasionally fails to complete the migration. In addition, the downtime for DBT is longer than LR, SLR, IO mirroring, and AIO, as discussed above. Accordingly, DBT is excluded from this comparison. In terms of IO penalty, referring to FIG. 14b which shows results for the case that VM is migrated from HDD to HDD, SLR has the lowest IO penalty and AIO has the second lowest IO penalty. In this situation, there is a tradeoff between migration time and IO performance, as a lower IO penalty (λ10) can only be achieved by sacrificing the migration time λMigration time. Taking both IO penalty and migration time into consideration, FIG. 14c, which shows results for the case that VM is migrated from HDD to HDD, shows the migration cost (MC) for LR, SLR, AIO, IO mirroring, and DBT. On average, SLR has the lowest migration cost, and LR has the second lowest migration cost.

Lowering Migration Cost in Massive Storage Migration by Mixing Different Designs As discussed, with respect to massive VM live storage migration in heterogeneous environments, LR, SLR, and AIO each has strengths and weaknesses. In this section, embodiments that can further reduce the overall migration cost for such massive storage migration by mixing LR, SLR, and AIO. In specific embodiments, all the VMs are moved from one storage pool to another storage pool for the purpose of storage maintenance. For comparison, the percentage of VMs to be migrated from SSDs to SSDs can be assumed to be the same as the percentage of VMs to be migrated from HDDs to HDDs (s), and the number of VMs migrated from SSDs to HDDs is the same as the number of VMs migrated from HDDs to SSDs, which is $(1-\epsilon-\epsilon)/2=0.5-\epsilon$. The migration cost of the massive storage migration is the sum of the migration cost for each individual storage migration. Specific embodiments to be discussed have a weight γ of 10%, 50%, and 80%.

Figure 15A:
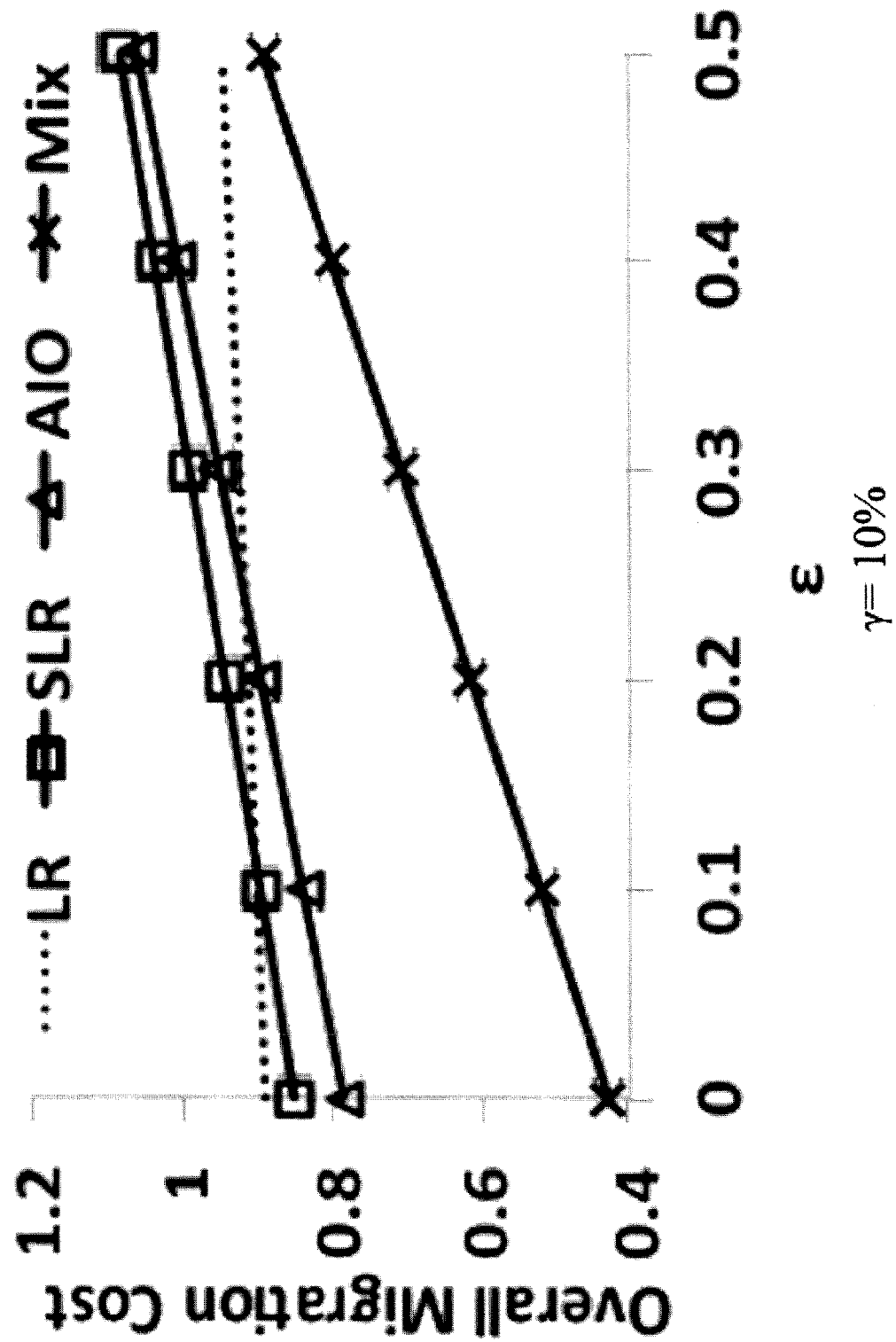
FIG. 15a shows overall MC of the massive storage migration on heterogeneous storage environment for $\gamma=10\%$.
Figure 15B:
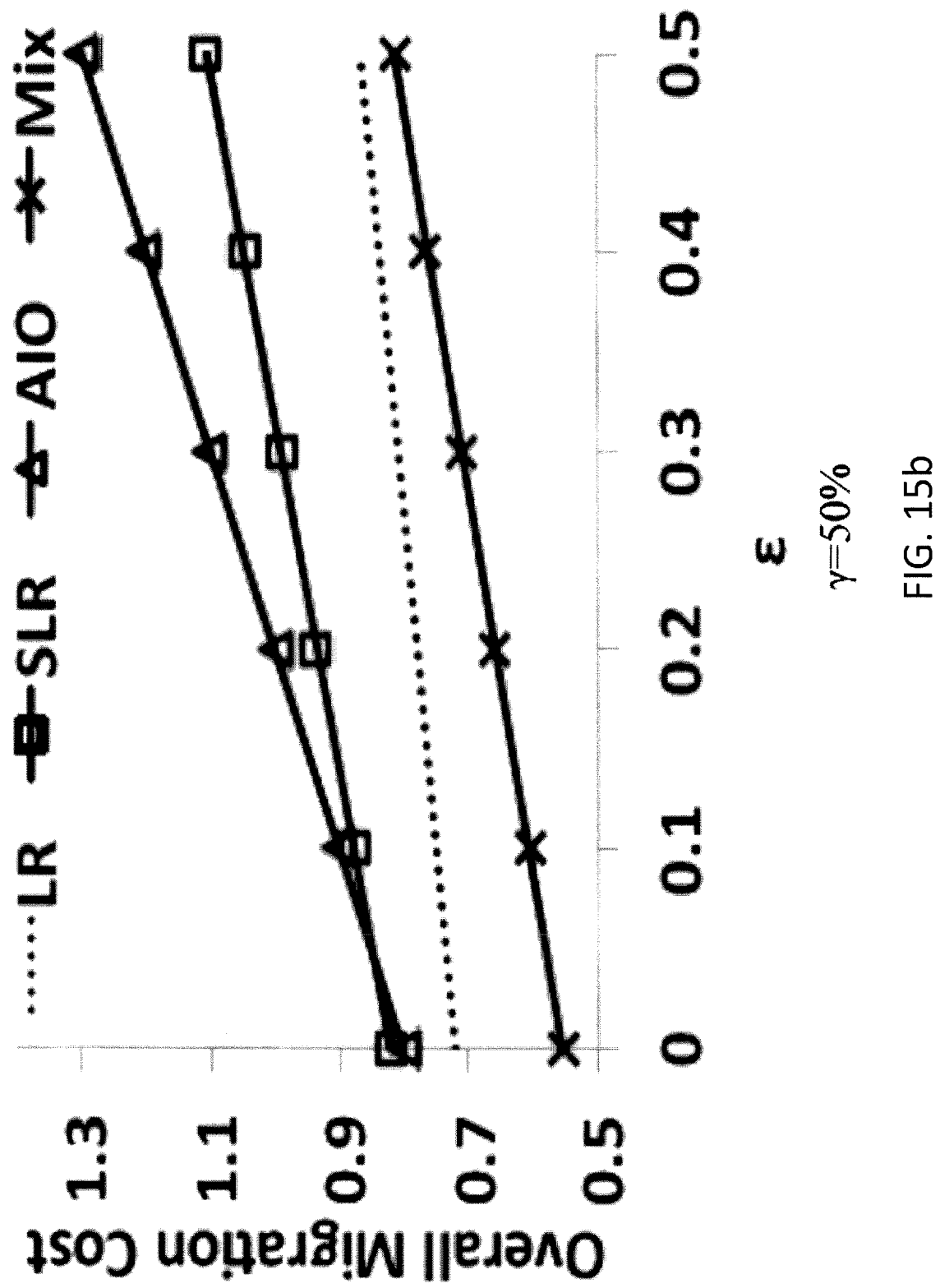
FIG. 15b shows overall MC of the massive storage migration on heterogeneous storage environment for $\gamma=50\%$.
Figure 15C:
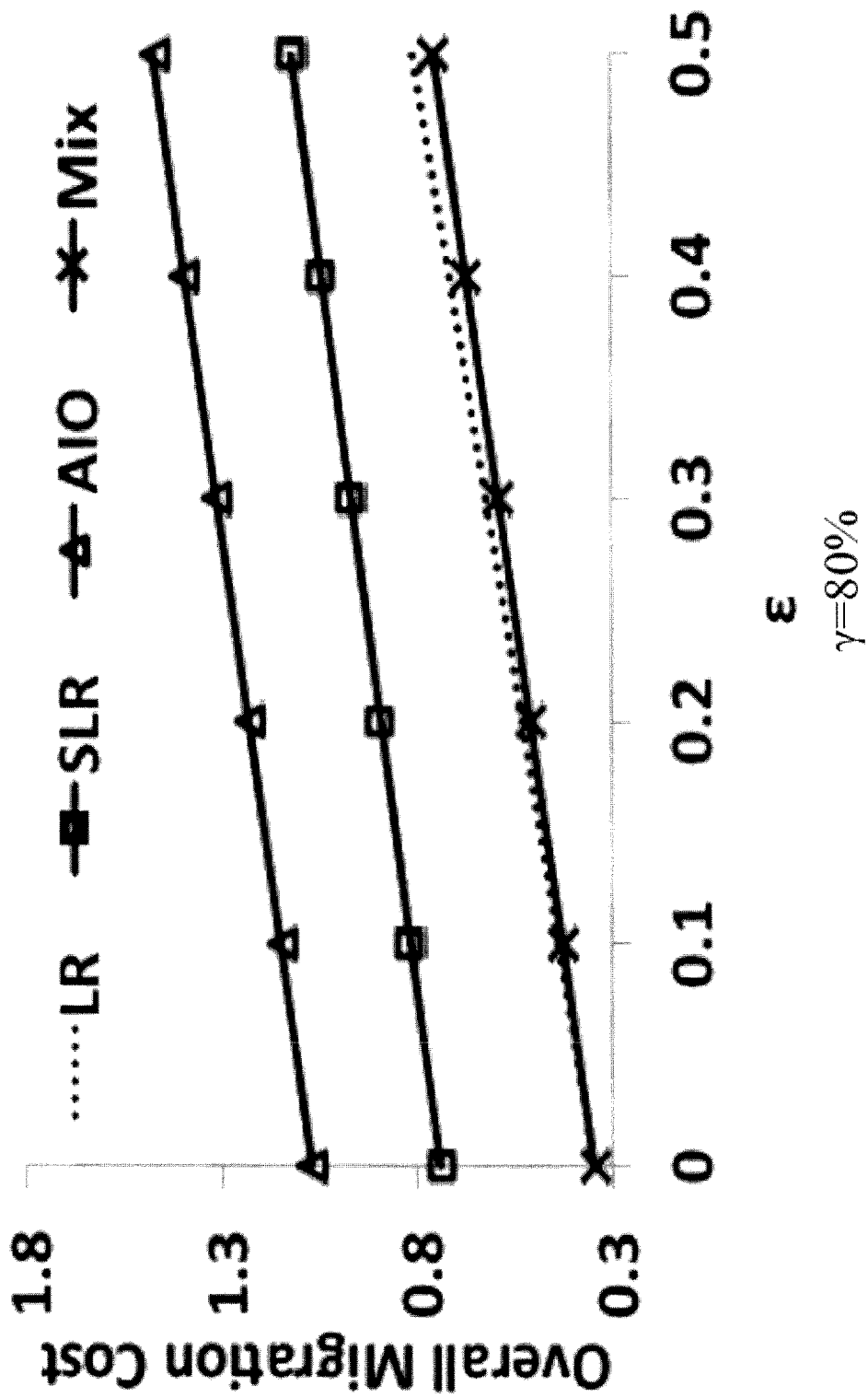
FIG. 15c shows overall MC of the massive storage migration on heterogeneous storage environment $\gamma=80\%$.

FIGS. 15a, 15b, and 15c, which show results for overall MC of the massive migration on heterogeneous storage environment, show the migration cost for the massive storage migration when each single storage migration design (LR, SLR, and AIO) is deployed individually and when LR, SLR, and AIO are mixed together (Mix). Referring to FIGS. 15a. 15b, and 15c, under different weights γ and percentage of migrating between heterogeneous storage media (0.5-ϵ), mixing LR, SLR, and AIO (Mix) can always achieve a lower migration cost. This is because Mix can choose the migration scheme among LR, SLR, and AIO with the lowest migration cost for each single storage migration behavior. For instance, when the SSD lifetime is the top priority (γ>50%), most of the VMs are migrated using LR, which makes the migration cost of Mix close to that of LR (1% lower than LR but 69% lower than AIO). When the IO performance is the top priority and most of the migration occurs on the same storage media (ϵ→0), Mix is relatively close to AIO, but still has the lowest migration cost (48% lower than the migration cost for AIO).

EMBODIMENTS

Embodiment 1

A method of transferring a virtual machine storage, comprising:
 copying a virtual machine disk image of a virtual machine from a source storage to a destination storage, wherein the virtual machine disk image has a plurality of data blocks; and
 handling virtual machine IO requests from the virtual machine during copying the virtual machine disk image from the source storage to the destination storage,
 wherein copying the virtual machine disk image from the source storage to the destination storage and handling the virtual machine IO requests from the virtual machine during copying the virtual machine disk image from the source storage to the destination storage is accomplished via (a), (b), or (c), as follows:

(a) copying the plurality of data blocks of the virtual machine disk image from the source storage to the destination storage;
 partitioning the virtual machine disk image into a copied region and a to-be-copied region, where the copied region has been copied from the source storage to the destination storage, wherein the to-be-copied region is going to be copied from the source storage to the destination storage;
 intercepting the virtual machine IO requests from the virtual machine, where the virtual machine IO requests from the virtual machine comprise write requests to the virtual machine disk image and read requests to the virtual machine disk image, wherein the write requests to the virtual machine disk image comprise write requests to the copied region and write requests to the to-be-copied region, wherein the read requests to the virtual machine disk image comprise read requests to the copied region and read requests to the to-be-copied region;
 recording the write requests to the to-be-copied region in a bitmap;
 reading data for read requests to the copied region from the destination storage;
 wherein for each read request to the to-be-copied region,
  (i) checking the bitmap to determine whether a data block corresponding to the each read request to the to-be-copied region is recorded in the bitmap;
  (ii) if the data block corresponding to the each read request to the to-be-copied region is recorded in the bitmap, issuing the each read request to the to-be-copied region to the destination storage; and
  (iii) if the data block corresponding to the each read request to the to-be-copied region is not recorded in the bitmap, issuing the each read request to the to-be-copied region to the source storage;
 wherein for write requests to the virtual machine disk image and read requests to the virtual machine disk image intercepted while data blocks corresponding to such intercepted write requests to the virtual machine disk image and such intercepted read requests to the virtual machine disk image are being copied from the source storage to the destination storage, accomplishing such intercepted write requests to the virtual machine disk image and such intercepted read requests to the virtual machine disk image after the data blocks corresponding to such intercepted write requests to the virtual machine disk image and such intercepted read requests to the virtual machine disk image have been copied from the source storage to the destination storage,
 wherein copying the plurality of data blocks of the virtual machine disk image from the source storage to the destination storage comprises:
  for each data block of the plurality of data blocks of the virtual machine disk image to be copied from the source storage to the destination storage,
   (i) checking the bitmap to determine whether the each data block of the plurality of data blocks of the virtual machine disk image to be copied from the source storage to the destination storage is recorded in the bitmap;
   (ii) if the each data block of the plurality of data blocks of the virtual machine disk image to be copied from the source storage to the destination storage is not recorded in the bitmap, copying the each data block of the plurality of data blocks of the virtual machine disk image to be copied from the source storage to the destination storage; and
(iii) if the each data block of the plurality of data blocks of the virtual machine disk image to be copied from the source storage to the destination storage is recorded in the bitmap, skipping copying the each data block of the plurality of data blocks of the virtual machine disk image to be copied from the source storage to the destination storage, (b) copying the plurality of data blocks of the virtual machine disk image from the source storage to the destination storage,
partitioning the virtual machine disk image into a copied region and a to-be-copied region, where the copied region has been copied from the source storage to the destination storage, wherein the to-be-copied region is going to be copied from the source storage to the destination storage;
intercepting the virtual machine IO requests from the virtual machine, where the virtual machine IO requests from the virtual machine comprise write requests to the virtual machine disk image and read requests to the virtual machine disk image, wherein the write requests to the virtual machine disk image comprise write requests to the copied region and write requests to the to-be-copied region, wherein the read requests to the virtual machine disk image comprise read requests to the copied region and read requests to the to-be-copied region;
issuing write requests to the to-be-copied region and read requests to the to-be-copied region to the source storage;
recording the write requests to the copied region in a bitmap;
issuing the write requests to the copied region to the destination storage;
wherein for each read request to the copied region,
(i) checking the bitmap to determine whether a data block corresponding to the each read request to the copied region has been updated by one or more write requests to the virtual machine disk image;
(ii) if the data block corresponding to the each read request to the copied region has been updated by one or more write requests to the virtual machine disk image, reading the data block corresponding to the each read request to the copied region from the destination storage; and
(iii) if the data block corresponding to the each read request to the copied region has not been updated by one or more write requests to the virtual machine disk image, reading the data block corresponding to the each read request to the copied region from the source storage, (c) copying the plurality of data blocks of the virtual machine disk image from the source storage to the destination storage;
partitioning the virtual machine disk image into a copied region and a to-be-copied region, where the copied region has been copied from the source storage to the destination storage, wherein the to-be-copied region is going to be copied from the source storage to the destination storage;
intercepting the virtual machine IO requests from the virtual machine, wherein the virtual machine IO requests from the virtual machine comprise write requests to the virtual machine disk image and read requests to the virtual machine disk image, wherein the write requests to the virtual machine disk image comprise write requests to the copied region and write requests to the to-be-copied region, wherein the read requests to the virtual machine disk image comprise read requests to the copied region and read requests to the to-be-copied region;
issuing write requests to the to-be-copied region and read requests to the to-be-copied region to the source storage;
issuing read requests to the copied region to the source storage;
wherein for each write request to the copied region,
(i) checking to determine a number of pending write requests to the copied region, wherein the number of pending write requests to the copied region is a number of write requests to the copied region that have been issued to the source storage and issued to the destination storage minus a number of the write requests to the copied region issued to source storage and issued to destination storage where both the write request to the copied region issued to the source storage and the write request to the copied region issued to the destination storage have been accomplished,
(ii) if the number of pending write requests to the copied region is less than or equal to a threshold number, issuing the each write request to the copied region to the source storage and issuing the each write request to the copied region to the destination storage;
(iii) if the number of pending write requests to the copied region is greater than the threshold number,
(a) delaying; and
(b) repeating (i), (ii), and (iii) until the each write request to the copied region is issued to the source storage and issued to the destination storage,
wherein when the each write request to the copied region issued to the source storage is accomplished or the each write request to the copied region issued to the destination storage is accomplished, marking the each write request to the copied region as completed and returning the each write request to the copied region marked as completed to the virtual machine.

This embodiment can be implemented in a virtual machine management program, as a virtual machine storage migration, or as a stand alone program or system. Such a virtual machine management program can have everything regarding the virtual machine, for example, when the virtual machine is created, including the size of the virtual storage, information regarding where the storage is located, i.e., whether source is SSD or HDD and the specifications of the source storage, as well as the specifications and type of the destination storage. The virtual machine management program can also provide estimates for the workload to be expected during the storage migration. Such expected workload can be based on different ways to estimate such workload behavior, and can use information about the workload IO characteristics (e.g., which portion of data blocks are being accessed, the frequency of data access, etc.)

A method and/or system for transferring a virtual machine, or for transferring a virtual machine storage can ask questions of the user and then direct the transfer to a, b, or c. Such questions can include one or more of the following: is the source an SSD or HDD, is the destination an SSD or HDD, how big is the virtual disk image, what source do you have, what destination do you have, how important is keeping the time of the transfer low, and how important is the lifetime of the SSD (source and/or destination). The method or system can then guide the transfer to one of a or b, to one of b or c, to one of a or c, to one of a, b, or c having the lowest MC, based on the answers to the question(s). Alternatively, the method or system can just use a, just use b, or just use c.

Embodiment 2

The method according to Embodiment 1, wherein the bitmap is on a memory, wherein the memory is external to the source storage, wherein the memory is external to the destination storage.

Embodiment 3

The method according to Embodiment 1, wherein in (c), further comprising:
incrementing a counter for each write request to the copied region issued to the source storage and issued to the destination storage; and
decrementing the counter when both the each write request to the copied region issued to the source storage is accomplished and the each write request to the copied region issued to the destination storage is accomplished,
wherein checking to determine a number of pending write requests to the copied region comprises:
checking the counter, wherein the counter tracks the number of pending write requests to the copied region.

Embodiment 4

The method according to Embodiment 3, wherein incrementing the counter occurs prior to issuing the each write request to the copied region to the source storage and issuing the each write request to the copied region to the destination storage.

Embodiment 5

The method according to Embodiment 1, wherein in (b), accomplishing such intercepted write requests to the virtual machine disk image and such intercepted read requests to the virtual machine disk image after the data blocks corresponding to such intercepted write requests to the virtual machine disk image and such intercepted read requests to the virtual machine disk image have been copied from the source storage to the destination storage comprises:
deferring such intercepted write requests to the virtual machine disk image and such intercepted read requests to the virtual machine disk image;
putting such intercepted write requests to the virtual machine disk image and such intercepted read requests to the virtual machine disk image into a queue; and
handling such intercepted write requests to the virtual machine disk image and such intercepted read requests to the virtual machine disk image after the data blocks corresponding to such intercepted write requests to the virtual machine disk image and such intercepted read requests to the virtual machine disk image have been copied from the source storage to the destination storage.

Embodiment 6

The method according to Embodiment 1, wherein copying the virtual machine disk image from the source storage to the destination storage and handling the virtual machine IO requests from the virtual machine is accomplished without service interruption to a running workload on the virtual machine.

Embodiment 7

The method according to Embodiment 1, wherein the source storage is a source solid state drive (SSD) or a source hard disk drive (HDD), wherein the destination storage is a destination SSD or a destination HDD.

Embodiment 8

The method according to Embodiment 7, wherein the source storage is the source SSD and the destination storage is the destination SSD.

Embodiment 9

The method according to Embodiment 7, wherein the source storage is the source SSD and the destination storage is the destination HDD.

Embodiment 10

The method according to Embodiment 7, wherein the source storage is the source HDD and the destination storage is the destination SSD.

Embodiment 11

The method according to Embodiment 7, wherein the source storage is the source HDD and the destination storage is the destination HDD.

Embodiment 12

The method according to Embodiment 1, wherein copying the virtual machine disk image from the source storage to the destination storage and handling the virtual machine IO requests from the virtual machine during copying the virtual machine disk image from the source storage to the destination storage comprises copying the virtual machine disk image from the source storage to the destination storage and handling the virtual machine IO requests from the virtual machine via a one of (a), (b), and (c) having a lowest total cost of migration of a total cost of migration of (a), a total cost of migration of (b), and a total cost of migration of (c), where a total cost of migration, MC, is based on:
an IO penalty, $\lambda_{IO}$;
a migration time factor, $\lambda_{migration\ time}$;
a wear out factor, $\lambda_{wear\ out}$; and
a weight, $\gamma$, as follows:

$$MC = \gamma * \lambda_{wear\ out} * \lambda_{migration\ time} + (1 - \gamma) * \lambda_{IO} * \lambda_{migration\ time}$$
$$= \lambda_{migration\ time} * (\gamma * \lambda_{wear\ out} + (1 - \gamma) * \lambda_{IO}),$$

where $$\lambda_{IO} = \frac{\text{Best IO Performance} - \text{IO Performance during migration}}{\text{Best IO Performance}},$$

$$\lambda_{wear\ out} = \frac{\text{data written to SSD per time unit}}{\text{Workload Data Writes per time unit}},$$

$$\lambda_{migration\ time} = \frac{\text{migration time}}{\text{image copy time}}, \text{ and}$$

$\gamma$ is greater than or equal to 0 and less than or equal to 1,
wherein best IO performance is a better of an IO performance of the source storage and an IO performance of the destination storage if the IO performance of the source storage and the IO performance of the destination storage are not the same, or the IO performance of the source storage if the IO performance of the source storage and the IO performance of the destination storage are the same, wherein IO performance during migration is an IO performance experienced during migrating the virtual machine, wherein data written to SSD per time unit is an estimate of an amount of data written to the source storage per time unit if the source storage is a source SSD plus an estimate of an amount of data written to the destination storage per time unit if the destination storage is a destination SSD, or zero if both the source storage is a source HDD and the destination storage is a destination HDD, wherein workload data writes per time unit is the estimate of the amount of data written to the source storage per time plus the estimate of the amount of data written to the destination storage per time unit during copying the virtual machine disk image from the source storage to the destination storage and handling virtual machine IO requests from the virtual machine during copying the virtual machine disk image from the source storage to the destination storage, wherein migration time is an estimate of a period of time to complete copying the virtual machine disk image from the source storage to the destination storage and handling virtual machine IO requests from the virtual machine during copying the virtual machine disk image from the source storage to the destination storage, wherein image copy time is an amount of time copying the virtual machine disk image from the source storage to the destination storage would take if such copying were not interrupted.

Embodiment 13

The method according to Embodiment 12, further comprising:
calculating at least two of the following:
(1) the total cost of migration for (a);
(2) the total cost of migration for (b); and
(3) the total cost of migration for (c).

Embodiment 14

The method according to Embodiment 13, wherein prior to calculating the at least two of (1), (2), and (3), further comprising:
determining the IO performance of the source storage;
determining the IO performance of the destination storage;
if the source storage is a source SSD, determining the estimate of the amount of data written to the source storage per time unit;
if the destination storage is a destination SSD, determining the estimate of the amount of data written to the destination storage per time unit;
determining the estimate of the amount of data written to the source storage per time unit plus the estimate of the amount of data written to the destination storage per time unit;
determining the estimate of the period of time to complete copying the virtual machine disk image from the source storage to the destination storage and handling virtual machine IO requests from the virtual machine during copying the virtual machine disk image from the source storage to the destination storage; and
determining the amount of time copying the virtual machine disk image from the source storage to the destination storage would take if such copying were not interrupted.

Embodiment 15

The method according to Embodiment 14, wherein migration time is determined from a size of the virtual machine disk image, the IO performance of the source storage, and the IO performance of the destination storage, and the estimate of the amount of data written to the source storage per time unit plus the estimate of the amount of data written to the destination storage per time unit, wherein the estimate of the amount of data written to the source storage per time unit plus the estimate of the amount of data written to the destination storage per time unit is determined from an estimate of workload data writes per time unit.

Embodiment 16

The method according to Embodiment 12, further comprising:
receiving a size of the virtual machine disk image;
receiving an estimate of the workload data writes per time unit;
receiving an indication as to whether the source storage is a SSD or an HDD and the IO performance of the source storage, wherein the amount of data written to the source storage per time unit is the IO performance of the source storage;
receiving an indication as to whether the destination storage is a SSD or an HDD and the IO performance of the destination storage, wherein the amount of data written to the destination storage per time unit is the IO performance of the destination storage;
determining the estimate of the period of time to complete copying the virtual machine disk image from the source storage to the destination storage and handling virtual machine IO requests from the virtual machine during copying the virtual machine disk image from the source storage to the destination storage, wherein the estimate of the period of time to complete copying the virtual machine disk image from the source storage to the destination storage and handling virtual machine IO requests from the virtual machine during copying the virtual machine disk image from the source storage to the destination storage is determined from the size of the virtual machine disk image, the estimate of the workload data writes per time unit, the indication as to whether the source storage is a SSD or an HDD, the IO performance of the source storage, the indication as to whether the destination storage is a SSD or an HDD, and the IO performance of the destination storage; and
determining the amount of time copying the virtual machine disk image from the source storage to the destination storage would take if such copying were not interrupted from the size of the virtual machine disk image, wherein the amount of time copying the virtual machine disk image from the source storage to the destination storage would take if such copying were not interrupted from the size of the virtual machine disk image is determined from the size of the virtual machine disk image, the indication as to whether the source storage is a SSD or an HDD, the IO performance of the source storage, the indication as to whether the destination storage is a SSD or an HDD, and the IO performance of the destination storage.

Embodiment 17

The method according to Embodiment 13, further comprising determining a lowest of the at least two of (1), (2), and (3) that were calculated, wherein the lowest total cost of migration is the lower of the at least two of (1), (2) and (3) that were calculated is the lowest total cost of migration.

Embodiment 18

The method according to Embodiment 17, wherein the at least two of (1), (2), and (3) that were calculated is the total cost of migration for (a), the total cost of migration for (b), and the total cost of migration for (c).

Embodiment 19

The method according to Embodiment 1, wherein copying the virtual machine disk image from the source storage to the destination storage and handling the virtual machine IO requests from the virtual machine during copying the virtual machine disk image from the source storage to the destination storage is accomplished via (a).

Embodiment 20

The method according to Embodiment 19, wherein the destination storage is a destination SSD.

Embodiment 21

The method according to Embodiment 1, wherein copying the virtual machine disk image from the source storage to the destination storage and handling the virtual machine IO requests from the virtual machine during copying the virtual machine disk image from the source storage to the destination storage is accomplished via (b).

Embodiment 22

The method according to Embodiment 21, wherein the source storage is a SSD and the destination storage is a HDD.

Embodiment 23

The method according to Embodiment 21, wherein issuing the write requests to the copied region to the destination storage keeps the copied region up-to-date without invoking a merge process.

Embodiment 24

The method according to Embodiment 1, wherein copying the virtual machine disk image from the source storage to the destination storage and handling the virtual machine IO requests from the virtual machine during copying the virtual machine disk image from the source storage to the destination storage is accomplished via (c).

Embodiment 25

The method according to Embodiment 24, wherein the source storage is a SSD and the destination storage is a HDD.

Embodiment 26

The method according to Embodiment 24, wherein more than 50% of the write requests to the virtual machine are issued to the source storage during copying the virtual machine disk image from the source storage to the destination storage and handling the virtual machine IO requests from the virtual machine during copying the virtual machine disk image from the source storage to the destination storage.

Embodiment 27

The method according to Embodiment 24, wherein at least a portion of the pending write requests to the copied region are completed when a virtual machine CPU is computating, when virtual machine memory data is being accessed, and/or when read requests to the virtual machine disk image are being accomplished.

Embodiment 28

The method according to Embodiment 1, wherein in (c), further comprising:
when the source storage is a source SSD and the destination storage is a destination HDD,
incrementing a counter for each write request to the copied region issued to the destination storage; and
decrementing the counter when the each write request to the copied region issued to the destination storage is accomplished,
wherein checking to determine a number of pending write requests to the copied region comprises:
checking the counter, wherein the counter tracks the number of pending write requests to the copied region.
wherein in (c), when the source storage is a source HDD and the destination storage is a destination SSD,
incrementing a counter for each write request to the copied region issued to the source storage; and
decrementing the counter when both the each write request to the copied region issued to the source storage is accomplished,
wherein checking to determine a number of pending write requests to the copied region comprises:
checking the counter, wherein the counter tracks the number of pending write requests to the copied region.

Embodiment 29

The method according to Embodiment 1, wherein with respect to (c), delaying comprises delaying for a certain period of time.

Embodiment 30

The method according to Embodiment 1, wherein the source storage is a source disk array comprising a plurality of source array storages, wherein the destination storage is a destination disk array comprising a plurality of destination array storages, wherein each source array storage of the plurality of source array storages corresponds to a corresponding destination array storage of the plurality of destination array storages, such that the each source array storage is copied to the corresponding destination array storage, wherein each source array storage is copied to the corresponding destination array storage via a one of (a), (b), or (c) having the lowest total cost of migration with respect to the each source array storage and the corresponding destination array storage.

Embodiment 31

The method according to Embodiment 12, wherein the lowest total cost of migration is lower than a total cost of migration for copying the virtual machine disk image from the source storage to the destination storage and handling the virtual machine IO requests from the virtual machine during copying the virtual machine disk image from the source storage to the destination storage via dirty block tracking, wherein the lowest total cost of migration is lower than a total cost of migration for copying the virtual machine disk image from the source storage to the destination storage and handling the virtual machine IO requests from the virtual machine during copying the virtual machine disk image from the source storage to the destination storage via IO mirroring.

Embodiment 32

The method according to Embodiment 12, wherein migration time is the image copy time plus downtime, wherein the downtime is an amount of time the virtual machine is paused duringcopying the virtual machine disk image from the source storage to the destination storage and handling the virtual machine IO requests from the virtual machine during copying the virtual machine disk image from the source storage to the destination storage.

Embodiment 33

The method according to Embodiment 19, wherein when the destination storage is a destination SSD storage, more than 50% of the write requests to the virtual machine disk image are issued to the destination storage during copying the virtual machine disk image from the source storage to the destination storage and handling the virtual machine IO requests from the virtual machine during copying the virtual machine disk image from the source storage to the destination storage.

Embodiment 34

The method according to Embodiment 19, wherein when the destination storage is a destination SSD storage, at least 95% of the write requests are issued to the destination storage during copying the virtual machine disk image from the source storage to the destination storage and handling the virtual machine IO requests from the virtual machine during copying the virtual machine disk image from the source storage to the destination storage.

Embodiment 35

A method of migrating a virtual machine, comprising:
transferring a CPU state of a virtual machine and memory data of the virtual machine; and
transferring a virtual machine storage of the virtual machine, wherein transferring the virtual machine storage of the virtual machine is accomplished via the method of claim 1.

Embodiment 36

A virtual machine management system, comprising a non-volatile, computer readable media with instructions for performing the method of transferring a virtual machine storage of claim 1.

Embodiment 37

The method according to Embodiment 1, wherein when the source storage is a source SSD and the destination storage is a destination HDD, (i) if $CO_2 \leq \gamma \leq 1.0$, copying the virtual machine image from the source storage to the destination storage and handling the virtual machine IO requests from the virtual machine during copying the virtual machine disk image from the source storage to the destination storage is accomplished via (a);

(ii) if $CO_1 \leq \gamma < CO_2$, copying the virtual machine image from the source storage to the destination storage and handling the virtual machine IO requests from the virtual machine during copying the virtual machine disk image from the source storage to the destination storage is accomplished via (b); and (iii) if $O \leq \gamma < CO_1$, copying the virtual machine image from the source storage to the destination storage and handling the virtual machine IO requests from the virtual machine during copying the virtual machine disk image from the source storage to the destination storage is accomplished via (c), where $CO_1$ is a first cutoff and $CO_2$ is a second cutoff.

Embodiment 38

The method according to Embodiment 37, wherein $CO_1 = 0.3$ and $CO_2 = 0.6$.

With respect to the method according to Embodiment 1, when the source storage is a source SSD and the destination storage is a destination SSD, accomplishing copying the virtual machine image from the source storage to the destination storage and handling the virtual machine IO requests from the virtual machine during copying the virtual machine disk image from the source storage to the destination storage via (a) typically provides the lowest costs of migrations, independent of $\gamma$.

With respect to the method according to Embodiment 1, when the source storage is a source HDD and the destination storage is a destination SSD, accomplishing copying the virtual machine image from the source storage to the destination storage and handling the virtual machine IO requests from the virtual machine during copying the virtual machine disk image from the source storage to the destination storage is via (a) typically provides the lowest costs of migrations, independent of $\gamma$.

With respect to the method according to Embodiment 1, when the destination storage is a destination SSD, accomplishing copying the virtual machine image from the source storage to the destination storage and handling the virtual machine IO requests from the virtual machine during copying the virtual machine disk image from the source storage to the destination storage via (a) typically provides the lowest costs of migrations, independent of $\gamma$.

Embodiment 39

The method according to Embodiment 1, wherein when the source storage is a source SSD and the destination storage is a destination HDD, (i) if $CO_1 \leq \gamma \leq 1.0$, copying the virtual machine image from the source storage to the destination storage and handling the virtual machine IO requests from the virtual machine during copying the virtual machine disk image from the source storage to the destination storage is accomplished via (a); and (ii) if $O \leq \gamma < CO_1$, copying the virtual machine image from the source storage to the destination storage and handling the virtual machine IO requests from the virtual machine during copying the virtual machine disk image from the source storage to the destination storage is accomplished via (b).

Embodiment 40

The method according to Embodiment 39, wherein $CO_1=0.6$.

Embodiment 41

The method according to Embodiment 1, wherein when the source storage is a source SSD and the destination storage is a destination HDD, (i) if $CO_1 \leq \gamma \leq 1.0$, copying the virtual machine image from the source storage to the destination storage and handling the virtual machine IO requests from the virtual machine during copying the virtual machine disk image from the source storage to the destination storage is accomplished via (a); and (ii) if $0 \leq \gamma < CO_1$, copying the virtual machine image from the source storage to the destination storage and handling the virtual machine IO requests from the virtual machine during copying the virtual machine disk image from the source storage to the destination storage is accomplished via (c).

Embodiment 42

The method according to Embodiment 41, wherein $CO_1=0.5$.

Embodiment 43

The method according to Embodiment 1, wherein when the source storage is a source SSD and the destination storage is a destination HDD, (i) if $CO_1 \leq \gamma \leq 1.0$, copying the virtual machine image from the source storage to the destination storage and handling the virtual machine IO requests from the virtual machine during copying the virtual machine disk image from the source storage to the destination storage is accomplished via (b); and (ii) if $0 \leq \gamma < CO_1$, copying the virtual machine image from the source storage to the destination storage and handling the virtual machine IO requests from the virtual machine during copying the virtual machine disk image from the source storage to the destination storage is accomplished via (c).

Embodiment 44

The method according to Embodiment 43, wherein $CO_1=0.3$.

With respect to the method according to Embodiment 1, wherein when the source storage is a source HDD and the destination storage is a destination HDD, accomplishing copying the virtual machine image from the source storage to the destination storage and handling the virtual machine IO requests from the virtual machine during copying the virtual machine disk image from the source storage to the destination storage is via (c) typically provides the lowest costs of migrations, independent of $\gamma$.

Embodiment 45

The method according to Embodiment 1, further comprising: receiving a selection of (a), (b), or (c) from a user.

Embodiment 46

The method according to Embodiment 12, further comprising receiving $\gamma$ from a user, wherein $\gamma$ is based on the user's preference.

Embodiment 47

A method of transferring a virtual machine storage, comprising:

copying a virtual machine disk image of a virtual machine from a source storage to a destination storage, wherein the virtual machine disk image has a plurality of data blocks; and handling virtual machine IO requests from the virtual machine during copying the virtual machine disk image from the source storage to the destination storage, calculating at least two total costs of migration for a corresponding at least two ways to copy one or more data blocks of the virtual machine from the source storage to the destination storage and handle the virtual machine IO requests during copying the virtual disk image from the source storage to the destination storage, where a total cost of migration, MC, is based on:

an IO penalty, $\lambda_{IO}$;
a migration time factor, $\lambda_{migration\ time}$;
a wear out factor, $\lambda_{wear\ out}$; and
a weight, $\gamma$, as follows:

$$MC = \gamma * \lambda_{wear\ out} * \lambda_{migration\ time} + (1-\gamma) * \lambda_{IO} * \lambda_{migration\ time}$$
$$= \lambda_{migration\ time} * (\gamma * \lambda_{wear\ out} + (1-\gamma) * \lambda_{IO}),$$

where $$\lambda_{IO} = \frac{\text{Best IO Performance} - \text{IO Performance during migration}}{\text{Best IO Performance}},$$

$$\lambda_{wear\ out} = \frac{\text{data written to SSD per time unit}}{\text{Workload Data Writes per time unit}},$$

$$\lambda_{migration\ time} = \frac{\text{migration time}}{\text{image copy time}}, \text{ and}$$

$\gamma$ is greater than or equal to 0 and less than or equal to 1, wherein best IO performance is a better of an IO performance of the source storage and an IO performance of the destination storage if the IO performance of the source storage and the IO performance of the destination storage are not the same, or the IO performance of the source storage if the IO performance of the source storage and the IO performance of the destination storage are the same, wherein IO performance during migration is an IO performance experienced during migrating the virtual machine, wherein data written to SSD per time unit is an amount of data written to the source storage per time unit if the source storage is a source SSD plus an amount of data written to the destination storage per time unit if the destination storage is a destination SSD, or zero if both the source storage is a source HDD and the destination storage is a destination HDD, wherein workload data writes per time unit is the amount of data written to the source storage per time unit plus the amount of data written to the destination storage per time unit during copying the virtual machine disk image from the source storage to the destination storage and handling virtual machine IO requests from the virtual machine during copying the virtual machine disk image from the source storage to the destination storage, wherein migration time is a period of time to complete copying the virtual machine disk image from the source storage to the destination storage and handling virtual machine IO requests from the virtual machine during copying the virtual machine disk image from the source storage to the destination storage, wherein image copy time is an amount of time copying the virtual machine disk image from the source storage to the destination storage would take if such copying were not interrupted, wherein copying the virtual machine image from the source storage to the destination storage and handling the virtual machine IO requests from the virtual machine during copying the virtual machine disk image from the source storage to the destination storage is accomplished via a one of the at least two ways having a lowest total cost of migration.

Embodiment 48

A method of transferring a virtual machine storage, comprising:

copying a virtual machine disk image of a virtual machine from a source storage to a destination storage, wherein the virtual machine disk image has a plurality of data blocks; and handling virtual machine IO requests from the virtual machine during copying the virtual machine disk image from the source storage to the destination storage, calculating a total cost of migration to copy one or more data blocks of the virtual machine from the source storage to the destination storage and handle the virtual machine IO requests during copying the virtual disk image from the source storage to the destination storage, where a total cost of migration, MC, is based on:

an IO penalty, $\lambda_{IO}$;
a migration time factor, $\lambda_{migration\ time}$;
a wear out factor, $\lambda_{wear\ out}$; and
a weight, $\gamma$, as follows:

$$MC = \gamma * \lambda_{wear\ out} * \lambda_{migration\ time} + (1 - \gamma) * \lambda_{IO} * \lambda_{migration\ time}$$
$$= \lambda_{migration\ time} * (\gamma * \lambda_{wear\ out} + (1 - \gamma) * \lambda_{IO}),$$

where $$\lambda_{IO} = \frac{\text{Best } IO \text{ Performance} - IO \text{ Performance during migration}}{\text{Best } IO \text{ Performance}},$$

$$\lambda_{wear\ out} = \frac{\text{data written to } SSD \text{ per time unit}}{\text{Workload Data Writes per time unit}},$$

$$\lambda_{migration\ time} = \frac{\text{migration time}}{\text{image copy time}}, \text{ and}$$

$\gamma$ is greater than or equal to 0 and less than or equal to 1, wherein best IO performance is a better of an IO performance of the source storage and an IO performance of the destination storage if the IO performance of the source storage and the IO performance of the destination storage are not the same, or the IO performance of the source storage if the IO performance of the source storage and the IO performance of the destination storage are the same, wherein IO performance during migration is an IO performance experienced during migrating the virtual machine, wherein data written to SSD per time unit is an amount of data written to the source storage per time unit if the source storage is a source SSD plus an amount of data written to the destination storage per time unit if the destination storage is a destination SSD, or zero if both the source storage is a source HDD and the destination storage is a destination HDD, wherein workload data writes per time unit is the amount of data written to the source storage per time unit plus the amount of data written to the destination storage per time unit during copying the virtual machine disk image from the source storage to the destination storage and handling virtual machine IO requests from the virtual machine during copying the virtual machine disk image from the source storage to the destination storage, wherein migration time is a period of time to complete copying the virtual machine disk image from the source storage to the destination storage and handling virtual machine IO requests from the virtual machine during copying the virtual machine disk image from the source storage to the destination storage, wherein image copy time is an amount of time copying the virtual machine disk image from the source storage to the destination storage would take if such copying were not interrupted.

Embodiment 49

The method according to Embodiment 48, wherein the amount of data written to the source storage per time unit if the source storage is a source SSD is an estimate of the amount of data written to the source storage per time unit if the source storage is a source SSD, wherein the amount of data written to the destination storage per time unit if the destination storage is a destination SSD is an estimate of the amount of data written to the destination storage per time unit if the destination storage is a destination SSD, and wherein the period of time to complete copying the virtual machine disk image from the source storage to the destination storage and handling virtual machine IO requests from the virtual machine during copying the virtual machine disk image from the source storage to the destination storage is an estimate of the period of time to complete copying the virtual machine disk image from the source storage to the destination storage and handling virtual machine IO requests from the virtual machine during copying the virtual machine disk image from the source storage to the destination storage.

Embodiment 50

A method of transferring a virtual machine storage, comprising:

copying a virtual machine disk image of a virtual machine from a source storage to a destination storage, wherein the virtual machine disk image has a plurality of data blocks; and handling virtual machine IO requests from the virtual machine during copying the virtual machine disk image from the source storage to the destination storage, calculating at least one total cost of migration for a corresponding at least one way to copy one or more data blocks of the virtual machine from the source storage to the destination storage and handle the virtual machine IO requests during copying the virtual disk image from the source storage to the destination storage.

Embodiment 51

A method of determining a total cost of migration for transferring a virtual machine storage, comprising:

receiving information regarding a virtual machine disk image corresponding to a virtual machine, a source storage, and a destination storage; and calculating a total cost of migration, where the total cost of migration, MC, is based on:

an IO penalty, $\lambda_{IO}$;
a migration time factor, $\lambda_{migration\ time}$;
a wear out factor, $\lambda_{wear\ out}$; and a weight, $\gamma$, as follows:

$$MC = \gamma * \lambda_{wear\ out} * \lambda_{migration\ time} + (1-\gamma) * \lambda_{IO} * \lambda_{migration\ time}$$
$$= \lambda_{migration\ time} * (\gamma * \lambda_{wear\ out} + (1-\gamma) * \lambda_{IO}),$$

where $$\lambda_{IO} = \frac{\text{Best IO Performance} - \text{IO Performance during migration}}{\text{Best IO Performance}},$$

$$\lambda_{wear\ out} = \frac{\text{data written to SSD per time unit}}{\text{Workload Data Writes per time unit}},$$

$$\lambda_{migration\ time} = \frac{\text{migration time}}{\text{image copy time}}, \text{ and}$$

$\gamma$ is greater than or equal to 0 and less than or equal to wherein best IO performance is a better of an IO performance of the source storage and an IO performance of the destination storage if the IO performance of the source storage and the IO performance of the destination storage are not the same, or the IO performance of the source storage if the IO performance of the source storage and the IO performance of the destination storage are the same, wherein IO performance during migration is an IO performance experienced during migrating the virtual machine, wherein data written to SSD per time unit is an amount of data written to the source storage per time unit if the source storage is a source SSD plus an amount of data written to the destination storage per time unit if the destination storage is a destination SSD, or zero if both the source storage is a source HDD and the destination storage is a destination HDD, wherein workload data writes per time unit is the amount of data written to the source storage per time unit plus the amount of data written to the destination storage per time unit during copying the virtual machine disk image from the source storage to the destination storage and handling virtual machine IO requests from the virtual machine during copying the virtual machine disk image from the source storage to the destination storage, wherein migration time is a period of time to complete copying the virtual machine disk image from the source storage to the destination storage and handling virtual machine IO requests from the virtual machine during copying the virtual machine disk image from the source storage to the destination storage, wherein image copy time is an amount of time copying the virtual machine disk image from the source storage to the destination storage would take if such copying were not interrupted.

Embodiment 52

The method according to Embodiment 51, wherein the amount of data written to the source storage per time unit if the source storage is a source SSD is an estimate of the amount of data written to the source storage per time unit if the source storage is a source SSD, wherein the amount of data written to the destination storage per time unit if the destination storage is a destination SSD is an estimate of the amount of data written to the destination storage per time unit if the destination storage is a destination SSD, and wherein the period of time to complete copying the virtual machine disk image from the source storage to the destination storage and handling virtual machine IO requests from the virtual machine during copying the virtual machine disk image from the source storage to the destination storage is an estimate of the period of time to complete copying the virtual machine disk image from the source storage to the destination storage and handling virtual machine IO requests from the virtual machine during copying the virtual machine disk image from the source storage to the destination storage.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

[1] "Amazon EC2", http://aws.amazon.com/ec2/
[2] "Microsoft Azure" http://www.windowsazure.com/en-us/
[3] "Flash Drives Replace Disks at Amazon, Facebook, Dropbox". http://www.wired.com/wiredenterprise/2012/06/flash-data-centers/
[4] "Morphlabs, Dell DCS Team on SSD-Powered Cloud" http://www.datacenterknowledge.com/archives/2012/03/28/morphlabsdell-dcs-team-on-ssd-powered-cloud/
[5] "SolidFire develops all-SSD system for cloud storage providers" http://searchstoragechannel.techtarget.com/news/2240037093/SolidFiredevelops-al-SSD-system-for-cloud-storage-providers
[6] Intel takes their SSD reliability to the datacenter http://www.zdnet.com/blog/datacenter/intel-takes-their-ssd-reliability-tothe-datacenter/1316
[7] Gokul Soundararajan, Vijayan Prabhakaran, et al, Extending SSD Lifetimes with Disk-Based Write Caches, FAST 2010
[8] EMC, http://www.us.emc.com/index.htm
[9] Winchester Systems, http://www.winsys.com
[10] Ali Mashtizadeh, et al, The Design and Evolution of Live Storage Migration in VMware ESX, ACT 2011
[11] Robert Bradford, Evangelos Kotsovinos, Anja Feldmann, Harald Schio'berg, Live Wide-Area Migration of Virtual Machines Including Local Persistent State, VEE 2007
[12] Yingwei Luo, Binbin Zhang, et al, Live and Incremental Whole-System Migration of Virtual Machines Using Block-Bitmap, ICCC 2008
[13] Jie Zheng T. S. Eugene Ng, Kunwadee Sripanidkulchai, Workload-Aware Live Storage Migration for Clouds, VEE 2011
[14] Takahiro Hirofuchi, et al, A Live Storage Migration Mechanism over WAN for Relocatable Virtual Machine Services on Clouds, CCGRID 2009
[15] XEN Project http://www.xen.org, January 2009
[16] Iometer project, http://www.iometer.org
[17] Dbench, http://dbench.samba.org
[18] IOzone File System Benchmark, http://www.iozone.org
[19] Aameek Singh, Madhukar Korupolu, et al, Server-Storage Virtualization: Integration and Load Balancing in Data Centers, SC 2008
[20] Seonyeong Park, A comprehensive study of energy efficiency and performance of flash-based SSD, Journal of Systems Architecture, 2011
[21] Guanying Wu and Xubin He, AFTL: Improving SSD Lifetime via Exploiting Content Locality, EuroSys 2012
[22] Youngjae Kim, et al, HybridStore: A Cost-Efficient, High-Performance Storage System Combining SSDs and HDDs, MASCOTS 2011
[23] Heeseung Jo, Youngjin Kwon, Hwanju Kim, Euiseong Seo, Joonwon Lee, and Seungryoul Maeng, SSD-HDD-Hybrid Virtual Disk in Consolidated Environments, VHPC 2009
[24] Feng Chen, David Koufaty, Xiaodong Zhang, Hystor: Making the Best Use of Solid State Drives in High Performance Storage Systems, ICS 2011
[25] William K. Josephson, et al, DFS: A File System for Virtualized Flash Storage, ACM Transactions on Storage, September 2010.
[26] Bob Laliberte, Delivering Greater Effectiveness and Efficiency for SANs in Virtualized Data Centers. White Paper, EMC.
[27] Intel Launches DC S3700 SSD For Data Centers http://hothardware.com/News/Intel-Launches-New-Datacenter-SSDs-Emphasizes-Data-Protection-High-Performance

We claim:

1. A method of transferring a virtual machine storage, comprising:

copying a virtual machine disk image of a virtual machine from a source storage to a destination storage, wherein the virtual machine disk image has a plurality of data blocks; and handling virtual machine IO requests from the virtual machine during copying the virtual machine disk image from the source storage to the destination storage, wherein copying the virtual machine disk image from the source storage to the destination storage and handling the virtual machine IO requests from the virtual machine during copying the virtual machine disk image from the source storage to the destination storage is accomplished via (a), (b), or (c), as follows:

(a) copying the plurality of data blocks of the virtual machine disk image from the source storage to the destination storage;

partitioning the virtual machine disk image into a copied region and a to-be-copied region, where the copied region has been copied from the source storage to the destination storage, wherein the to-be-copied region is going to be copied from the source storage to the destination storage;

intercepting the virtual machine IO requests from the virtual machine, where the virtual machine IO requests from the virtual machine comprise write requests to the virtual machine disk image and read requests to the virtual machine disk image, wherein the write requests to the virtual machine disk image comprise write requests to the copied region and write requests to the to-be-copied region, wherein the read requests to the virtual machine disk image comprise read requests to the copied region and read requests to the to-be-copied region;

recording the write requests to the to-be-copied region in a bitmap;
reading data for read requests to the copied region from the destination storage;
wherein for each read request to the to-be-copied region,
(i) checking the bitmap to determine whether a data block corresponding to the each read request to the to-be-copied region is recorded in the bitmap;
(ii) if the data block corresponding to the each read request to the to-be-copied region is recorded in the bitmap, issuing the each read request to the to-be-copied region to the destination storage; and
(iii) if the data block corresponding to the each read request to the to-be-copied region is not recorded in the bitmap, issuing the each read request to the to-be-copied region to the source storage;
wherein for write requests to the virtual machine disk image and read requests to the virtual machine disk image intercepted while data blocks corresponding to such intercepted write requests to the virtual machine disk image and such intercepted read requests to the virtual machine disk image are being copied from the source storage to the destination storage, accomplishing such intercepted write requests to the virtual machine disk image and such intercepted read requests to the virtual machine disk image after the data blocks corresponding to such intercepted write requests to the virtual machine disk image and such intercepted read requests to the virtual machine disk image have been copied from the source storage to the destination storage,
wherein copying the plurality of data blocks of the virtual machine disk image from the source storage to the destination storage comprises:
for each data block of the plurality of data blocks of the virtual machine disk image to be copied from the source storage to the destination storage,
(i) checking the bitmap to determine whether the each data block of the plurality of data blocks of the virtual machine disk image to be copied from the source storage to the destination storage is recorded in the bitmap;
(ii) if the each data block of the plurality of data blocks of the virtual machine disk image to be copied from the source storage to the destination storage is not recorded in the bitmap, copying the each data block of the plurality of data blocks of the virtual machine disk image to be copied from the source storage to the destination storage; and
(iii) if the each data block of the plurality of data blocks of the virtual machine disk image to be copied from the source storage to the destination storage is recorded in the bitmap, skipping copying the each data block of the plurality of data blocks of the virtual machine disk image to be copied from the source storage to the destination storage,
(b) copying the plurality of data blocks of the virtual machine disk image from the source storage to the destination storage,
partitioning the virtual machine disk image into a copied region and a to-be-copied region, where the copied region has been copied from the source storage to the destination storage, wherein the to-be-copied region is going to be copied from the source storage to the destination storage;
intercepting the virtual machine IO requests from the virtual machine, where the virtual machine IO requests from the virtual machine comprise write requests to the virtual machine disk image and read requests to the virtual machine disk image, wherein the write requests to the virtual machine disk image comprise write requests to the copied region and write requests to the to-be-copied region, wherein the read requests to the virtual machine disk image comprise read requests to the copied region and read requests to the to-be-copied region;
issuing write requests to the to-be-copied region and read requests to the to-be-copied region to the source storage;
recording the write requests to the copied region in a bitmap;
issuing the write requests to the copied region to the destination storage;
wherein for each read request to the copied region,
(i) checking the bitmap to determine whether a data block corresponding to the each read request to the copied region has been updated by one or more write requests to the virtual machine disk image;
(ii) if the data block corresponding to the each read request to the copied region has been updated by one or more write requests to the virtual machine disk image, reading the data block corresponding to the each read request to the copied region from the destination storage; and
(iii) if the data block corresponding to the each read request to the copied region has not been updated by one or more write requests to the virtual machine disk image, reading the data block corresponding to the each read request to the copied region from the source storage,
(c) copying the plurality of data blocks of the virtual machine disk image from the source storage to the destination storage;
partitioning the virtual machine disk image into a copied region and a to-be-copied region, where the copied region has been copied from the source storage to the destination storage, wherein the to-be-copied region is going to be copied from the source storage to the destination storage;
intercepting the virtual machine IO requests from the virtual machine, wherein the virtual machine IO requests from the virtual machine comprise write requests to the virtual machine disk image and read requests to the virtual machine disk image, wherein the write requests to the virtual machine disk image comprise write requests to the copied region and write requests to the to-be-copied region, wherein the read requests to the virtual machine disk image comprise read requests to the copied region and read requests to the to-be-copied region;
issuing write requests to the to-be-copied region and read requests to the to-be-copied region to the source storage;
issuing read requests to the copied region to the source storage;
wherein for each write request to the copied region,
(i) checking to determine a number of pending write requests to the copied region, wherein the number of pending write requests to the copied region is a number of write requests to the copied region that have been issued to the source storage and issued to the destination storage minus a number of the write requests to the copied region issued to source storage and issued to destination storage where both the write request to the copied region issued to the source storage and the write request to the copied region issued to the destination storage have been accomplished, (ii) if the number of pending write requests to the copied region is less than or equal to a threshold number, issuing the each write request to the copied region to the source storage and issuing the each write request to the copied region to the destination storage;

(iii) if the number of pending write requests to the copied region is greater than the threshold number,
(a) delaying; and
(b) repeating (i), (ii), and (iii) until the each write request to the copied region is issued to the source storage and issued to the destination storage, wherein when the each write request to the copied region issued to the source storage is accomplished or the each write request to the copied region issued to the destination storage is accomplished, marking the each write request to the copied region as completed and returning the each write request to the copied region marked as completed to the virtual machine.

2. The method according to claim 1, wherein the bitmap is on a memory, wherein the memory is external to the source storage, wherein the memory is external to the destination storage.

3. The method according to claim 1, wherein in (c), further comprising:

incrementing a counter for each write request to the copied region issued to the source storage and issued to the destination storage; and decrementing the counter when both the each write request to the copied region issued to the source storage is accomplished and the each write request to the copied region issued to the destination storage is accomplished, wherein checking to determine a number of pending write requests to the copied region comprises:

checking the counter, wherein the counter tracks the number of pending write requests to the copied region.

4. The method according to claim 3, wherein incrementing the counter occurs prior to issuing the each write request to the copied region to the source storage and issuing the each write request to the copied region to the destination storage.

5. The method according to claim 1, wherein in (b), accomplishing such intercepted write requests to the virtual machine disk image and such intercepted read requests to the virtual machine disk image after the data blocks corresponding to such intercepted write requests to the virtual machine disk image and such intercepted read requests to the virtual machine disk image have been copied from the source storage to the destination storage comprises:

deferring such intercepted write requests to the virtual machine disk image and such intercepted read requests to the virtual machine disk image;

putting such intercepted write requests to the virtual machine disk image and such intercepted read requests to the virtual machine disk image into a queue; and handling such intercepted write requests to the virtual machine disk image and such intercepted read requests to the virtual machine disk image after the data blocks corresponding to such intercepted write requests to the virtual machine disk image and such intercepted read requests to the virtual machine disk image have been copied from the source storage to the destination storage.

6. The method according to claim 1, wherein copying the virtual machine disk image from the source storage to the destination storage and handling the virtual machine IO requests from the virtual machine is accomplished without service interruption to a running workload on the virtual machine.

7. The method according to claim 1, wherein the source storage is a source solid state drive (SSD) or a source hard disk drive (HDD), wherein the destination storage is a destination SSD or a destination HDD.

8. The method according to claim 7, wherein the source storage is the source SSD and the destination storage is the destination SSD.

9. The method according to claim 7, wherein the source storage is the source SSD and the destination storage is the destination HDD.

10. The method according to claim 7, wherein the source storage is the source HDD and the destination storage is the destination SSD.

11. The method according to claim 7, wherein the source storage is the source HDD and the destination storage is the destination HDD.

12. The method according to claim 1, wherein copying the virtual machine disk image from the source storage to the destination storage and handling the virtual machine IO requests from the virtual machine during copying the virtual machine disk image from the source storage to the destination storage comprises copying the virtual machine disk image from the source storage to the destination storage and handling the virtual machine IO requests from the virtual machine via a one of (a), (b), and (c) having a lowest total cost of migration of a total cost of migration of (a), a total cost of migration of (b), and a total cost of migration of (c), where a total cost of migration, MC, is based on:

an IO penalty, $\lambda_{IO}$;
a migration time factor, $\lambda_{migration\ time}$;
a wear out factor, $\lambda_{wear\ out}$; and
a weight, $\gamma$, as follows:

$$MC = \gamma * \lambda_{wear\ out} * \lambda_{migration\ time} + (1 - \gamma) * \lambda_{IO} * \lambda_{migration\ time}$$

$$= \lambda_{migration\ time} * (\gamma * \lambda_{wear\ out} + (1 - \gamma) * \lambda_{IO}),$$

where $$\lambda_{IO} = \frac{\text{Best IO Performance} - \text{IO Performance during migration}}{\text{Best IO Performance}},$$

$$\lambda_{wear\ out} = \frac{\text{data written to SSD per time unit}}{\text{Workload Data Writes per time unit}},$$

$$\lambda_{migration\ time} = \frac{\text{migration time}}{\text{image copy time}}, \text{ and}$$

$\gamma$ is greater than or equal to 0 and less than or equal to 1, wherein best IO performance is a better of an IO performance of the source storage and an IO performance of the destination storage if the IO performance of the source storage and the IO performance of the destination storage are not the same, or the IO performance of the source storage if the IO performance of the source storage and the IO performance of the destination storage are the same, wherein IO performance during migration is an IO performance experienced during migrating the virtual machine, wherein data written to SSD per time unit is an estimate of an amount of data written to the source storage per time unit if the source storage is a source SSD plus an estimate of an amount of data written to the destination storage per time unit if the destination storage is a destination SSD, or zero if both the source storage is a source HDD and the destination storage is a destination HDD, wherein workload data writes per time unit is the estimate of the amount of data written to the source storage per time plus the estimate of the amount of data written to the destination storage per time unit during copying the virtual machine disk image from the source storage to the destination storage and handling virtual machine IO requests from the virtual machine during copying the virtual machine disk image from the source storage to the destination storage, wherein migration time is an estimate of a period of time to complete copying the virtual machine disk image from the source storage to the destination storage and handling virtual machine IO requests from the virtual machine during copying the virtual machine disk image from the source storage to the destination storage, wherein image copy time is an amount of time copying the virtual machine disk image from the source storage to the destination storage would take if such copying were not interrupted.

13. The method according to claim 12, further comprising: calculating at least two of the following:
(1) the total cost of migration for (a);
(2) the total cost of migration for (b); and
(3) the total cost of migration for (c).

14. The method according to claim 13, wherein prior to calculating the at least two of (1), (2), and (3), further comprising:
determining the IO performance of the source storage;
determining the IO performance of the destination storage;
if the source storage is a source SSD, determining the estimate of the amount of data written to the source storage per time unit;
if the destination storage is a destination SSD, determining the estimate of the amount of data written to the destination storage per time unit;
determining the estimate of the amount of data written to the source storage per time unit plus the estimate of the amount of data written to the destination storage per time unit;
determining the estimate of the period of time to complete copying the virtual machine disk image from the source storage to the destination storage and handling virtual machine IO requests from the virtual machine during copying the virtual machine disk image from the source storage to the destination storage; and
determining the amount of time copying the virtual machine disk image from the source storage to the destination storage would take if such copying were not interrupted.

15. The method according to claim 14, wherein migration time is determined from a size of the virtual machine disk image, the IO performance of the source storage, and the IO performance of the destination storage, and the estimate of the amount of data written to the source storage per time unit plus the estimate of the amount of data written to the destination storage per time unit, wherein the estimate of the amount of data written to the source storage per time unit plus the estimate of the amount of data written to the destination storage per time unit is determined from an estimate of workload data writes per time unit.

16. The method according to claim 12, further comprising:
receiving a size of the virtual machine disk image;
receiving an estimate of the workload data writes per time unit;
receiving an indication as to whether the source storage is a SSD or an HDD and the IO performance of the source storage, wherein the amount of data written to the source storage per time unit is the IO performance of the source storage;
receiving an indication as to whether the destination storage is a SSD or an HDD and the IO performance of the destination storage, wherein the amount of data written to the destination storage per time unit is the IO performance of the destination storage;
determining the estimate of the period of time to complete copying the virtual machine disk image from the source storage to the destination storage and handling virtual machine IO requests from the virtual machine during copying the virtual machine disk image from the source storage to the destination storage, wherein the estimate of the period of time to complete copying the virtual machine disk image from the source storage to the destination storage and handling virtual machine IO requests from the virtual machine during copying the virtual machine disk image from the source storage to the destination storage is determined from the size of the virtual machine disk image, the estimate of the workload data writes per time unit, the indication as to whether the source storage is a SSD or an HDD, the IO performance of the source storage, the indication as to whether the destination storage is a SSD or an HDD, and the IO performance of the destination storage; and
determining the amount of time copying the virtual machine disk image from the source storage to the destination storage would take if such copying were not interrupted from the size of the virtual machine disk image, wherein the amount of time copying the virtual machine disk image from the source storage to the destination storage would take if such copying were not interrupted from the size of the virtual machine disk image is determined from the size of the virtual machine disk image, the indication as to whether the source storage is a SSD or an HDD, the IO performance of the source storage, the indication as to whether the destination storage is a SSD or an HDD, and the IO performance of the destination storage.

17. The method according to claim 13, further comprising determining a lowest of the at least two of (1), (2), and (3) that were calculated, wherein the lowest total cost of migration is the lower of the at least two of (1), (2) and (3) that were calculated is the lowest total cost of migration.

18. The method according to claim 17, wherein the at least two of (1), (2), and (3) that were calculated is the total cost of migration for (a), the total cost of migration for (b), and the total cost of migration for (c).

19. The method according to claim 1, wherein copying the virtual machine disk image from the source storage to the destination storage and handling the virtual machine IO requests from the virtual machine during copying the virtual machine disk image from the source storage to the destination storage is accomplished via (a).

20. The method according to claim 19, wherein the destination storage is a destination SSD.

21. The method according to claim 1, wherein copying the virtual machine disk image from the source storage to the destination storage and handling the virtual machine IO requests from the virtual machine during copying the virtual machine disk image from the source storage to the destination storage is accomplished via (b).

22. The method according to claim 21, wherein the source storage is a SSD and the destination storage is a HDD.

23. The method according to claim 21, wherein issuing the write requests to the copied region to the destination storage keeps the copied region up-to-date without invoking a merge process.

24. The method according to claim 1, wherein copying the virtual machine disk image from the source storage to the destination storage and handling the virtual machine IO requests from the virtual machine during copying the virtual machine disk image from the source storage to the destination storage is accomplished via (c).

25. The method according to claim 24, wherein the source storage is a SSD and the destination storage is a HDD.

26. The method according to claim 24, wherein more than 50% of the write requests to the virtual machine are issued to the source storage during copying the virtual machine disk image from the source storage to the destination storage and handling the virtual machine IO requests from the virtual machine during copying the virtual machine disk image from the source storage to the destination storage.

27. The method according to claim 24, wherein at least a portion of the pending write requests to the copied region are completed when a virtual machine CPU is computing, when virtual machine memory data is being accessed, and/or when read requests to the virtual machine disk image are being accomplished.

28. The method according to claim 1, wherein in (c), further comprising:
when the source storage is a source SSD and the destination storage is a destination HDD,
incrementing a counter for each write request to the copied region issued to the destination storage; and
decrementing the counter when the each write request to the copied region issued to the destination storage is accomplished,
wherein checking to determine a number of pending write requests to the copied region comprises:
checking the counter, wherein the counter tracks the number of pending write requests to the copied region,
wherein in (c), when the source storage is a source HDD and the destination storage is a destination SSD,
incrementing a counter for each write request to the copied region issued to the source storage; and
decrementing the counter when both the each write request to the copied region issued to the source storage is accomplished,
wherein checking to determine a number of pending write requests to the copied region comprises:
checking the counter, wherein the counter tracks the number of pending write requests to the copied region.

29. The method according to claim 1, wherein with respect to (c), delaying comprises delaying for a certain period of time.

30. The method according to claim 1, wherein the source storage is a source disk array comprising a plurality of source array storages, wherein the destination storage is a destination disk array comprising a plurality of destination array storages, wherein each source array storage of the plurality of source array storages corresponds to a corresponding destination array storage of the plurality of destination array storages, such that the each source array storage is copied to the corresponding destination array storage, wherein each source array storage is copied to the corresponding destination array storage via a one of (a), (b), or (c) having the lowest total cost of migration with respect to the each source array storage and the corresponding destination array storage.

31. The method according to claim 12, wherein the lowest total cost of migration is lower than a total cost of migration for copying the virtual machine disk image from the source storage to the destination storage and handling the virtual machine IO requests from the virtual machine during copying the virtual machine disk image from the source storage to the destination storage via dirty block tracking, wherein the lowest total cost of migration is lower than a total cost of migration for copying the virtual machine disk image from the source storage to the destination storage and handling the virtual machine IO requests from the virtual machine during copying the virtual machine disk image from the source storage to the destination storage via IO mirroring.

32. The method according to claim 12, wherein migration time is the image copy time plus downtime, wherein the downtime is an amount of time the virtual machine is paused during copying the virtual machine disk image from the source storage to the destination storage and handling the virtual machine IO requests from the virtual machine during copying the virtual machine disk image from the source storage to the destination storage.

33. The method according to claim 19, wherein when the destination storage is a destination SSD storage, more than 50% of the write requests to the virtual machine disk image are issued to the destination storage during copying the virtual machine disk image from the source storage to the destination storage and handling the virtual machine IO requests from the virtual machine during copying the virtual machine disk image from the source storage to the destination storage.

34. The method according to claim 19, wherein when the destination storage is a destination SSD storage, at least 95% of the write requests are issued to the destination storage during copying the virtual machine disk image from the source storage to the destination storage and handling the virtual machine IO requests from the virtual machine during copying the virtual machine disk image from the source storage to the destination storage.

35. A method of migrating a virtual machine, comprising:
transferring a CPU state of a virtual machine and memory data of the virtual machine; and
transferring a virtual machine storage of the virtual machine, wherein transferring the virtual machine storage of the virtual machine is accomplished via the method of claim 1.

36. A virtual machine management system, comprising a non-volatile, computer readable media with instructions for performing the method of transferring a virtual machine storage of claim 1.

37. The method according to claim 1, wherein when the source storage is a source SSD and the destination storage is a destination HDD,
(i) if $CO_2 \leq \gamma \leq 1.0$, copying the virtual machine image from the source storage to the destination storage and handling the virtual machine IO requests from the virtual machine during copying the virtual machine disk image from the source storage to the destination storage is accomplished via (a);
(ii) if $CO_1 \leq \gamma < CO_2$, copying the virtual machine image from the source storage to the destination storage and handling the virtual machine IO requests from the virtual machine during copying the virtual machine disk image from the source storage to the destination storage is accomplished via (b); and (iii) if $0 \leq \gamma < CO_1$, copying the virtual machine image from the source storage to the destination storage and handling the virtual machine IO requests from the virtual machine during copying the virtual machine disk image from the source storage to the destination storage is accomplished via (c), where $CO_1$ is a first cutoff and $CO_2$ is a second cutoff.

38. The method according to claim 37, wherein $CO_1=0.3$ and $CO_2=0.6$.

39. The method according to claim 1, wherein when the source storage is a source SSD and the destination storage is a destination HDD, (i) if $CO_1 \leq \gamma \leq 1.0$, copying the virtual machine image from the source storage to the destination storage and handling the virtual machine IO requests from the virtual machine during copying the virtual machine disk image from the source storage to the destination storage is accomplished via (a); and (ii) if $0 \leq \gamma < CO_1$, copying the virtual machine image from the source storage to the destination storage and handling the virtual machine IO requests from the virtual machine during copying the virtual machine disk image from the source storage to the destination storage is accomplished via (b).

40. The method according to claim 39, wherein $CO_1=0.6$.

41. The method according to claim 1, wherein when the source storage is a source SSD and the destination storage is a destination HDD, (i) if $CO_1 \leq \gamma \leq 1.0$, copying the virtual machine image from the source storage to the destination storage and handling the virtual machine IO requests from the virtual machine during copying the virtual machine disk image from the source storage to the destination storage is accomplished via (a); and (ii) if $0 \leq \gamma < CO_1$, copying the virtual machine image from the source storage to the destination storage and handling the virtual machine IO requests from the virtual machine during copying the virtual machine disk image from the source storage to the destination storage is accomplished via (c).

42. The method according to claim 41, wherein $CO_1=0.5$.

43. The method according to claim 1, wherein when the source storage is a source SSD and the destination storage is a destination HDD, (i) if $CO_1 \leq \gamma \leq 1.0$, copying the virtual machine image from the source storage to the destination storage and handling the virtual machine IO requests from the virtual machine during copying the virtual machine disk image from the source storage to the destination storage is accomplished via (b); and (ii) if $0 \leq \gamma < CO_1$, copying the virtual machine image from the source storage to the destination storage and handling the virtual machine IO requests from the virtual machine during copying the virtual machine disk image from the source storage to the destination storage is accomplished via (c).

44. The method according to claim 43, wherein $CO_1=0.3$.

45. The method according to claim 1, further comprising: receiving a selection of (a), (b), or (c) from a user.

46. The method according to claim 12, further comprising receiving $\gamma$ from a user, wherein $\gamma$ is based on the user's preference.

47. A method of transferring a virtual machine storage, comprising:

copying a virtual machine disk image of a virtual machine from a source storage to a destination storage, wherein the virtual machine disk image has a plurality of data blocks; and handling virtual machine IO requests from the virtual machine during copying the virtual machine disk image from the source storage to the destination storage, calculating at least two total costs of migration for a corresponding at least two ways to copy one or more data blocks of the virtual machine from the source storage to the destination storage and handle the virtual machine IO requests during copying the virtual disk image from the source storage to the destination storage, where a total cost of migration, MC, is based on:

an IO penalty, $\lambda_{IO}$;
a migration time factor, $\lambda$migration time;
a wear out factor, $\lambda_{wear\ out}$; and
a weight, $\gamma$, as follows:

$$MC = \gamma * \lambda_{wear\ out} * \lambda_{migration\ time} + (1-\gamma) * \lambda_{IO} * \lambda_{migration\ time}$$
$$= \lambda_{migration\ time} * (\gamma * \lambda_{wear\ out} + (1-\gamma) * \lambda_{IO}),$$

where $$\lambda_{IO} = \frac{\text{Best IO Performance} - \text{IO Performance during migration}}{\text{Best IO Performance}},$$

$$\lambda_{wear\ out} = \frac{\text{data written to SSD per time unit}}{\text{Workload Data Writes per time unit}},$$

$$\lambda_{migration\ time} = \frac{\text{migration time}}{\text{image copy time}}, \text{ and}$$

$\gamma$ is greater than or equal to 0 and less than or equal to 1, wherein best IO performance is a better of an IO performance of the source storage and an IO performance of the destination storage if the IO performance of the source storage and the IO performance of the destination storage are not the same, or the IO performance of the source storage if the IO performance of the source storage and the IO performance of the destination storage are the same, wherein IO performance during migration is an IO performance experienced during migrating the virtual machine, wherein data written to SSD per time unit is an estimate of an amount of data written to the source storage per time unit if the source storage is a source SSD plus an estimate of an amount of data written to the destination storage per time unit if the destination storage is a destination SSD, or zero if both the source storage is a source HDD and the destination storage is a destination HDD, wherein workload data writes per time unit is the estimate of the amount of data written to the source storage per time unit plus the estimate of the amount of data written to the destination storage per time unit during copying the virtual machine disk image from the source storage to the destination storage and handling virtual machine IO requests from the virtual machine during copying the virtual machine disk image from the source storage to the destination storage, wherein migration time is an estimate of a period of time to complete copying the virtual machine disk image from the source storage to the destination storage and handling virtual machine IO requests from the virtual machine during copying the virtual machine disk image from the source storage to the destination storage, wherein image copy time is an amount of time copying the virtual machine disk image from the source storage to the destination storage would take if such copying were not interrupted, wherein copying the virtual machine image from the source storage to the destination storage and handling the virtual machine IO requests from the virtual machine during copying the virtual machine disk image from the source storage to the destination storage is accomplished via a one of the at least two ways having a lowest total cost of migration.

48. A method of transferring a virtual machine storage, comprising:

copying a virtual machine disk image of a virtual machine from a source storage to a destination storage, wherein the virtual machine disk image has a plurality of data blocks; and handling virtual machine IO requests from the virtual machine during copying the virtual machine disk image from the source storage to the destination storage, calculating a total cost of migration to copy one or more data blocks of the virtual machine from the source storage to the destination storage and handle the virtual machine IO requests during copying the virtual disk image from the source storage to the destination storage, where a total cost of migration, MC, is based on:

an IO penalty, $\lambda_{IO}$;
a migration time factor, $\lambda_{migration\ time}$;
a wear out factor, $\lambda_{wear\ out}$; and
a weight, $\gamma$, as follows:

$$MC = \gamma * \lambda_{wear\ out} * \lambda_{migration\ time} + (1-\gamma) * \lambda_{IO} * \lambda_{migration\ time}$$
$$= \lambda_{migration\ time} * (\gamma * \lambda_{wear\ out} + (1-\gamma) * \lambda_{IO}),$$

where $$\lambda_{IO} = \frac{\text{Best } IO \text{ Performance} - IO \text{ Performance during migration}}{\text{Best } IO \text{ Performance}},$$

$$\lambda_{wear\ out} = \frac{\text{data written to } SSD \text{ per time unit}}{\text{Workload Data Writes per time unit}},$$

$$\lambda_{migration\ time} = \frac{\text{migration time}}{\text{image copy time}}, \text{ and}$$

$\gamma$ is greater than or equal to 0 and less than or equal to 1, wherein best IO performance is a better of an IO performance of the source storage and an IO performance of the destination storage if the IO performance of the source storage and the IO performance of the destination storage are not the same, or the IO performance of the source storage if the IO performance of the source storage and the IO performance of the destination storage are the same, wherein IO performance during migration is an IO performance experienced during migrating the virtual machine, wherein data written to SSD per time unit is an amount of data written to the source storage per time unit if the source storage is a source SSD plus an amount of data written to the destination storage per time unit if the destination storage is a destination SSD, or zero if both the source storage is a source HDD and the destination storage is a destination HDD, wherein workload data writes per time unit is the amount of data written to the source storage per time unit plus the amount of data written to the destination storage per time unit during copying the virtual machine disk image from the source storage to the destination storage and handling virtual machine IO requests from the virtual machine during copying the virtual machine disk image from the source storage to the destination storage, wherein migration time is a period of time to complete copying the virtual machine disk image from the source storage to the destination storage and handling virtual machine IO requests from the virtual machine during copying the virtual machine disk image from the source storage to the destination storage, wherein image copy time is an amount of time copying the virtual machine disk image from the source storage to the destination storage would take if such copying were not interrupted.

49. The method according to claim 48, wherein the amount of data written to the source storage per time unit if the source storage is a source SSD is an estimate of the amount of data written to the source storage per time unit if the source storage is a source SSD, wherein the amount of data written to the destination storage per time unit if the destination storage is a destination SSD is an estimate of the amount of data written to the destination storage per time unit if the destination storage is a destination SSD, and wherein the period of time to complete copying the virtual machine disk image from the source storage to the destination storage and handling virtual machine IO requests from the virtual machine during copying the virtual machine disk image from the source storage to the destination storage is an estimate of the period of time to complete copying the virtual machine disk image from the source storage to the destination storage and handling virtual machine IO requests from the virtual machine during copying the virtual machine disk image from the source storage to the destination storage.

50. A method of determining a total cost of migration for transferring a virtual machine storage, comprising:

receiving information regarding a virtual machine disk image corresponding to a virtual machine, a source storage, and a destination storage; and calculating a total cost of migration, where the total cost of migration, MC, is based on:

an IO penalty, $\lambda_{IO}$;
a migration time factor, $\lambda_{migration\ time}$;
a wear out factor, $\lambda_{wear\ out}$; and
a weight, $\gamma$, as follows:

$$MC = \gamma * \lambda_{wear\ out} * \lambda_{migration\ time} + (1-\gamma) * \lambda_{IO} * \lambda_{migration\ time}$$
$$= \lambda_{migration\ time} * (\gamma * \lambda_{wear\ out} + (1-\gamma) * \lambda_{IO}),$$

where $$\lambda_{IO} = \frac{\text{Best } IO \text{ Performance} - IO \text{ Performance during migration}}{\text{Best } IO \text{ Performance}},$$

$$\lambda_{wear\ out} = \frac{\text{data written to } SSD \text{ per time unit}}{\text{Workload Data Writes per time unit}},$$

$$\lambda_{migration\ time} = \frac{\text{migration time}}{\text{image copy time}}, \text{ and}$$

$\gamma$ is greater than or equal to 0 and less than or equal to 1, wherein best IO performance is a better of an IO performance of the source storage and an IO performance of the destination storage if the IO performance of the source storage and the IO performance of the destination storage are not the same, or the IO performance of the source storage if the IO performance of the source storage and the IO performance of the destination storage are the same, wherein IO performance during migration is an IO performance experienced during migrating the virtual machine, wherein data written to SSD per time unit is an amount of data written to the source storage per time unit if the source storage is a source SSD plus an amount of data written to the destination storage per time unit if the destination storage is a destination SSD, or zero if both the source storage is a source HDD and the destination storage is a destination HDD, wherein workload data writes per time unit is the amount of data written to the source storage per time unit plus the amount of data written to the destination storage per time unit during copying the virtual machine disk image from the source storage to the destination storage and handling virtual machine IO requests from the virtual machine during copying the virtual machine disk image from the source storage to the destination storage, wherein migration time is a period of time to complete copying the virtual machine disk image from the source storage to the destination storage and handling virtual machine IO requests from the virtual machine during copying the virtual machine disk image from the source storage to the destination storage, wherein image copy time is an amount of time copying the virtual machine disk image from the source storage to the destination storage would take if such copying were not interrupted.

51. The method according to claim 50, wherein the amount of data written to the source storage per time unit if the source storage is a source SSD is an estimate of the amount of data written to the source storage per time unit if the source storage is a source SSD, wherein the amount of data written to the destination storage per time unit if the destination storage is a destination SSD is an estimate of the amount of data written to the destination storage per time unit if the destination storage is a destination SSD, and wherein the period of time to complete copying the virtual machine disk image from the source storage to the destination storage and handling virtual machine IO requests from the virtual machine during copying the virtual machine disk image from the source storage to the destination storage is an estimate of the period of time to complete copying the virtual machine disk image from the source storage to the destination storage and handling virtual machine IO requests from the virtual machine during copying the virtual machine disk image from the source storage to the destination storage.

* * * * *

UNITED STATES PATENT AND TRADEMARK OFFICE
CERTIFICATE OF CORRECTION

PATENT NO.       : 9,195,401 B2
APPLICATION NO.  : 14/183250
DATED            : November 24, 2015
INVENTOR(S)      : Tao Li and Ruijin Zhou It is certified that error appears in the above-identified patent and that said Letters Patent is hereby corrected as shown below:

Specification

Column 3,
Line 35, "operation." should read --operation).--.
Line 40, "shown." should read --shown).--.

Column 4,
Line 7, "OIO0=4" should read --OIO=4--.

Column 9,
Line 15, "performance, 7=0.5." should read --performance, $\gamma$=0.5.--.

Column 14,
Line 16, "3%" should read --$\beta$%--.

Column 15,
Line 14, "Obench with proc = 2" should read --Dbench with proc = 2--.
Line 14, "Obench is configured to push" should read --Dbench is configured to push--.
Line 15, "Obench with proc -- 16" should read --Dbench with proc = 16--.

Column 17,
Line 21, "HDDs (s)" should read --HDDs ($\varepsilon$)--.

Column 33,
Lines 18-19, "equal to wherein" should read --equal to 1, wherein--.

Column 36,
Line 11, "Xubin He, AFTL" should read --Xubin He, $\Delta$FTL--.

Signed and Sealed this
Fourteenth Day of June, 2016

Michelle K. Lee
*Director of the United States Patent and Trademark Office*